(12) United States Patent
Hara

(10) Patent No.: US 10,075,227 B2
(45) Date of Patent: Sep. 11, 2018

(54) COMMUNICATION SYSTEM, TERMINAL APPARATUS AND METHOD

(71) Applicant: FUJITSU LIMITED, Kawasaki-shi, Kanagawa (JP)

(72) Inventor: Yasushi Hara, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 86 days.

(21) Appl. No.: 15/283,475

(22) Filed: Oct. 3, 2016

(65) Prior Publication Data

US 2017/0149486 A1   May 25, 2017

(30) Foreign Application Priority Data

Nov. 24, 2015   (JP) .................................. 2015-228617

(51) Int. Cl.

| | |
|---|---|
| *H04B 7/14* | (2006.01) |
| *H04W 4/00* | (2018.01) |
| *H04W 40/24* | (2009.01) |
| *H04B 7/155* | (2006.01) |
| *H04W 4/80* | (2018.01) |
| *H04W 80/00* | (2009.01) |
| *H04W 84/12* | (2009.01) |

(52) U.S. Cl.
CPC ............ *H04B 7/14* (2013.01); *H04B 7/15528* (2013.01); *H04W 4/80* (2018.02); *H04W 40/244* (2013.01); *H04W 80/00* (2013.01); *H04W 84/12* (2013.01); *Y02D 70/1262* (2018.01); *Y02D 70/142* (2018.01); *Y02D 70/144* (2018.01); *Y02D 70/26* (2018.01); *Y02D 70/446* (2018.01)

(58) Field of Classification Search
CPC ..... H04B 7/14; H04B 7/15528; H04W 4/008; H04W 40/244; H04W 84/12; H04W 80/00; Y02B 60/50
USPC .......... 370/280–315, 338–352; 455/432–456
See application file for complete search history.

(56) References Cited

U.S. PATENT DOCUMENTS

| | | | | |
|---|---|---|---|---|
| 9,491,691 B2 * | 11/2016 | Tailor | .................... | H04W 48/16 |
| 9,788,167 B2 * | 10/2017 | Geng | .................... | H04W 4/043 |
| 9,820,084 B2 * | 11/2017 | Palin | .................... | H04W 4/008 |
| 2015/0271716 A1 | 9/2015 | Son et al. | | |

(Continued)

FOREIGN PATENT DOCUMENTS

JP    2013-517659    5/2013

*Primary Examiner* — Man U Phan
(74) *Attorney, Agent, or Firm* — Fujitsu Patent Center

(57) ABSTRACT

A communication system includes a terminal apparatus, an information providing apparatus outputting content data, a wireless communication relay apparatus relaying communication between the terminal apparatus and the information providing apparatus, a wireless apparatus coupled to the terminal apparatus, and a reception apparatus coupled to the information providing apparatus and the wireless apparatus, wherein the terminal apparatus transmits attribute information to the information providing apparatus, the information providing apparatus transmits identification information to the terminal apparatus, the terminal apparatus transmits the identification information to the wireless apparatus, the wireless apparatus transmits the identification information to the reception apparatus, the reception apparatus transmits the identification information to the information providing apparatus, and the information providing apparatus outputs the content data.

20 Claims, 37 Drawing Sheets

(56) References Cited

U.S. PATENT DOCUMENTS

| | | | |
|---|---|---|---|
| 2015/0381830 A1* | 12/2015 | Wu | H04N 21/41407 |
| | | | 348/207.1 |
| 2016/0094946 A1* | 3/2016 | Keithley | H04W 4/023 |
| | | | 455/456.3 |
| 2016/0095064 A1* | 3/2016 | Li | H04W 48/10 |
| | | | 370/311 |
| 2016/0183042 A1* | 6/2016 | Weizman | H04W 4/02 |
| | | | 455/456.1 |
| 2016/0323717 A1* | 11/2016 | Friday | H04W 4/043 |
| 2017/0086204 A1* | 3/2017 | Jung | H04W 16/28 |
| 2017/0118754 A1* | 4/2017 | Kang | H04W 8/005 |

* cited by examiner

| BLE-Beacon SETTING INFORMATION ||
|---|---|
| UUID | IDENTIFICATION NUMBER UNIQUE TO ORGANIZATION OF 128 BITS |
| Major | IDENTIFICATION NUMBER OF 16 BITS |
| Minor | IDENTIFICATION NUMBER OF 16 BITS |
| RSSI | SIGNAL STRENGTH |
| PERIOD | TRANSMISSION PERIOD OF BLE Beacon |

FIG. 7

| ESSID OF AP | BSSID OF AP | BLE SERVICE |
|---|---|---|
| ESSID_00 | BSSID_00 | 3 |
| ESSID_00 | BSSID_01 | 2 |
| ESSID_00 | BSSID_02 | 2 |
| ESSID_00 | BSSID_10 | 1 |
| ESSID_A0 | BSSID_A1 | 0 |
| ESSID_B0 | BSSID_B1 | 0 |

DEFINITION OF BLE SERVICE
0: NO SERVICE
1: TRANSMISSION SERVICE
   (TERMINAL: RECEIVER)
2: RECEPTION SERVICE
   (TERMINAL: TRANSMITTER)
3: TRANSMISSION AND RECEPTION

FIG. 8

| TERMINAL IDENTIFICATION INFORMATION (MAC OR THE LIKE) | PERSONAL ATTRIBUTE |
|---|---|
| UE001 | YAMADA TARO/MALE/JAPAN/JP/TWENTIES /aaa@jp.fujitsu.com |
| UE002 | jon/man/us/en/30s/bbb@jp.fujitsu.com |

FIG. 9

| TERMINAL IDENTIFICATION INFORMATION (MAC OR THE LIKE) | BLE-Beacon SETTING INFORMATION UUID/Major/Minor/RSSI/PERIOD |
|---|---|
| UE001 | A1/B1/C1/D1/E1/F1 |
| UE002 | A2/B2/C2/D2/E1/F1 |

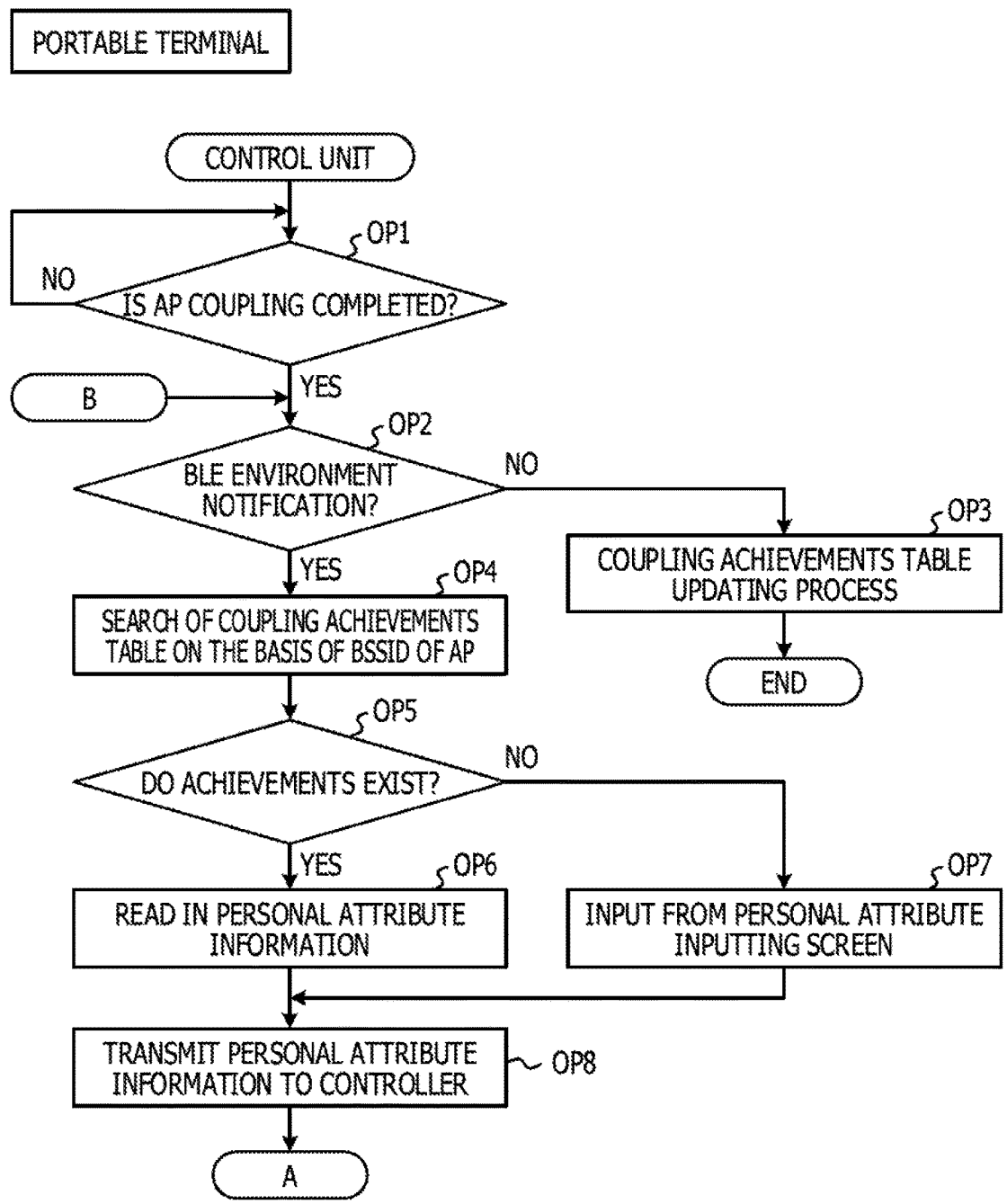

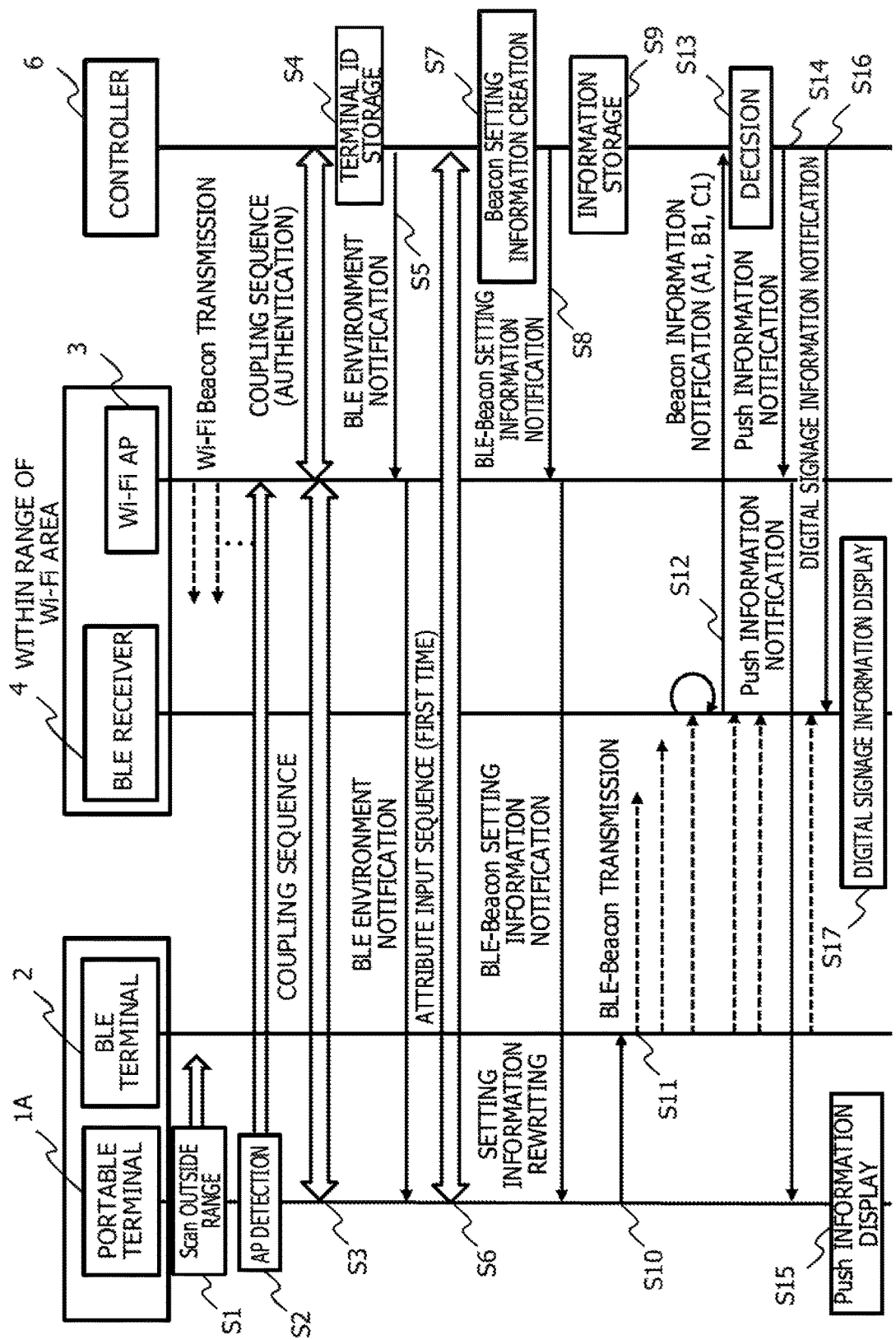

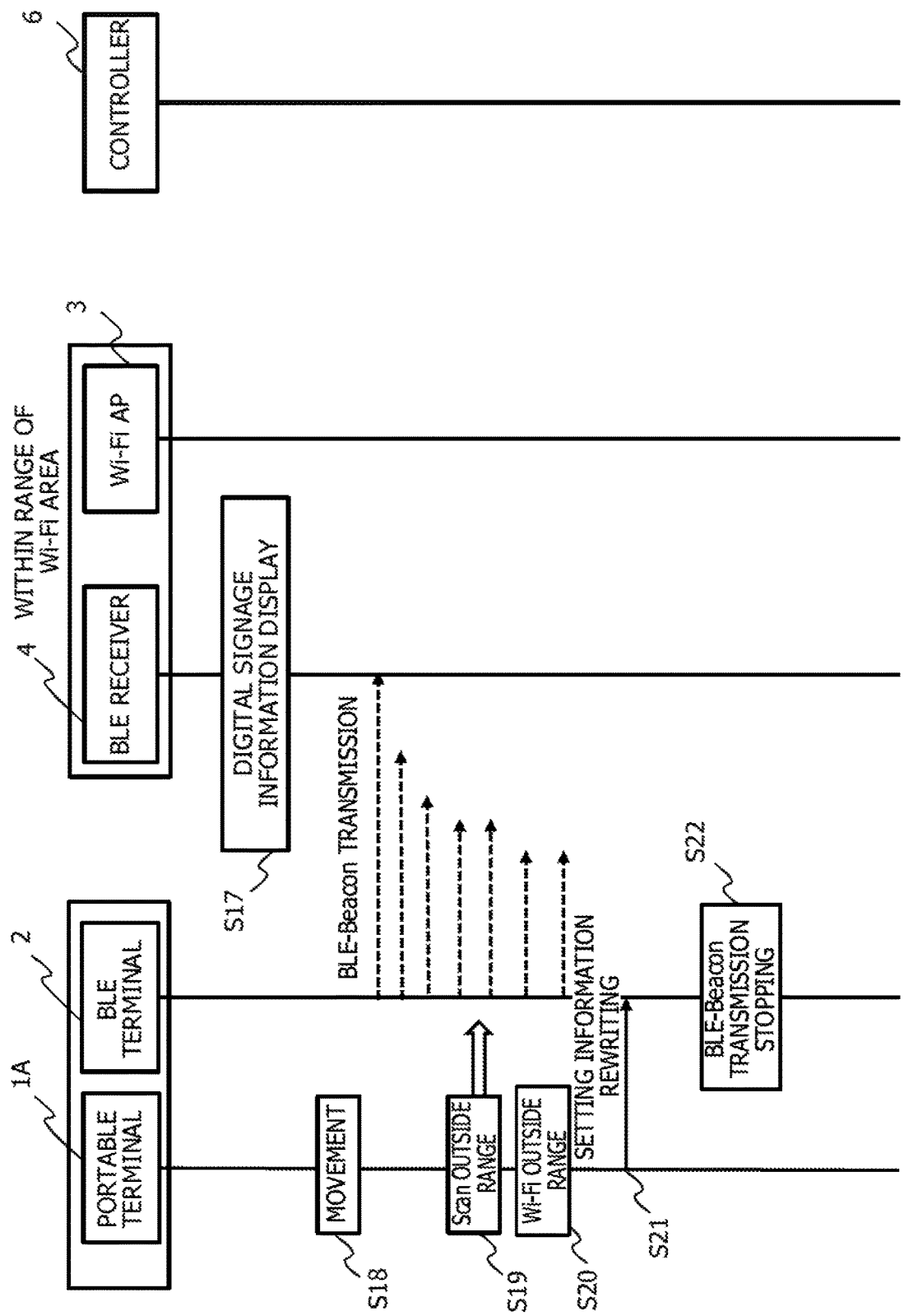

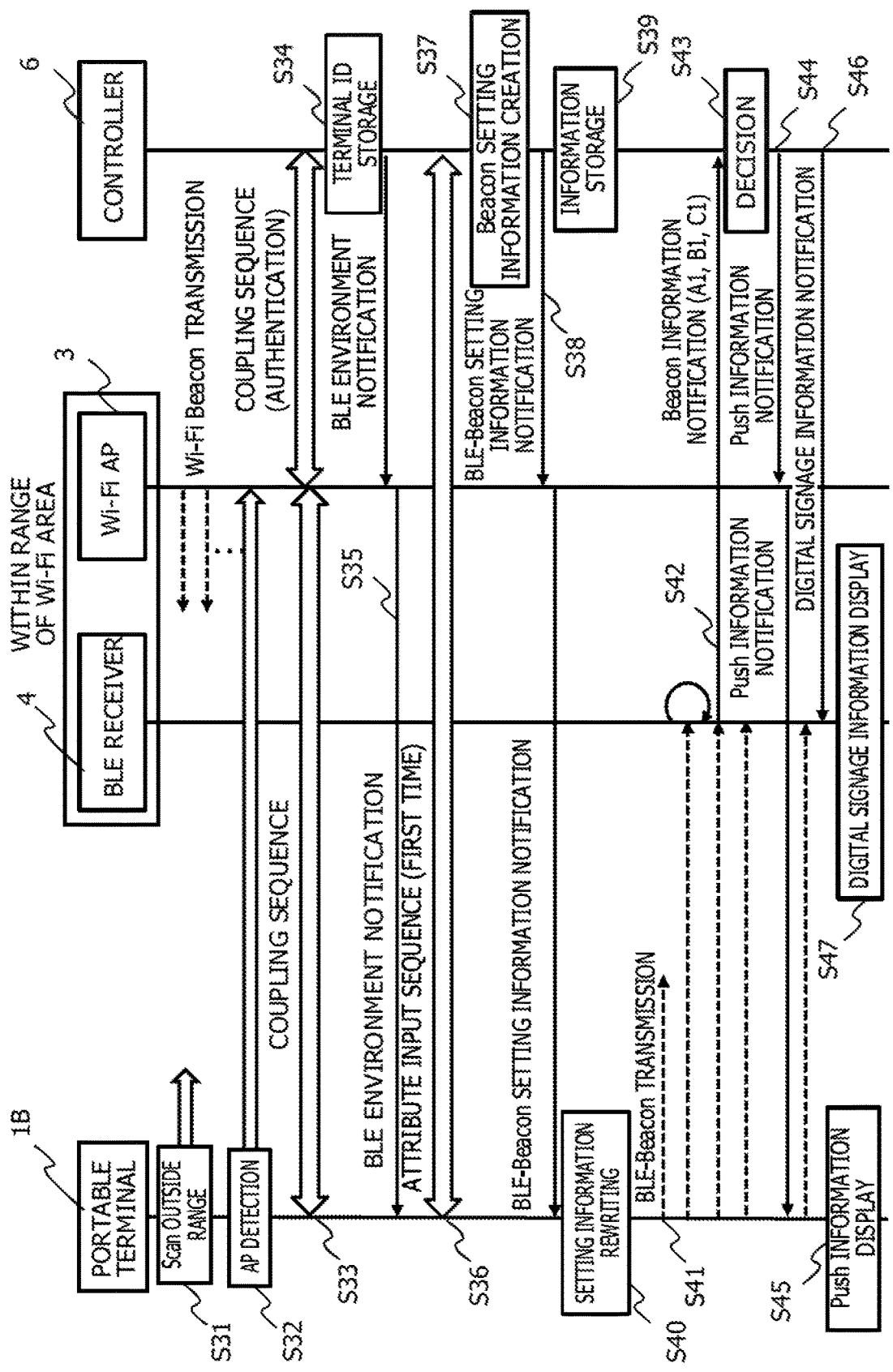

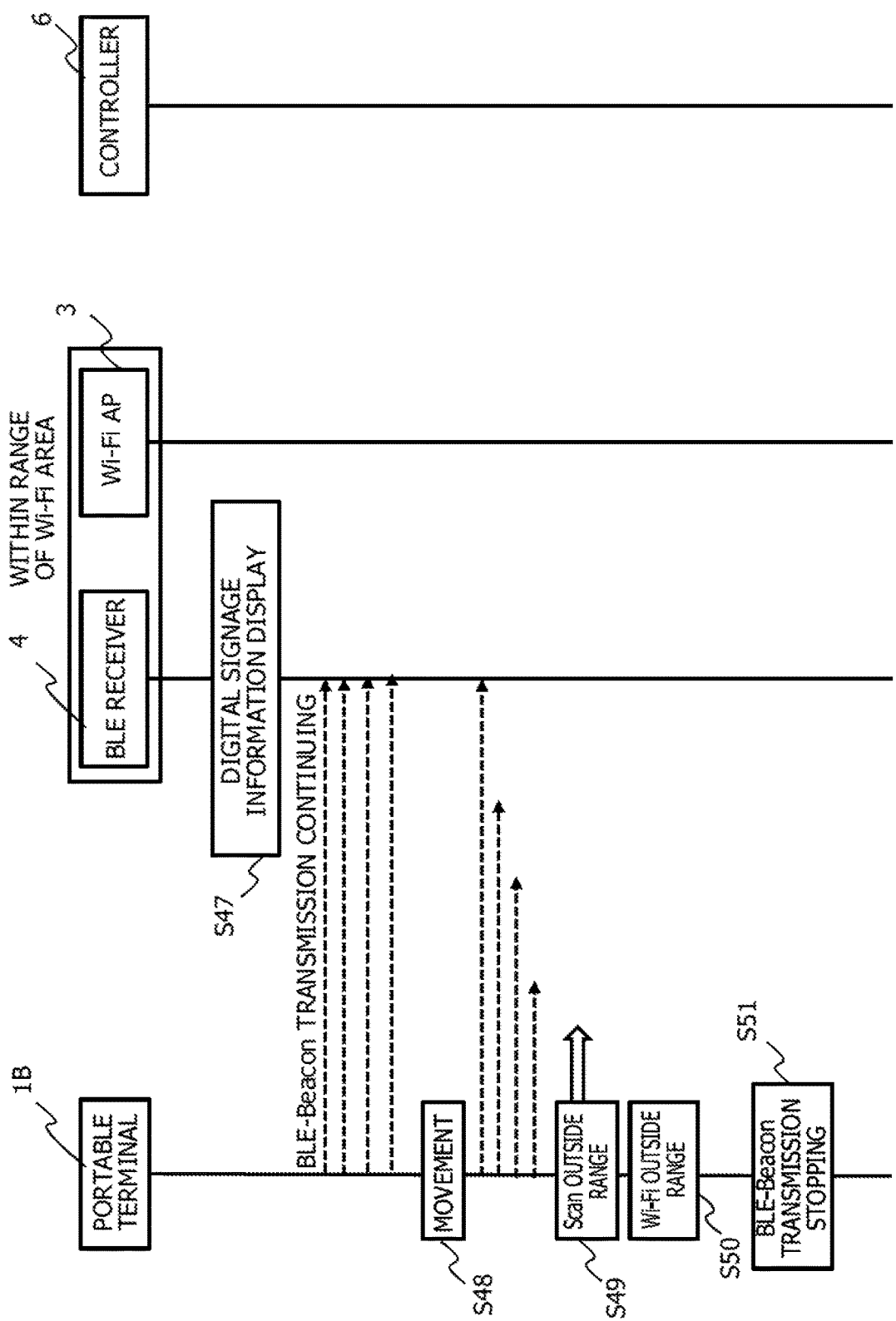

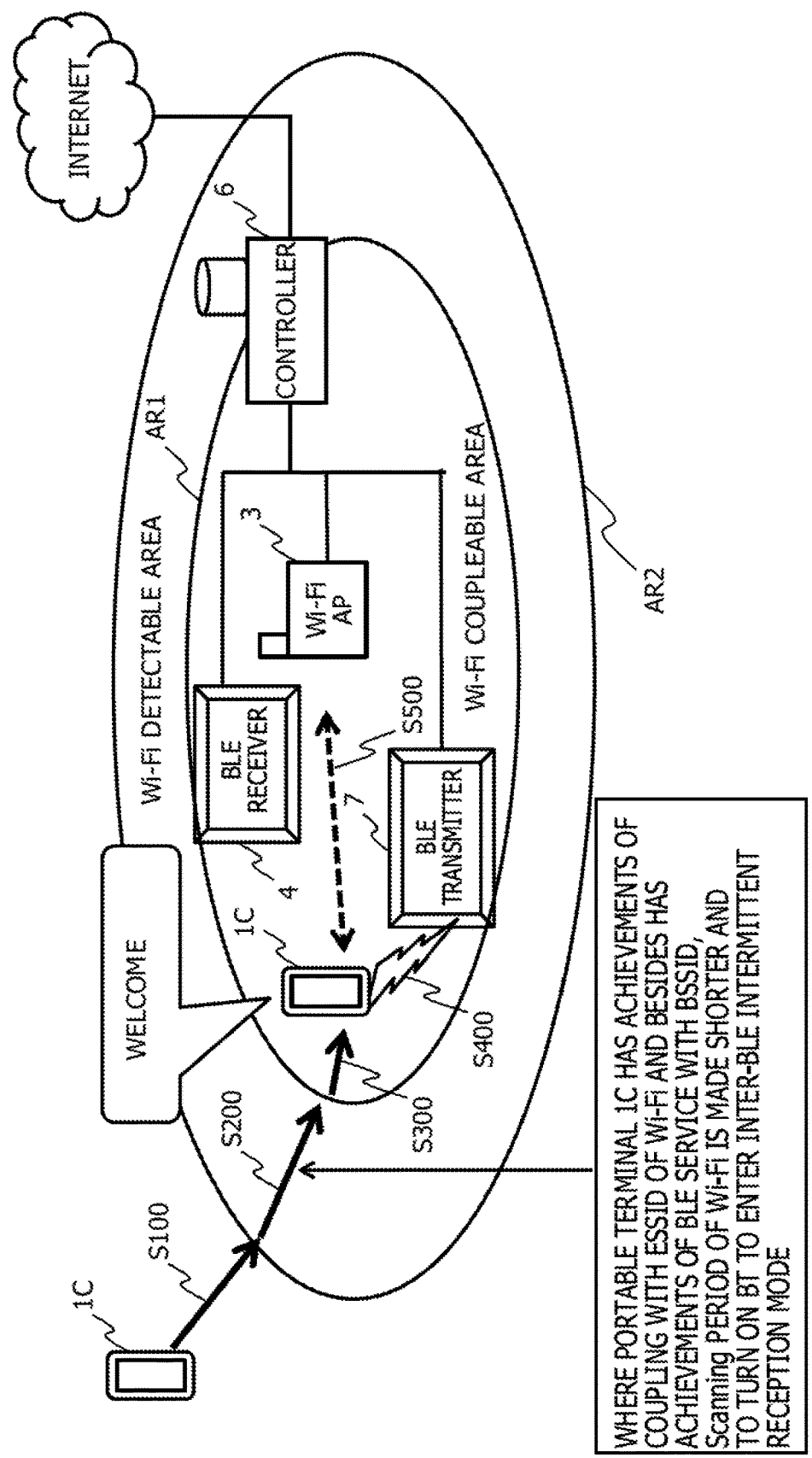

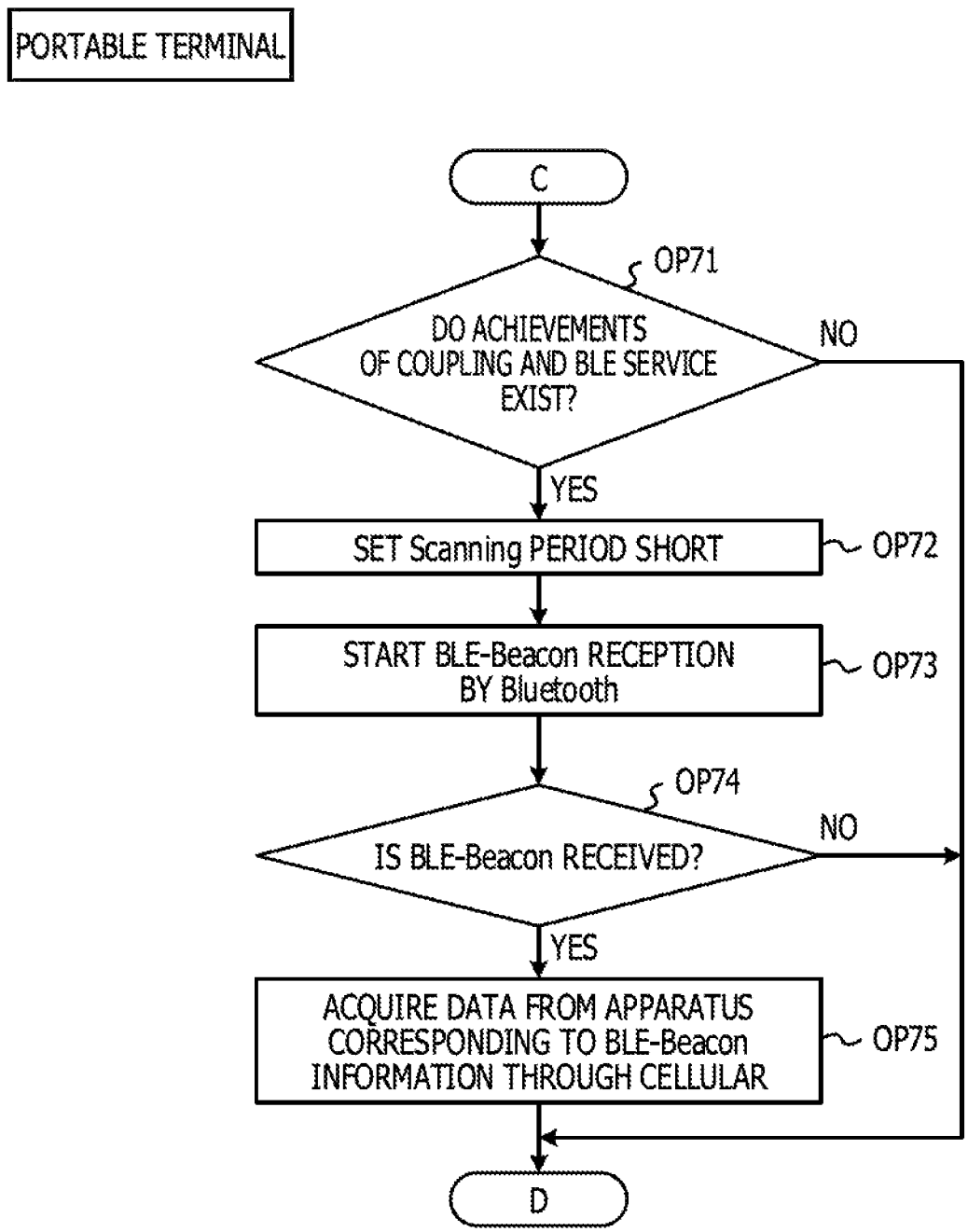

FIG. 28

| TERMINAL IDENTIFICATION INFORMATION (MAC OR THE LIKE) | BLE TERMINAL No | PERSONAL ATTRIBUTE |
|---|---|---|
| UE001 | 1 | YAMADA TARO/MALE/JAPAN/JP/THIRTIES /aaa@jp.fujitsu.com |
| UE001 | 2 | YAMADA TARO-CHILD/MALE/JAPAN/JP/TEN YEARS AND UNDER/aaa@jp.fujitsu.com |

FIG. 29

| No | TERMINAL IDENTIFICATION INFORMATION (MAC OR THE LIKE) | BLE TERMINAL No | BLE-Beacon SETTING INFORMATION UUID/Major/Minor/RSSI/ PERIOD | PARING No |
|---|---|---|---|---|
| 10001 | UE001 | 1 | A1/B1/C1/D1/E1 | 10001 |
| 10002 | UE001 | 2 | A1/B1/C2/D1/E1 | 10001 |
| 10003 | UEA01 | 1 | A1/B1/C8/D1/E1 | 0 |
| 10004 | UEB21 | 1 | A1/B1/C9/D1/E1 | 0 |

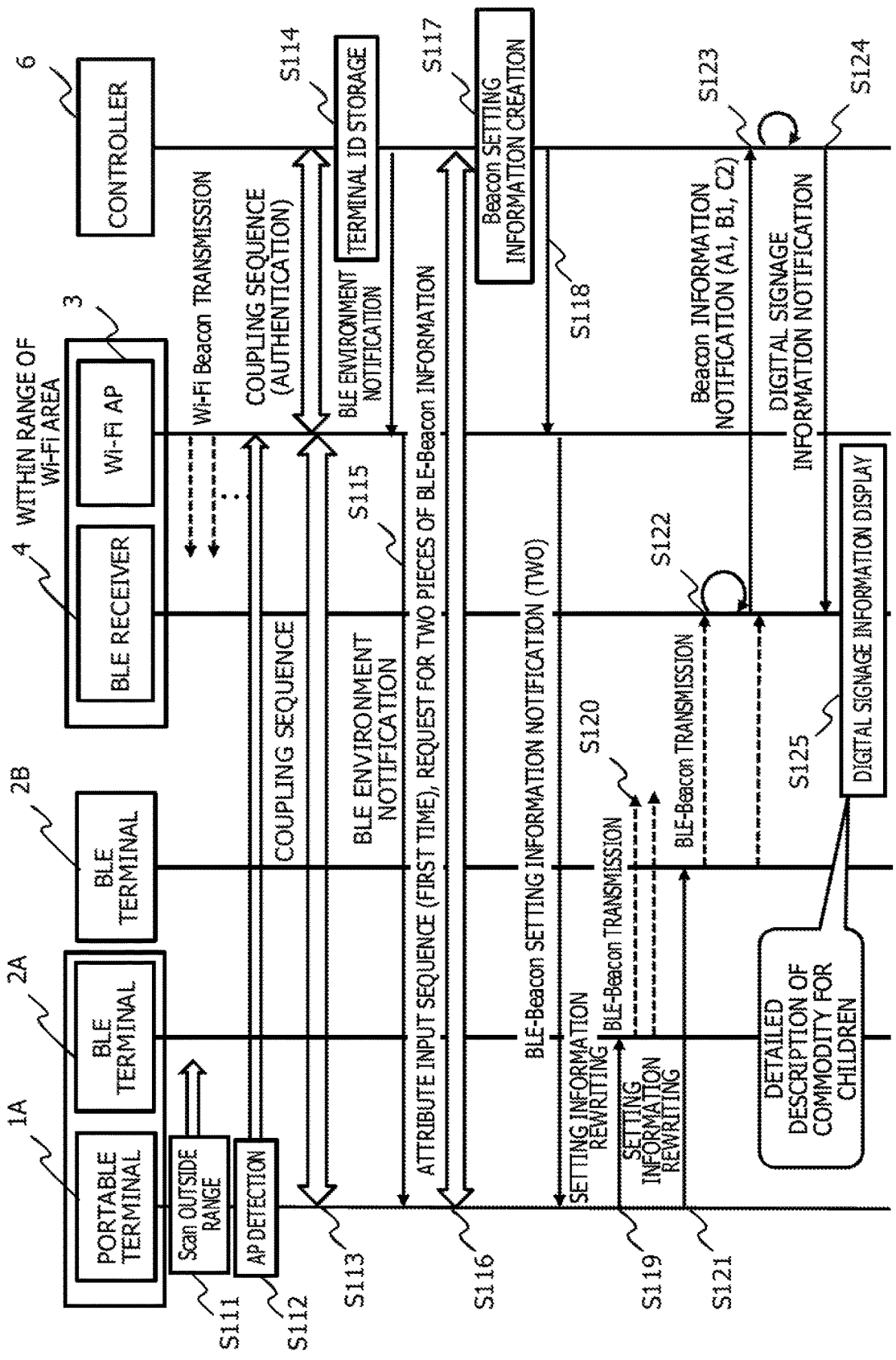

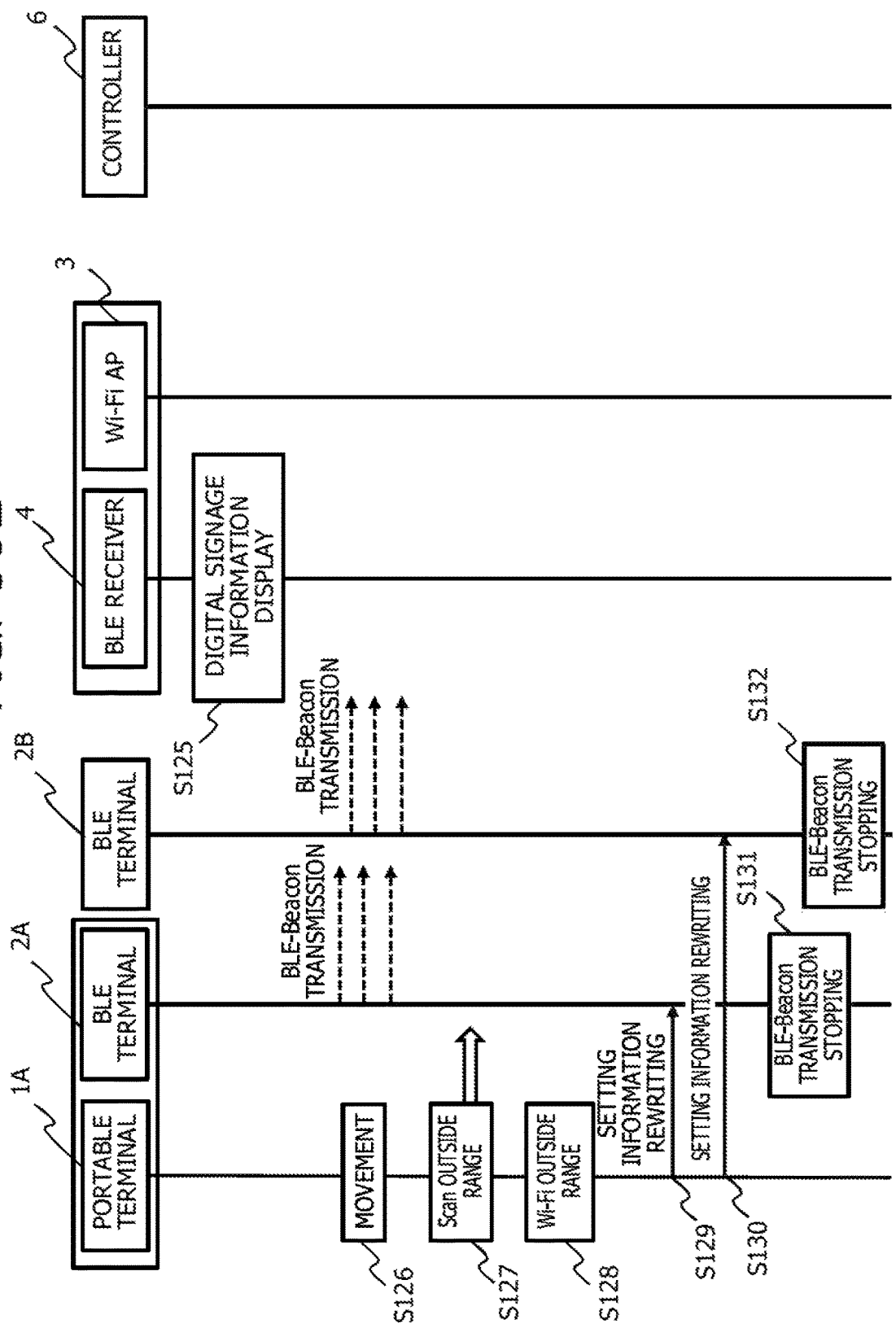

COMMUNICATION SYSTEM, TERMINAL APPARATUS AND METHOD

CROSS-REFERENCE TO RELATED APPLICATION

This application is based upon and claims the benefit of priority of the prior Japanese Patent Application No. 2015-228617, filed on Nov. 24, 2015, the entire contents of which are incorporated herein by reference.

FIELD

The embodiments disclosed herein relate to a communication system, a terminal apparatus, and a method.

BACKGROUND

FIG. 1 depicts an example of a service system that uses Bluetooth low energy (BLE). A service system P100 includes, for example, a portable terminal P1, a BLE transmitter P2, a digital signage P5, and a controller P6. It is assumed that the digital signage P5 is coupled with a BLE receiver (not depicted). The digital signage P5 and the controller P6 are coupled with each other, for example, by a local area network (LAN). Further, the portable terminal P1 is communicable with the controller P6 by wireless communication of Wi-Fi (registered trademark; wireless fidelity, long term evolution (LTE), or third-generation (3G).

Bluetooth Low Energy (hereinafter referred to as BLE) is one of Bluetooth (registered trademark) 4.0 standards that are one of technologies of a wireless personal area network (PAN). BLE is used, for example, in a service in which, if a user passes by the BLE transmitter P2 installed in a shop, then the portable terminal P1 that operates as a BLE receiver is push notified of commodity information or a coupon. Further, BLE is used also in a service in which, for example, if a user having the BLE transmitter P2 comes near to the digital signage P5, then given information is displayed on the digital signage P5, or in a like service.

In BLE, such services as described above are implemented using a BLE beacon. The BLE beacon includes a universally unique identifier (UUID) as identification information for identifying an origination source of the BLE beacon. The same UUID is registered in both of the BLE transmitter P2 and the controller P6 in advance. The BLE transmitter P2 originates a BLE beacon in a given period. If the BLE receiver receives the BLE beacon, then it transmits the UUID included in the BLE beacon to the controller P6. If the UUID received from the BLE receiver and the UUID registered in advance coincide with each other, then the controller P6 transmits a given content to the portable terminal P1 as a BLE receiver or the given digital signage P5 through LTE or a LAN.

As an example of a service in which BLE transmitters P2 are disposed dispersedly and a BLE receiver moves, a service is available in which, if a user passes by a BLE transmitter P2 installed in a shop, then the portable terminal P1 (receiver) is push notified of commodity information or a coupon. The BLE service in which BLE transmitters are disposed dispersedly and a BLE receiver moves is hereinafter referred to as BLE transmission service. Further, as an example of a BLE service in which BLE receivers are disposed dispersedly and a BLE transmitter moves, a service is available in which, if a user having the BLE transmitter P2 comes near to the digital signage P5, then given information is displayed on the digital signage P5. The BLE service in which BLE receivers are disposed dispersedly and a BLE transmitter moves is hereinafter referred to as BLE reception service. In related art, Japanese National Publication of International Patent Application No. 2013-517659 is available.

SUMMARY

According to an aspect of the embodiment, a communication system includes a terminal apparatus, an information providing apparatus configured to output content data, a wireless communication relay apparatus configured to relay communication between the terminal apparatus and the information providing apparatus and configured to be coupled with the terminal apparatus using a first wireless communication protocol, a wireless apparatus configured to be coupled to the terminal apparatus, and a reception apparatus configured to be coupled to the information providing apparatus and configured to be coupled to the wireless apparatus using a second wireless communication protocol different from the first wireless communication protocol, wherein the terminal apparatus is configured to transmit attribute information to the information providing apparatus through the wireless communication relay apparatus, the information providing apparatus is configured to transmit identification information to the terminal apparatus through the wireless communication relay apparatus based on the attribute information, the terminal apparatus is configured to transmit the identification information to the wireless apparatus, the wireless apparatus is configured to transmit the identification information to the reception apparatus, the reception apparatus is configured to transmit the identification information to the information providing apparatus, and the information providing apparatus is configured to output the content data based on the identification information transmitted from the reception apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a view illustrating an example of information included in BLE beacon setting information;

FIG. 7 is a view illustrating an example of a coupling achievements table of a portable terminal;

FIG. 8 depicts an example of a personal attribute information table included in a user information database of a controller;

FIG. 9 depicts an example of a BLE beacon setting information table included in a user information database of a controller;

FIG. 10A depicts an example of a flow chart of processing of a control unit of a portable terminal;

FIG. 15A is a view illustrating an example of a sequence of a service providing process of a service system according to the first embodiment;

FIG. 15B is a view illustrating an example of a sequence of a service providing process of the service system according to the first embodiment;

FIG. 17A is a view illustrating an example of a sequence of a service providing process of a service system according to the second embodiment;

FIG. 17B is a view illustrating an example of a sequence of a service providing process of the service system according to the second embodiment;

FIG. 18 is a view illustrating an example of a flow of processing of a service system according to a third embodiment;

FIG. 21B depicts an example of a flow chart of processing of the control unit of the portable terminal according to the third embodiment;

FIG. 28 illustrates an example of a personal attribute information table of a controller according to the fifth embodiment;

FIG. 29 illustrates an example of a BLE beacon setting information table of a controller according to the fifth embodiment;

FIG. 30A is a view illustrating an example of a sequence of processing in a service system according to the fifth embodiment; and FIG. 30B is a view illustrating an example of a sequence of processing in the service system according to the fifth embodiment.

DESCRIPTION OF EMBODIMENTS

A conventional service that uses BLE has the following problems. In the BLE transmission service in which BLE transmitters are disposed dispersedly and a BLE receiver moves, a portable terminal is frequently used as the BLE receiver. In the BLE reception service, the response to a push notification is best where the reception function of the portable terminal for a BLE beacon is normally kept on. However, where the reception function of the portable terminal for a BLE beacon is normally kept on, power consumption of the portable terminal by the reception function for a BLE beacon increases. On the other hand, if the reception function for a BLE beacon is turned on intermittently, then although it is possible to reduce the power consumption of the portable terminal, there is the possibility that the response to a push notification may be slowed down. In other words, the power consumption and the response to a push notification of the portable terminal have a tradeoff relationship therebetween.

On the other hand, in the BLE reception service in which BLE receivers are disposed dispersedly and a BLE transmitter moves, an apparatus for exclusive use is frequently adopted as the BLE transmitter. In this case, the BLE transmitter is, for example, lent to a user. Therefore, the BLE reception service has such a problem in service that a user takes time for the proceedings in lending a BLE transmitter, that some transmitter for a BLE beacon is not returned or that the number of persons who can enjoy the service is limited. It is to be noted that the problems arise not only in the BLE service but also in various services in which a transmission apparatus and a reception apparatus of a radio signal are used to detect the proximity of a user to provide information.

The embodiments disclosed herein provide a service system, a portable terminal, and a service providing method by which power consumption of a portable terminal can be reduced and the response can be improved.

In the following, embodiments are described with reference to the drawings. It is to be noted that the configuration of the embodiments is illustrative and not restricted thereto.

First Embodiment

Figure 1:
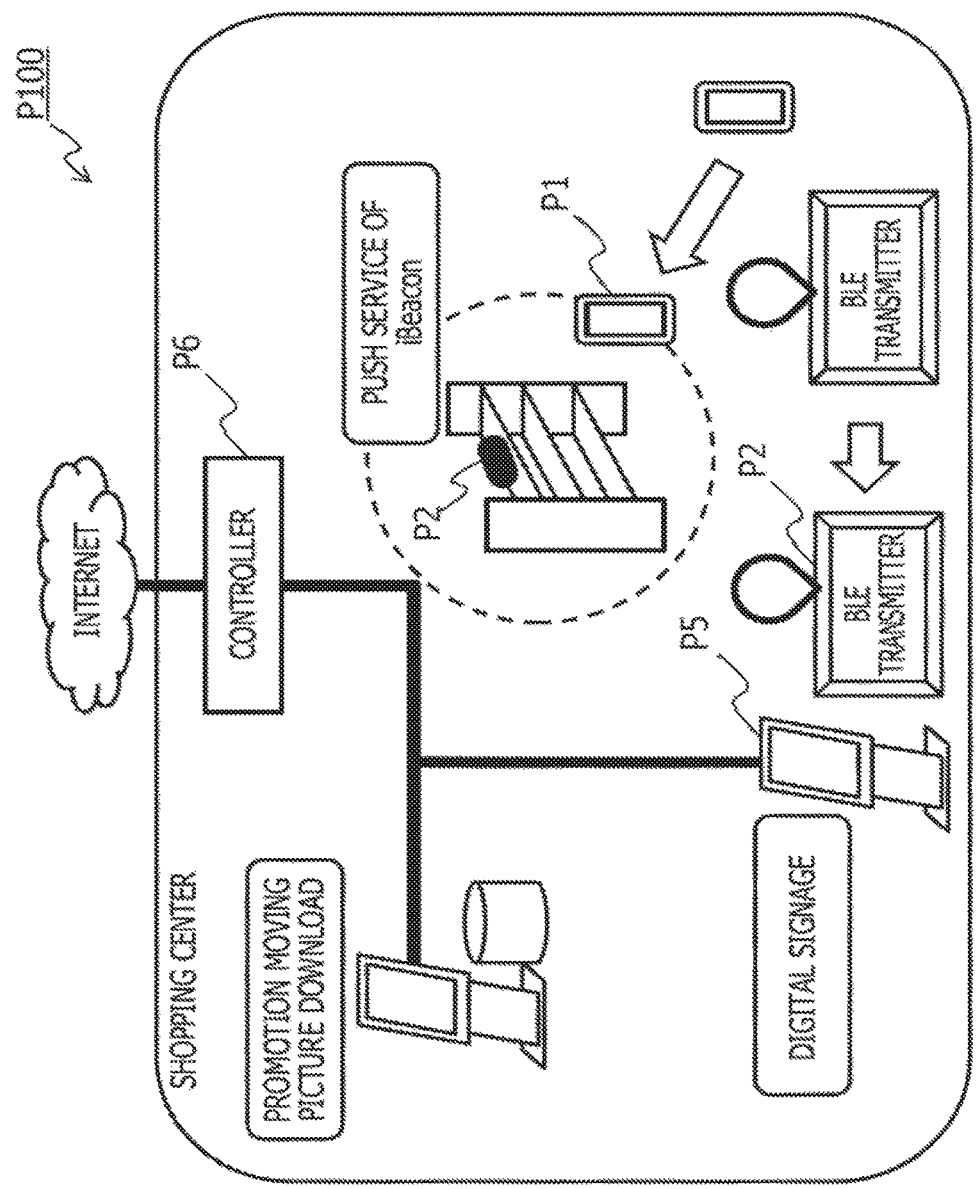
FIG. 1 depicts an example of a service system in which Bluetooth Low Energy is used.
Figure 2:
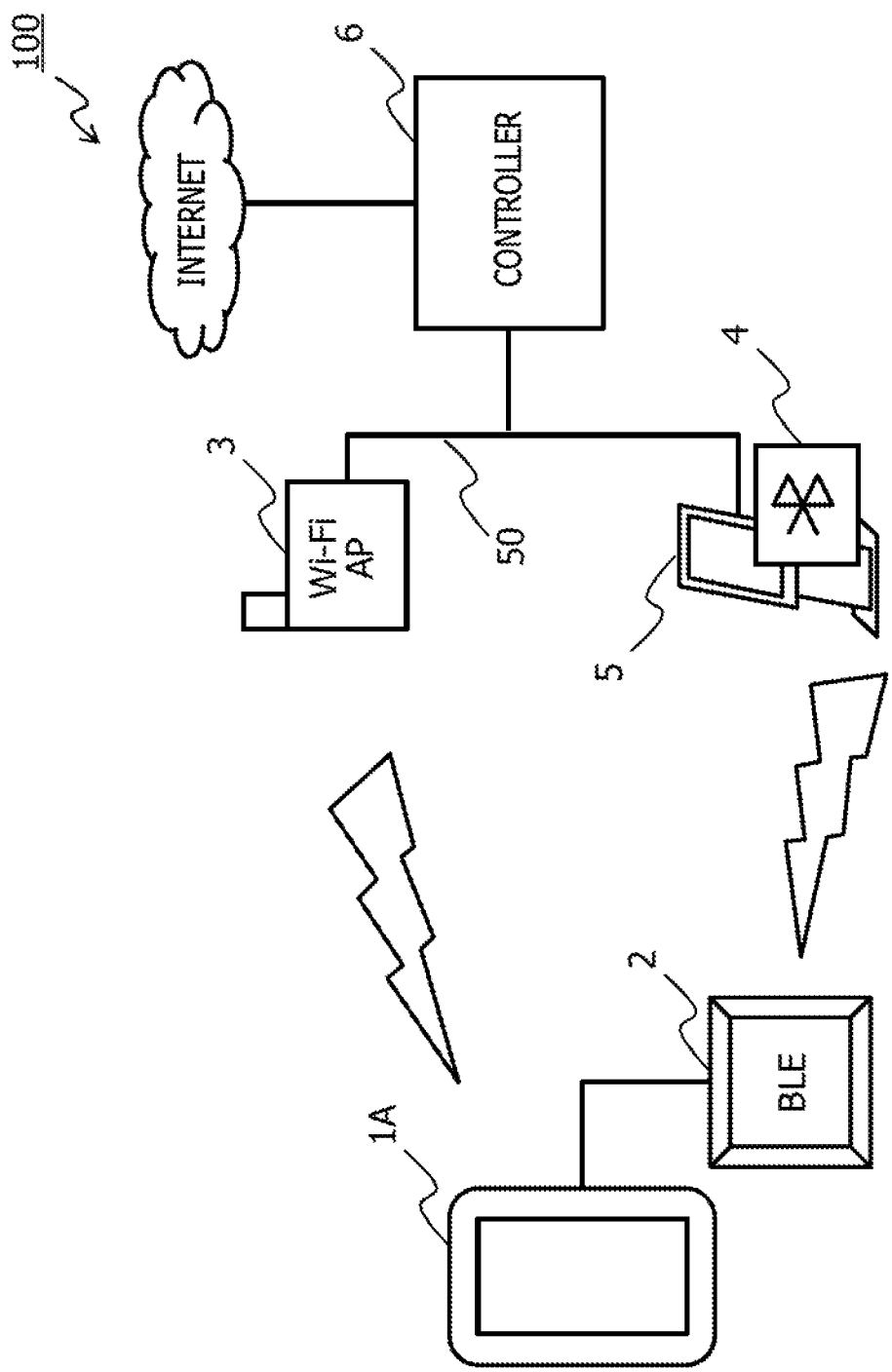
FIG. 2 is a view depicting an example of a system configuration of a service system according to a first embodiment.

FIG. 2 is a view depicting an example of a system configuration of a service system according to a first embodiment. A service system 100 includes a portable terminal 1A, a BLE terminal 2, a Wi-Fi access point (AP) 3, a BLE receiver 4, a digital signage 5, and a controller 6. The Wi-Fi AP 3, the BLE receiver 4, the digital signage 5, and the controller 6 are coupled with each other, for example, by a LAN 50.

The BLE receiver 4 is, for example, an installed type single apparatus or an externally provided apparatus that is coupled with the digital signage 5 by universal serial bus (USB) coupling. Where the BLE receiver 4 is an externally provided apparatus for USB coupling, the BLE receiver 4 itself does not have an interface to the LAN but communicates with the LAN using a communication function of the digital signage 5.

The digital signage 5 is an apparatus including a touch panel display unit. The digital signage 5 may include a network interface and receive information to be displayed from the controller 6 directly or may not include a network interface and may receive information to be displayed from the controller 6 through the BLE receiver 4 coupled therewith. In the first embodiment, it is supposed that the digital signage 5 receives information to be displayed from the controller 6 through the BLE receiver 4 coupled therewith. However, the digital signage 5 is not limited to this.

The portable terminal 1A is, for example, a smartphone, a tablet terminal, or a wearable terminal. The portable terminal 1A has a communication function, at least with Wi-Fi and Bluetooth (registered trademark). The portable terminal 1A is coupled with a Wi-Fi AP through Wi-Fi and communicates with the controller 6 by relay by the Wi-Fi AP. Further, the portable terminal 1A is coupled with the BLE terminal 2 by Bluetooth.

The BLE terminal 2 is a wearable terminal that has built therein, for example, a single apparatus of the card type or a BLE module and is different from the portable terminal 1A. The BLE terminal 2 starts transmission of a BLE beacon in accordance with an instruction from the portable terminal 1A received through Bluetooth. In the first embodiment, it is supposed that the BLE terminal 2 is not lent to a user but is owned uniquely by a user.

The BLE beacon includes identification information for identifying a transmission source of a BLE beacon such as a UUID. If the identification information included in a BLE beacon and the identification information registered in the receiver coincide with each other, then the information is displayed on the digital signage 5 or the portable terminal 1A is push-notified of the information.

In the first embodiment, the portable terminal 1A transmits, when it is in a Wi-Fi coupling state, personal attribute information of the user to the controller 6 through Wi-Fi and acquires the identification information such as the UUID from the controller 6 through Wi-Fi. Further, after the portable terminal 1A acquires the identification information such as the UUID, it transmits an instruction to originate a BLE beacon to the BLE terminal 2 to start origination of a BLE beacon. Further, if the coupling of Wi-Fi is cut, then the portable terminal 1A transmits an instruction to stop the origination of a BLE beacon to the BLE terminal 2 to stop the origination of the BLE beacon.

In particular, in the first embodiment, a BLE beacon is originated to the portable terminal 1A to reduce power consumption in comparison with that in an alternative case in which the portable terminal 1A operates as a reception side apparatus of a BLE beacon. Further, origination of the BLE beacon is restricted to that upon Wi-Fi coupling of the portable terminal 1A to further reduce the power consumption of the portable terminal 1A.

<Apparatus Configuration>

Figure 3:
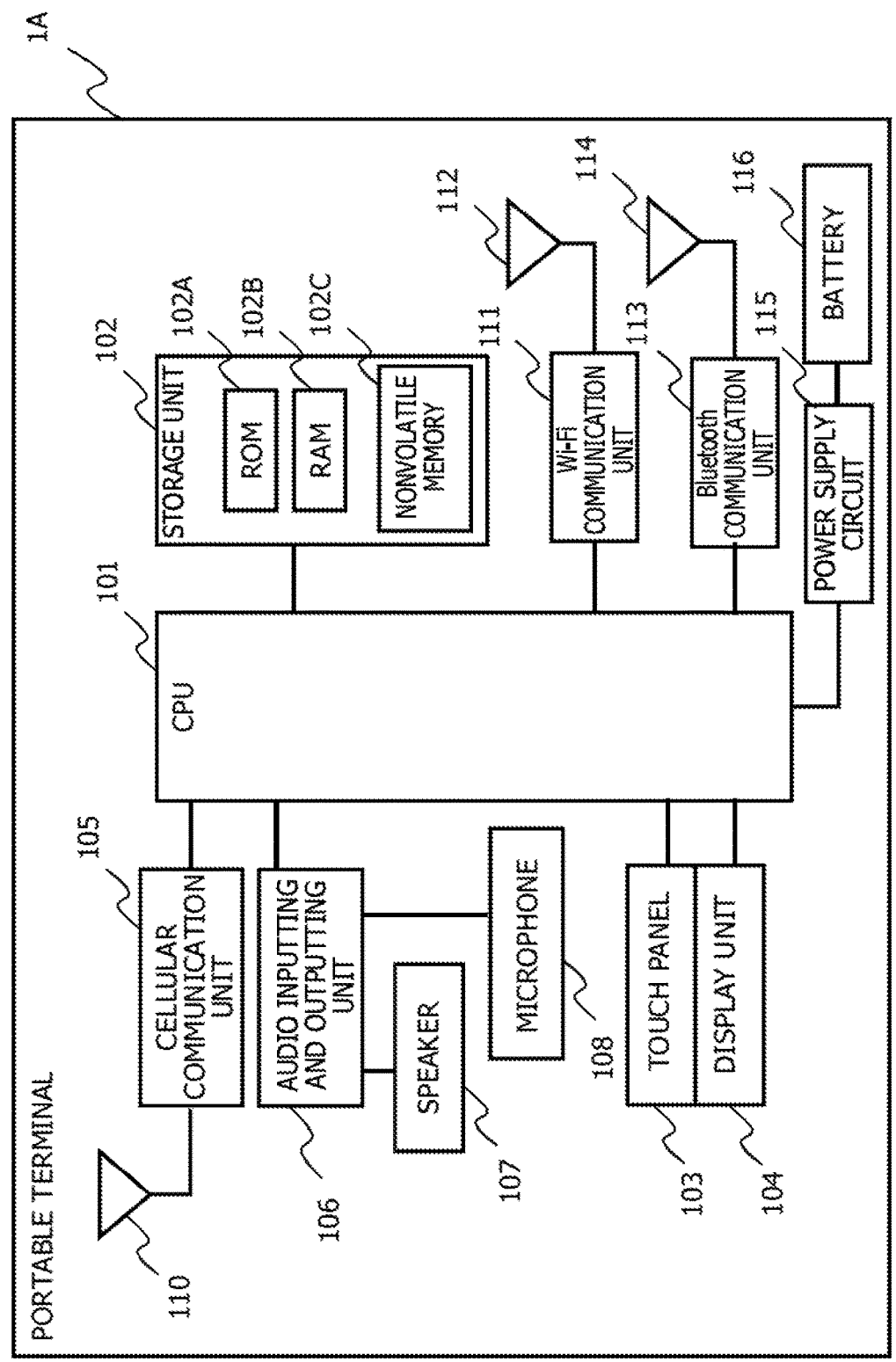
FIG. 3 is a block diagram depicting an example of a hardware configuration of a portable terminal.

FIG. 3 is a view depicting an example of a hardware configuration of the portable terminal 1A. The portable terminal 1A is, for example, a smartphone, a tablet terminal or the like. The portable terminal 1A includes a central processing unit (CPU) 101, a storage unit 102, a touch panel 103, a display unit 104, a cellular communication unit 105, an audio inputting and outputting unit 106, a speaker 107, a microphone 108, a cellular antenna 110, a Wi-Fi communication unit 111, a Wi-Fi antenna 112, a Bluetooth communication unit 113, a Bluetooth antenna 114, a power supply circuit 115, and a battery 116.

The storage unit 102 includes a read only memory (ROM) 102A, a random access memory (RAM) 102B, and a nonvolatile memory 102C. The RAM 102B is a volatile memory and provides a working area to the CPU 101. The ROM 102A is nonvolatile and stores a preinstalled application program, system data and so forth therein. The nonvolatile memory 102C is, for example, a flash memory.

The nonvolatile memory 102C stores an application program, user data and so forth acquired by a user operation therein. The nonvolatile memory 102C has stored therein a service enjoyment program for enjoying provision of information in the service system 100. The service enjoyment program is downloaded and acquired, for example, from an application download site.

The touch panel 103 is one of position inputting apparatus and is disposed on the surface of the display unit 104, and inputs coordinates of a touched position by a finger corresponding to a screen of the display unit 104. The touch panel 103 may be of any type such as a capacitive type, a resistive film type, a surface acoustic wave type, an infrared ray type, an electromagnetic induction type or the like.

The display unit 104 is, for example, a liquid crystal display (LCD) unit. The display unit 104 displays screen image data in accordance with a signal inputted thereto from the CPU 101.

The cellular communication unit 105 is coupled with the cellular antenna 110. The Wi-Fi communication unit 111 is coupled with the Wi-Fi antenna 112. The Bluetooth communication unit 113 is coupled with the Bluetooth antenna 114 and complies with the standards of Bluetooth 4.0. Each of the cellular communication unit 105, the Wi-Fi communication unit 111, and the Bluetooth communication unit 113 converts a radio signal inputted from an antenna coupled thereto into an electric signal and outputs the electric signal to the CPU 110, and converts an electric signal inputted from the CPU 110 into a radio signal and transmits the radio signal through the antenna. The cellular communication unit 105 is an electronic circuit compatible with one or plural ones of, for example, a third generation mobile communication system, a second generation mobile communication system, and a wireless communication network of a carrier such as long term evolution (LTE). In the first embodiment, the cellular communication unit 105 and the cellular antenna 110 are described supposing that they are compatible with LTE. Wi-Fi is an example of the "first wireless communication protocol." Bluetooth 4.0 is an example of the "second wireless communication protocol."

The audio inputting and outputting unit 106 is coupled with the speaker 107 as a sound outputting apparatus and the microphone 108 as a sound inputting apparatus. The audio inputting and outputting unit 106 converts a sound signal inputted thereto from the microphone 108 into an electric signal and outputs the electric signal to the CPU 101. Further, the audio inputting and outputting unit 106 converts an electric signal inputted thereto from the CPU 101 into a sound signal and outputs the sound signal to the speaker 107.

The CPU 101 develops a program stored in the ROM 102A or the nonvolatile memory 102C in the RAM 102B and executes the developed commands to perform various processes. The CPU 101 receives an input from any of the touch panel 103, the cellular communication unit 105, the audio inputting and outputting unit 106, the Wi-Fi communication unit 111, and the Bluetooth communication unit 113 and executes given processing. The CPU 101 outputs achievements of execution of the given processing to any of the storage unit 102, the display unit 104, the cellular communication unit 105, the audio inputting and outputting unit 106, the Wi-Fi communication unit 111, and the Bluetooth communication unit 113.

The power supply circuit 115 is coupled with the other hardware elements (not depicted) and supplies power from the battery 116 to the hardware elements. The battery 116 is, for example, a lithium-ion battery.

It is to be noted that the hardware configuration of the portable terminal 1A is not limited to that depicted in FIG. 3 but can be suitably subjected to a change such as addition, replacement, or deletion. For example, the portable terminal 1A may include, in addition to the components depicted in FIG. 3, a portable recording medium driving apparatus for driving a portable recording medium. The portable recording medium is, for example, a secure digital (SD) card, a micro SD card or the like. The portable terminal 1A is an example of the "portable terminal."

Figure 4:
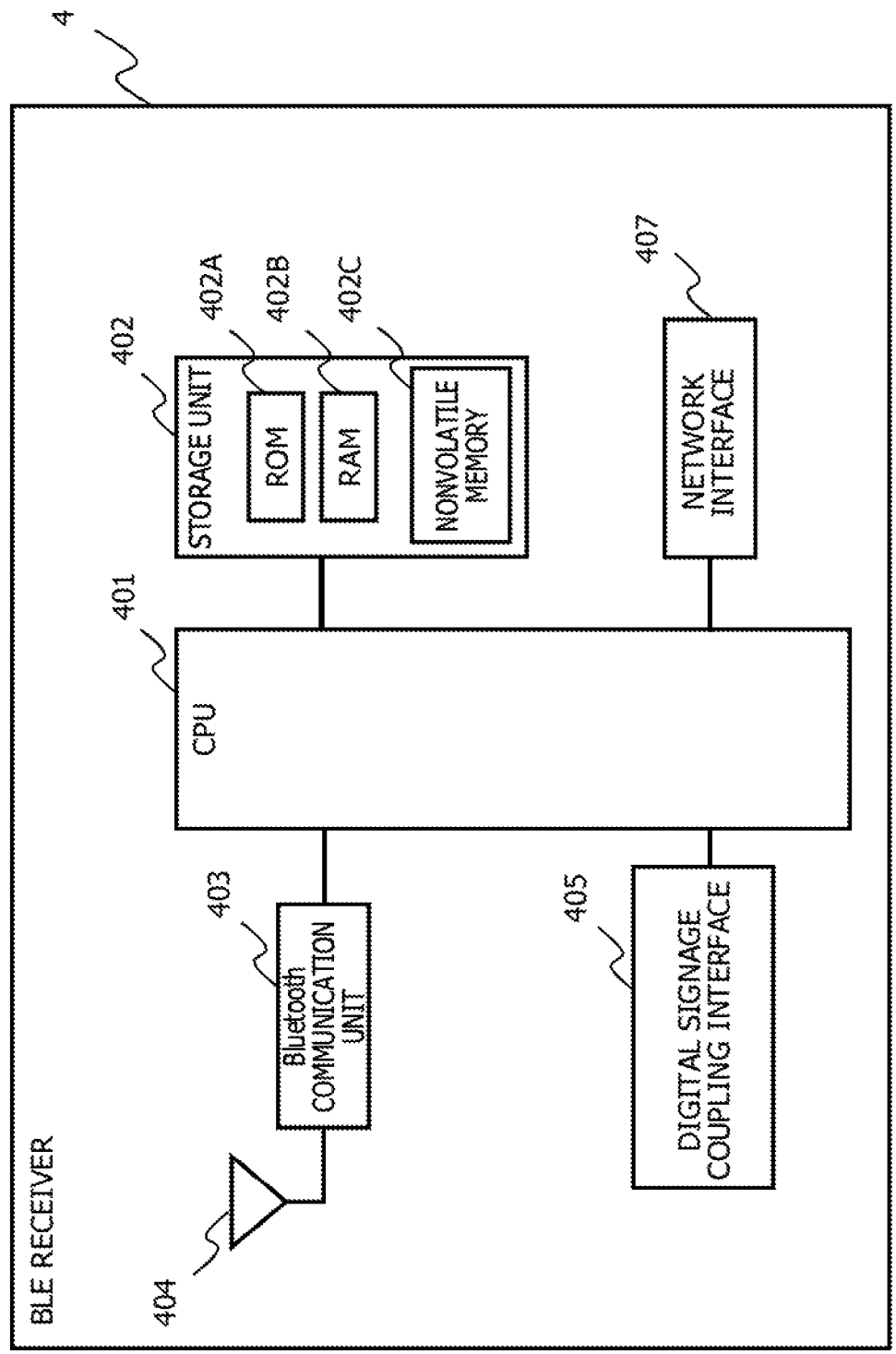
FIG. 4 is a block diagram depicting an example of a hardware configuration of a BLE receiver.

FIG. 4 is a block diagram depicting an example of a hardware configuration of the BLE receiver 4. In FIG. 4, the BLE receiver 4 as a single apparatus is supposed. The BLE receiver 4 includes a CPU 401, a storage unit 402, a Bluetooth communication unit 403, a Bluetooth antenna 404, a digital signage coupling interface 405, and a network interface 407. The storage unit 402 includes a ROM 402A, a RAM 402B, and a nonvolatile memory 402C. Description of the CPU 401, the storage unit 402, and the Bluetooth communication unit 403 is similar that of the CPU 101 and the storage unit 102 depicted in FIG. 3, and therefore, overlapping description of the same is omitted herein.

The digital signage coupling interface 405 is an interface for coupling with the digital signage 5. The digital signage coupling interface 405 is, for example, a USB interface. The network interface 407 is an interface for coupling with the LAN 50.

The hardware configuration of the BLE receiver 4 is not limited to that depicted in FIG. 4 but can be suitably subjected to a change such as addition, replacement, or deletion. For example, if the BLE receiver 4 is an apparatus of the USB memory type, then since the communication function of the digital signage 5 coupled with the BLE receiver 4 is used to couple the BLE receiver 4 with the LAN 50, the BLE receiver 4 may not include the network interface 407. Further, the BLE receiver 4 may include a Wi-Fi communication unit and a Wi-Fi antenna in place of the network interface 407 such that it may be coupled with a Wi-Fi AP by Wi-Fi to communicate with the controller 6. The BLE receiver 4 is an example of the "reception apparatus."

The hardware configuration of the BLE terminal 2 is substantially similar to that of the portable terminal 1A if the BLE terminal 2 is a wearable terminal. Where the BLE terminal 2 is an apparatus for exclusive use, the hardware configuration of the BLE terminal 2 is, for example, same as the hardware configuration of the BLE receiver 4 from which the network interface 407 and the digital signage coupling interface 405 are removed. It is to be noted that the Bluetooth communication unit provided in the BLE terminal 2 is compatible with BLE. The BLE terminal 2 is an example of the "wireless apparatus."

The hardware configuration of the Wi-Fi AP 3 includes, for example, a CPU, a RAM, a ROM, a nonvolatile memory, a Wi-Fi communication unit, a Wi-Fi antenna, and a network interface. The controller 6 is a computer for exclusive use or for universal use. The hardware configuration of the controller 6 includes, for example, a CPU, a RAM, a ROM, a nonvolatile memory, and a network interface. The controller 6 has stored in the nonvolatile memory thereof a service providing program for providing information in the service system 100. The Wi-Fi AP 3 is an example of the "wireless communication relaying apparatus." The controller 6 is an example of the "information providing apparatus."

Figure 5:
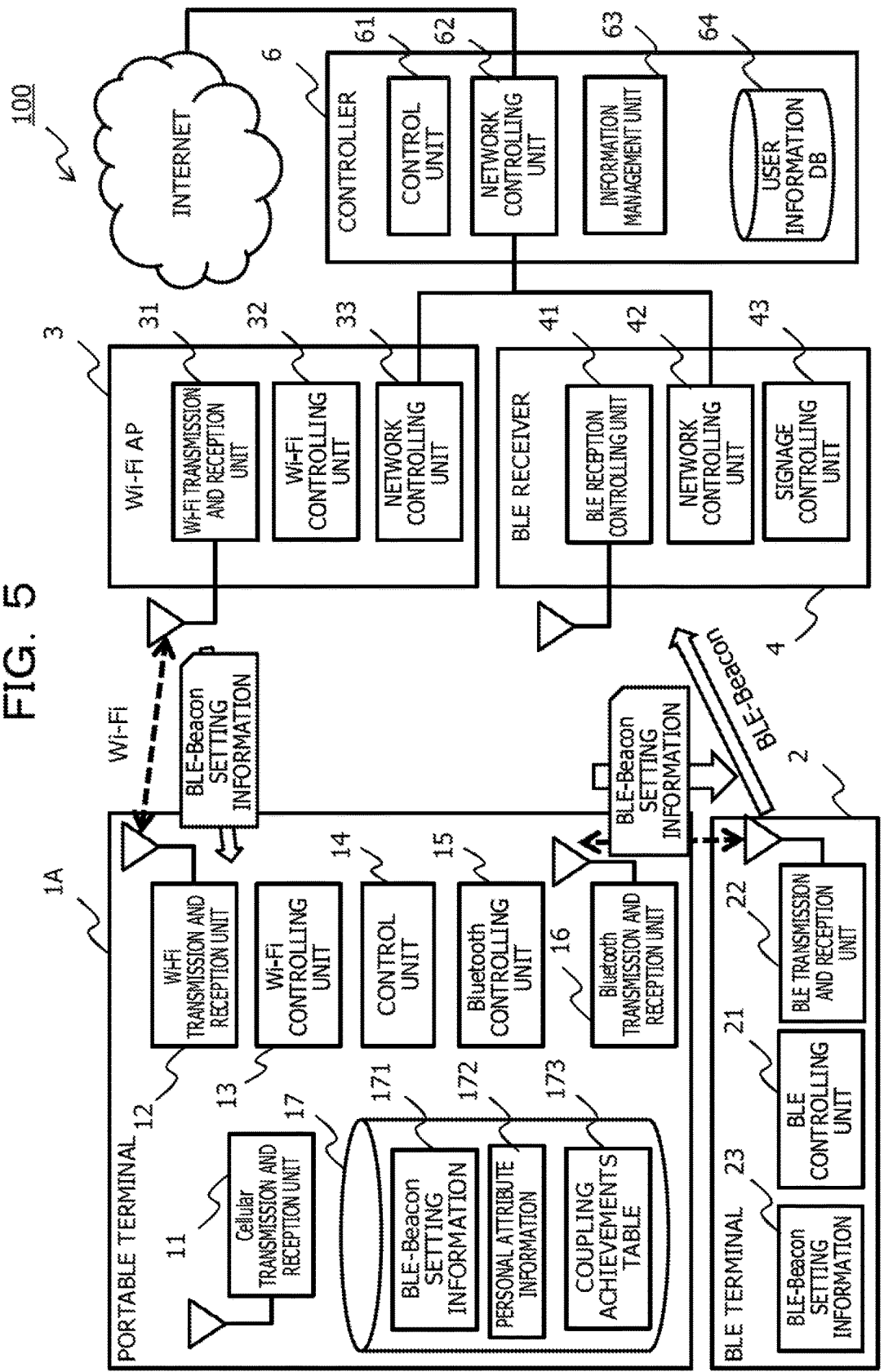
FIG. 5 is a block diagram depicting an example of a functional configuration of a service system.

FIG. 5 is a block diagram depicting an example of a functional configuration of the service system 100. The portable terminal 1A includes, as functional components thereof, a cellular transmission and reception unit 11, a Wi-Fi transmission and reception unit 12, a Wi-Fi controlling unit 13, a control unit 14, a Bluetooth controlling unit 15, a Bluetooth transmission and reception unit 16, and a database 17. The cellular transmission and reception unit 11 is a functional component corresponding to the cellular communication unit 105 and the cellular antenna 110. The Wi-Fi transmission and reception unit 12 is a functional component corresponding to the Wi-Fi communication unit 111 and the Wi-Fi antenna 112. The Bluetooth transmission and reception unit 16 is a functional component corresponding to the Bluetooth communication unit 113 and the Bluetooth antenna 114.

The Wi-Fi controlling unit 13 is a functional component that is achieved by the CPU 101 executing a module relating to Wi-Fi included in an operating system (OS). The Wi-Fi controlling unit 13 controls the Wi-Fi transmission and reception unit 12. More particularly, the Wi-Fi controlling unit 13 performs instruction to execute scanning to the Wi-Fi transmission and reception unit 12, detection of movement into and out of a communication range of the Wi-Fi AP 3 based on a reception signal of the Wi-Fi transmission and reception unit 12, relaying of data between the Wi-Fi transmission and reception unit 12 and a different functional component and so forth. If the Wi-Fi controlling unit 13 detects movement into and out of the communication range of the Wi-Fi AP 3, it issues a notification to the control unit 14. The Wi-Fi communication range is a range within which a signal from the Wi-Fi AP 3 reaches with a reception signal strength equal to or higher than a threshold value with which it is determined that coupling to the Wi-Fi AP 3 is possible.

The Bluetooth controlling unit 15 is a functional component that is achieved by the CPU 101 executing a module relating to Bluetooth including in the OS. The Bluetooth controlling unit 15 controls the Bluetooth transmission and reception unit 16. More particularly, the Bluetooth controlling unit 15 performs a process relating to establishment of coupling with a different apparatus compatible with Bluetooth, relaying of data between the Bluetooth transmission and reception unit 16 and a different functional component and so forth.

The control unit 14 is a functional component achieved by the CPU 101 executing the service enjoyment program. The control unit 14 performs starting and stopping control of origination of the BLE terminal 2 whose Bluetooth coupling is established. More particularly, when a notification of movement of the Wi-Fi AP 3 into a communication rage is received from the Wi-Fi controlling unit 13 and besides the communication range of the Wi-Fi AP 3 is compatible with the environment of a service that uses BLE, the control unit 14 performs an acquisition process of BLE beacon setting information. The BLE beacon setting information is setting information of transmission of a BLE beacon and includes identification information of the origination source of the BLE beacon such as UUID. Details of the BLE beacon setting information are hereinafter described.

After the BLE beacon setting information is acquired, the control unit 14 outputs a transmission starting instruction of a BLE beacon to the Bluetooth controlling unit 15. In the first embodiment, the control unit 14 outputs, as the transmission starting instruction of a BLE beacon, a BLE beacon setting information rewriting notification for instructing rewriting of the BLE beacon setting information. The BLE beacon setting information rewriting notification includes BLE beacon setting information.

It is to be noted that the control unit 14 may output a message for transmission starting instruction of a BLE beacon and a BLE beacon setting information rewriting notification to the Bluetooth controlling unit 15. The BLE beacon setting information rewriting notification is transmitted to the BLE terminal 2 through the Bluetooth controlling unit 15 and the Bluetooth transmission and reception unit 16 via Bluetooth.

Further, if a notification of cutting of coupling to the Wi-Fi AP 3 is received from the Wi-Fi controlling unit 13, then the control unit 14 outputs a transmission stopping instruction of a BLE beacon to the Bluetooth controlling unit 15. In the first embodiment, the control unit 14 outputs, as the transmission stopping instruction of a BLE beacon, a BLE beacon setting information rewriting notification including blank BLE beacon setting information. It is to be noted that the control unit 14 may otherwise output a message for transmission stopping instruction of a BLE beacon to the Bluetooth controlling unit 15. Further, if a notification of cutting of coupling to the Wi-Fi AP 3 is received from the Wi-Fi controlling unit 13, then the control unit 14 deletes BLE beacon setting information 171 in the database 17. The control unit 14 is an example of the "control unit" of the "portable terminal."

The database 17 is a functional component corresponding to the nonvolatile memory 102C. The database 17 has BLE beacon setting information 171, personal attribute information 172, and a coupling achievements table 173 stored therein. The BLE beacon setting information 171 is BLE beacon setting information acquired and stored via Wi-Fi. In the first embodiment, the BLE beacon setting information 171 is deleted if coupling to the Wi-Fi AP 3 is cut. However, the BLE beacon setting information 171 may not be deleted in this manner.

The personal attribute information 172 is information relating to an attribute of the user of the portable terminal 1A. More particularly, the personal attribute information 172 includes a user name, a sex, a used language, an age of the user, a mail address and so forth. In the first embodiment, the personal attribute information 172 is inputted and stored through the touch panel 103 by the user upon coupling with the Wi-Fi AP 3 for the first time. Upon coupling with the Wi-Fi AP 3 for the second and later times, the personal attribute information 172 is read out from the database 17. The personal attribute information 172 is outputted from the control unit 14 through the Wi-Fi controlling unit 13 and the Wi-Fi transmission and reception unit 12 and is transmitted to the controller 6 via Wi-Fi. The personal attribute information 172 is an example of the "attribute information of a user."

The coupling achievements table 173 is a table in which information relating to the Wi-Fi AP 3 having achievements of coupling is stored. In the first embodiment, upon coupling with the Wi-Fi AP 3 registered in the coupling achievements table 173, since the coupling with the Wi-Fi AP 3 is coupling for the second or later time, the personal attribute information 172 is read out from the database 17. Details of the coupling achievements table 173 are hereinafter described.

Next, the BLE terminal 2 includes, as functional components thereof, a BLE controlling unit 21, a BLE transmission and reception unit 22, and BLE beacon setting information 23. The BLE transmission and reception unit 22 corresponds to a Bluetooth communication unit and a Bluetooth antenna.

The BLE controlling unit 21 is a functional component that is achieved by the CPU executing the OS installed in the BLE terminal 2. The BLE controlling unit 21 controls the BLE transmission and reception unit 22. More particularly, the BLE controlling unit 21 performs control for coupling establishment with a different Bluetooth apparatus, control for processing of origination of a BLE beacon signal from the BLE transmission and reception unit 22 and so forth. For example, the BLE controlling unit 21 performs a process for coupling establishment with the portable terminal 1A.

Further, if a transmission starting instruction of a BLE beacon is received from the portable terminal 1A, then the BLE controlling unit 21 stores BLE beacon setting information included in the transmission starting instruction of a BLE beacon into the nonvolatile memory and generates a BLE beacon and then instructs the BLE transmission and reception unit 22 to start transmission of a BLE beacon. It is to be noted that, in the first embodiment, as the transmission starting instruction of a BLE beacon, a BLE beacon setting information rewriting notification including the BLE beacon setting information is issued from the portable terminal 1A to the BLE terminal 2. The BLE beacon is transmitted, for example, in a cycle of 100 millisecond (ms). The BLE beacon includes, for example, a UUID, Major, Minor, a transmission received signal strength indicator (RSSI) and so forth. The BLE beacon is an example of the "signal of a second wireless communication protocol including identification information."

Further, if a transmission stopping instruction of a BLE beacon is received from the portable terminal 1A, then the BLE controlling unit 21 instructs the BLE transmission and reception unit 22 to stop the transmission of a BLE beacon and deletes the BLE beacon setting information 23 stored in the nonvolatile memory. It is to be noted that, in the first embodiment, as the transmission stopping instruction of a BLE beacon, a BLE beacon setting information rewriting notification including blank BLE beacon setting information is issued from the portable terminal 1A to the BLE terminal 2. The BLE controlling unit 21 overwrites the blank BLE beacon setting information into the BLE beacon setting information 23 thereby to delete the BLE beacon setting information. The nonvolatile memory of the BLE terminal 2 is an example of the "storage unit" of the "wireless apparatus."

The Wi-Fi AP 3 includes, as functional components thereof, a Wi-Fi transmission and reception unit 31, a Wi-Fi controlling unit 32, and a network controlling unit 33. The Wi-Fi transmission and reception unit 31 corresponds to a Wi-Fi antenna and a circuit for Wi-Fi processing. Each of the Wi-Fi controlling unit 32 and the network controlling unit 33 is a functional component achieved by the CPU of the Wi-Fi AP 3 executing the OS. The Wi-Fi controlling unit 32 performs relaying between the network controlling unit 33 and the Wi-Fi transmission and reception unit 31. The network controlling unit 33 performs relaying between an interface with the LAN 50 and the Wi-Fi controlling unit 32.

The BLE receiver 4 includes, as functional components thereof, a BLE reception controlling unit 41, a network controlling unit 42, and a signage controlling unit 43. Each of the BLE reception controlling unit 41, the network controlling unit 42, and the signage controlling unit 43 is a function achieved by the CPU 401 executing the OS.

The BLE reception controlling unit 41 controls the Bluetooth communication unit 403. More particularly, the BLE reception controlling unit 41 controls the reception function of the Bluetooth communication unit 403 to an on state while the BLE receiver 4 is operative. In the first embodiment, the Bluetooth communication unit 403 normally keeps the reception function in an on state. If a BLE beacon from the portable terminal 1A is received by the Bluetooth communication unit 403, then the BLE reception controlling unit 41 extracts BLE beacon information from the received BLE beacon and transmits the BLE beacon information to the controller 6 through the network controlling unit 42. The BLE beacon information includes, for example, identification information such as a UUID included in the BLE beacon.

The network controlling unit 42 performs relaying among the network interface 407, the BLE reception controlling unit 41, and the signage controlling unit 43. The signage controlling unit 43 controls the digital signage coupling interface 405 to control communication with the digital signage 5.

The controller 6 includes, as functional components thereof, a control unit 61, a network controlling unit 62, an information management unit 63, and a user information database 64. The network controlling unit 62 is a function that is achieved by the CPU executing the OS. The network controlling unit 62 controls network interfacing.

The control unit 61 and the information management unit 63 are functional components achieved by the CPU executing the service providing program stored in the nonvolatile memory. The control unit 61 receives personal attribute information and BLE beacon information from the portable terminal 1A and the BLE receiver 4, respectively, through the network controlling unit 62. The control unit 61 generates BLE beacon setting information corresponding to the personal attribute information received from the portable terminal 1A and transmits the generated BLE beacon setting information to the portable terminal 1A through the network controlling unit 62 via Wi-Fi. The control unit 61 outputs the generated BLE beacon setting information and the received personal attribute information to the information management unit 63.

The control unit 61 decides whether or not the identification information such as a UUID included in the BLE beacon information received from the BLE receiver 4 is registered in the user information database (DB) 64. The control unit 61 passes the identification information such as a UUID included in the BLE beacon information to the information management unit 63 and requests the information management unit 63 to perform a search of the user information DB 64.

If the identification information such as a UUID included in the received BLE beacon information is registered in the user information DB 64, then the control unit 61 reads out personal attribute information corresponding to the identification information such as a UUID from the user information DB 64 through the information management unit 63. The control unit 61 reads out given information in accordance with the read out personal attribute information from the database (not depicted) and transmits the read out given information to the portable terminal 1A or/and the BLE receiver 4 through the network controlling unit 62.

The user information DB 64 is created in the nonvolatile memory through execution of the service providing program by the CPU. The user information DB 64 retains therein BLE beacon setting information and the personal attribute information of the portable terminal 1A from which the BLE beacon setting information is obtained in an associated relationship with each other. In the user information DB 64, a personal attribute information table and a BLE beacon setting information table hereinafter described are placed. The user information DB 64 is an example of the "storage unit" of the "information providing apparatus."

FIG. 6 is a view illustrating an example of information included in the BLE beacon setting information. The BLE beacon setting information includes, for example, UUID, Major, Minor, RSSI, and transmission period. The UUID is an identification number of 128 bits unique to an organization. Major and Minor are identification numbers of 16 bits and indicate middle classification and small classification in the organization of the UUID, respectively. For example, in a shopping mole, UUID, Major, and Minor are used for identification of the shopping mole, identification of a shop in the shopping mole, and identification of a BLE transmitter in the shop, respectively. In particular, in the first embodiment, the combination of UUID, Major, and Minor is identification information of the origination source of the BLE beacon. Further, in the first embodiment, since combinations of UUID, Major, and Minor different from each other are distributed for different pieces of personal attribute information, each combination of UUID, Major, and Minor has an implication as identification information of the user of the portable terminal 1A.

The RSSI is a reception signal strength and designates an origination signal strength of a BLE beacon of the BLE terminal 2. The transmission period is a destination of a transmission period of the BLE beacon.

In the first embodiment, the BLE beacon setting information illustrated in FIG. 6 is issued as a notification from the controller 6 to the portable terminal 1A and stored as BLE beacon setting information 171 into the database 17 of the portable terminal 1A. Further, the BLE beacon setting information is issued as a notification from the portable terminal 1A to the BLE terminal 2 and stored into the nonvolatile memory of the BLE terminal 2. Further, the BLE beacon setting information illustrated in FIG. 6 is stored also into the user information DB 64 of the controller 6. It is to be noted that the information included in the BLE beacon setting information is not limited to that illustrated in FIG. 6.

FIG. 7 illustrates an example of the coupling achievements table 173 of the portable terminal 1A. The coupling achievements table 173 retains information relating to the Wi-Fi AP 3 having coupling achievements of the portable terminal 1A. Entries of the coupling achievements table 173 include items of extended service set identifier (ESSID), basic service set identifier (BSSID), and BLE service of the Wi-Fi AP 3.

ESSID is a network identifier in Wi-Fi. ESSID is represented by 32 alphanumerical characters in the maximum. BSSID is a numerical value of 48 bits and is usually set to a value equal to a media access control (MAC) address of the Wi-Fi AP 3. ESSID and BSSID are included in a Wi-Fi beacon originated from the Wi-Fi AP 3, and the portable terminal 1A acquires ESSID and BSSID from the Wi-Fi beacon.

BLE service is information indicative of a BLE service within a communication range of the Wi-Fi AP 3. In the first embodiment, in the item of BLE service, one of values of 0, 1, 2, and 3 is placed. In the first embodiment, where "0" is placed in the item of BLE service, this indicates that the BLE service is not performed in the communication range of the Wi-Fi AP 3. Where "1" is placed in the item of BLE service, this indicates that a BLE transmission service in which the system side acts as the transmission side is performed in the communication range of the Wi-Fi AP 3. Where "2" is placed in the item of BLE service, this indicates that a BLE reception service in which the system side acts as the reception side is performed in the communication range of the Wi-Fi AP 3. Where "3" is placed in the item of BLE service, this indicates that both of the BLE transmission service and the BLE reception service are performed in the communication range of the Wi-Fi AP 3.

The value placed in the item of BLE service is included in a BLE environment notification issued from the Wi-Fi AP 3 upon establishment of coupling with the Wi-Fi AP 3. It is to be noted that the definition of the values placed in BLE service depicted in FIG. 7 is an example and is not limited to this.

FIG. 8 illustrates an example of the personal attribute information table included in the user information database 64 of the controller 6. The personal attribute information table retains personal attribute information of the portable terminal 1A which utilizes a service provided by the service system 100. The personal attribute information table includes terminal identification information of the portable terminal 1A and personal attribute information. For the terminal identification information of the portable terminal 1A, for example, a MAC address of the portable terminal 1A is used. The personal attribute information is transmitted from the portable terminal 1A to the controller 6 upon establishment of coupling with the Wi-Fi AP 3. In the example illustrated in FIG. 8, the personal attribute information includes a user name, a sex, a nationality, a used language, an age of the user, and a mail address. However, the information included in the personal attribute information is not limited to those illustrated in FIG. 8.

FIG. 9 illustrates an example of the BLE beacon setting information table included in the user information database 64 of the controller 6. The BLE beacon setting information table retains BLE beacon setting information outputted from the controller 6 to the portable terminal 1A that utilizes a service provided by the service system 100.

The BLE beacon setting information table includes terminal identification information of the portable terminal 1A and BLE beacon setting information outputted from the portable terminal 1A. As the terminal identification information of the portable terminal 1A, information of a type similar to that of terminal identification information used in the personal attribute information table is used. In the BLE beacon setting information of the BLE beacon setting information table, in the example illustrated in FIG. 9, UUID, Major, Minor, RSSI, and transmission period are placed.

The personal attribute information table and the BLE beacon setting information table are tied with each other by terminal identification information. It is to be noted that, in place of the personal attribute information table and the BLE beacon setting information table, a table including terminal identification information, a personal attribute information table, and BLE beacon setting information may be stored.

<Flow of Processing>

Figure 10B:
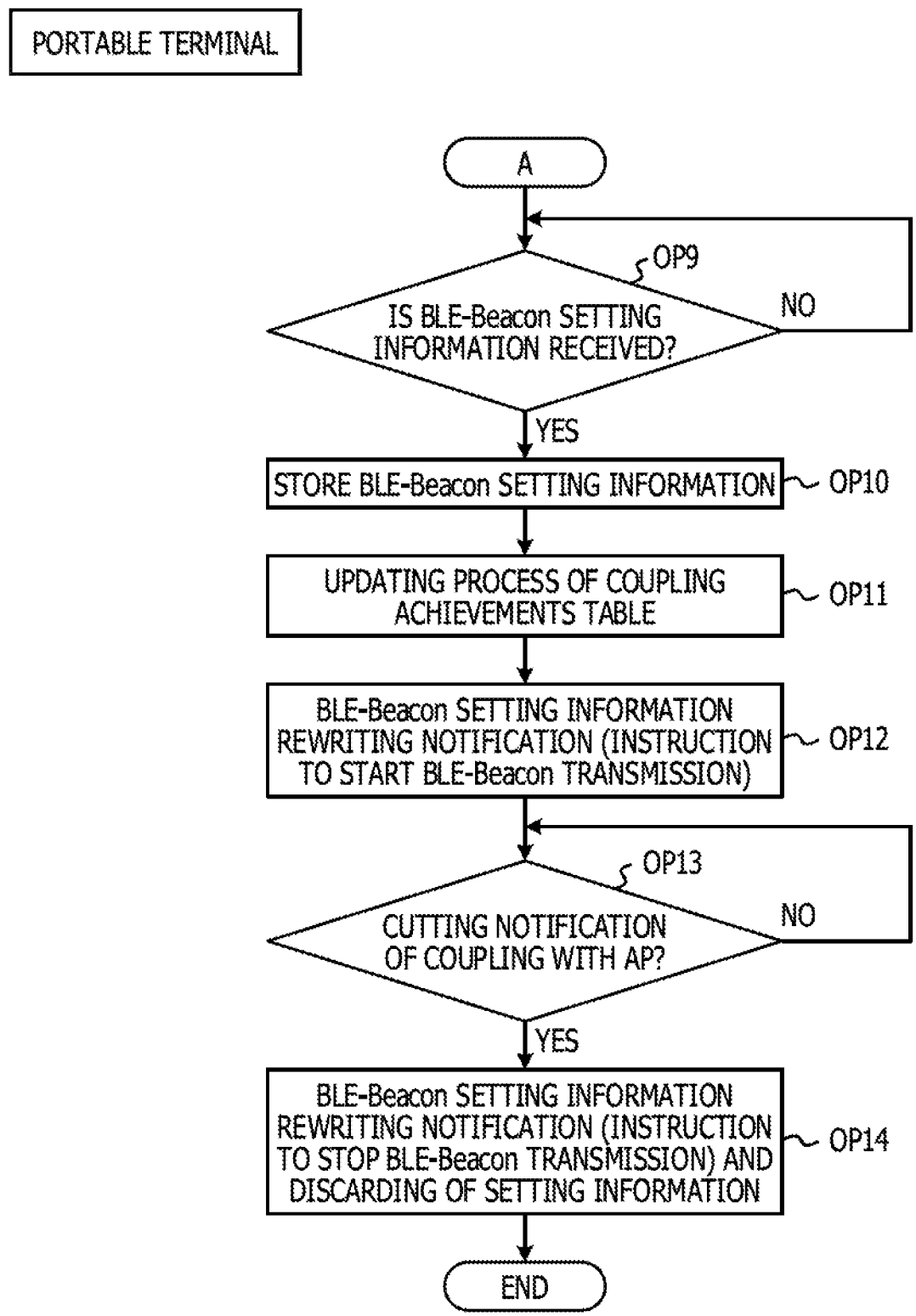
FIG. 10B depicts an example of a flow chart of processing of the control unit of the portable terminal.

FIGS. 10A and 10B depict an example of a flow chart of processing of the control unit 14 of the portable terminal 1A. The processing illustrated in FIGS. 10A and 10B is started when the control unit 14 is notified of establishment of coupling with the Wi-Fi AP 3 from the Wi-Fi controlling unit 13. It is to be noted that, although the subject of the processing illustrated in FIGS. 10A and 10B is the CPU 101 that executes the service enjoyment program, for the convenience of description, the description is given supposing that the subject is the control unit 14 that is a functional component achieved by the CPU 101 executing the service enjoyment program.

At OP1, the control unit 14 is in a waiting state for reception of a notification of completion of establishment of coupling with the Wi-Fi AP 3 from the Wi-Fi controlling unit 13. If a notification of completion of establishment of coupling with the Wi-Fi AP 3 is received from the Wi-Fi controlling unit 13 (OP1: YES), then the processing advances to OP2.

At OP2, the control unit 14 waits for reception of a BLE environment notification from the Wi-Fi AP 3. If the control unit 14 receives a BLE environment notification from the Wi-Fi AP 3 through the Wi-Fi controlling unit 13 (OP2: YES), then the processing advances to OP4. For example, if a BLE environment notification is not received even if a given period of time elapses after completion of coupling establishment to the Wi-Fi AP 3 (OP2: NO), then the processing advances to OP3.

At OP3, since a BLE environment notification is not received and it is indicated that a BLE service is not performed within the communication range of the Wi-Fi AP 3 with which coupling is established, the control unit 14 updates the coupling achievements table 173. In particular, the control unit 14 places "0" into the item of BLE service of the entry of the Wi-Fi AP 3 during coupling in the coupling achievements table 173. Thereafter, the processing illustrated in FIG. 10A is ended.

At OP4, since a BLE environment notification is received, the control unit 14 searches the coupling achievements table 173 with the BSSID of the Wi-Fi AP 3. If the BSSID of the Wi-Fi AP 3 is included in the coupling achievements table 173, namely, if the portable terminal 1A has achievements of coupling with the Wi-Fi AP 3, then the processing advances to OP6. However, if the BSSID of the Wi-Fi AP 3 is not included in the coupling achievements table 173, namely, if the portable terminal 1A does not have achievements of coupling with the Wi-Fi AP 3 (OP5: NO), then the processing advances to OP7.

At OP6, since the portable terminal 1A has achievements of coupling with the Wi-Fi AP 3, the control unit 14 reads in the personal attribute information 172 from the database 17. At OP7, since the portable terminal 1A does not have achievements of coupling with the Wi-Fi AP 3, the control unit 14 controls the display unit 104 to display an input screen image of personal attribute information. If the inputting of the personal attribute information from the user is completed, then the control unit 14 stores the inputted personal attribute information into the database 17.

At OP8, the control unit 14 transmits the personal attribute information to the controller 6 through the Wi-Fi controlling unit 13 and the Wi-Fi transmission and reception unit 12 via Wi-Fi.

At OP9 of FIG. 10B, the control unit 14 waits for reception of BLE beacon setting information through the Wi-Fi controlling unit 13. If the control unit 14 receives BLE beacon setting information (OP9: YES), then the processing advances to OP10.

At OP10, the control unit 14 stores the BLE beacon setting information into the database 17. At OP11, the control unit 14 updates the coupling achievements table 173. The contents of updating of the coupling achievements table 173 are, for example, where an entry of the Wi-Fi AP 3 with which the coupling is completed at OP1 is not created as yet, creation of an entry of the Wi-Fi AP 3 and setting of a value, whose notification is included in the BLE environment notification received at OP2, to the item of BLE service.

At OP12, the control unit 14 outputs a BLE beacon setting information rewriting notification to the Bluetooth controlling unit 15. The BLE beacon setting information rewriting notification transmitted at OP12 includes the BLE beacon setting information received at OP9. The BLE beacon setting information rewriting notification in which the BLE beacon setting information is included is a BLE beacon transmission starting instruction to the BLE terminal 2. The BLE beacon setting information rewriting notification is transmitted from the Bluetooth controlling unit 15 to the BLE terminal 2 through the Bluetooth transmission and reception unit 16 via Bluetooth. Thereafter, transmission of a BLE beacon from the BLE terminal 2 is started.

At OP13, the control unit 14 waits for reception of a cutting notification of coupling with the Wi-Fi AP 3 from the Wi-Fi controlling unit 13. If the control unit 14 receives a cutting notification of coupling with the Wi-Fi AP 3 from the Wi-Fi controlling unit 13 (OP13: YES), then the processing advances to OP14.

At OP14, the control unit 14 outputs a BLE beacon setting information rewriting notification to the Bluetooth controlling unit 15. The BLE beacon setting information rewriting notification includes blank BLE beacon setting information. The BLE beacon setting information rewriting notification in which the blank BLE beacon setting information is included is a BLE beacon transmission stopping instruction to the BLE terminal 2. The BLE beacon setting information rewriting notification is transmitted from the Bluetooth controlling unit 15 to the BLE terminal 2 through the Bluetooth transmission and reception unit 16 via Bluetooth. Thereafter, transmission of a BLE beacon from the BLE terminal 2 is stopped.

At OP14, the control unit 14 deletes the BLE beacon setting information 171 placed in the database 17. Thereafter, the processing illustrated in FIG. 10B is ended.

It is to be noted that the processing illustrated in FIGS. 10A and 10B is an example, and the execution order or the like may be suitably changed depending upon an embodiment. For example, the updating process of the coupling achievement table at OP11 may be executed at any time after the decision of the achievements of coupling of the Wi-Fi AP 3 at OP5 to OP11. Further, at OP12 and OP14, a message of an instruction to start BLE beacon transmission or to stop the BLE beacon transmission may be transmitted in addition to the BLE beacon setting information.

Figure 11:
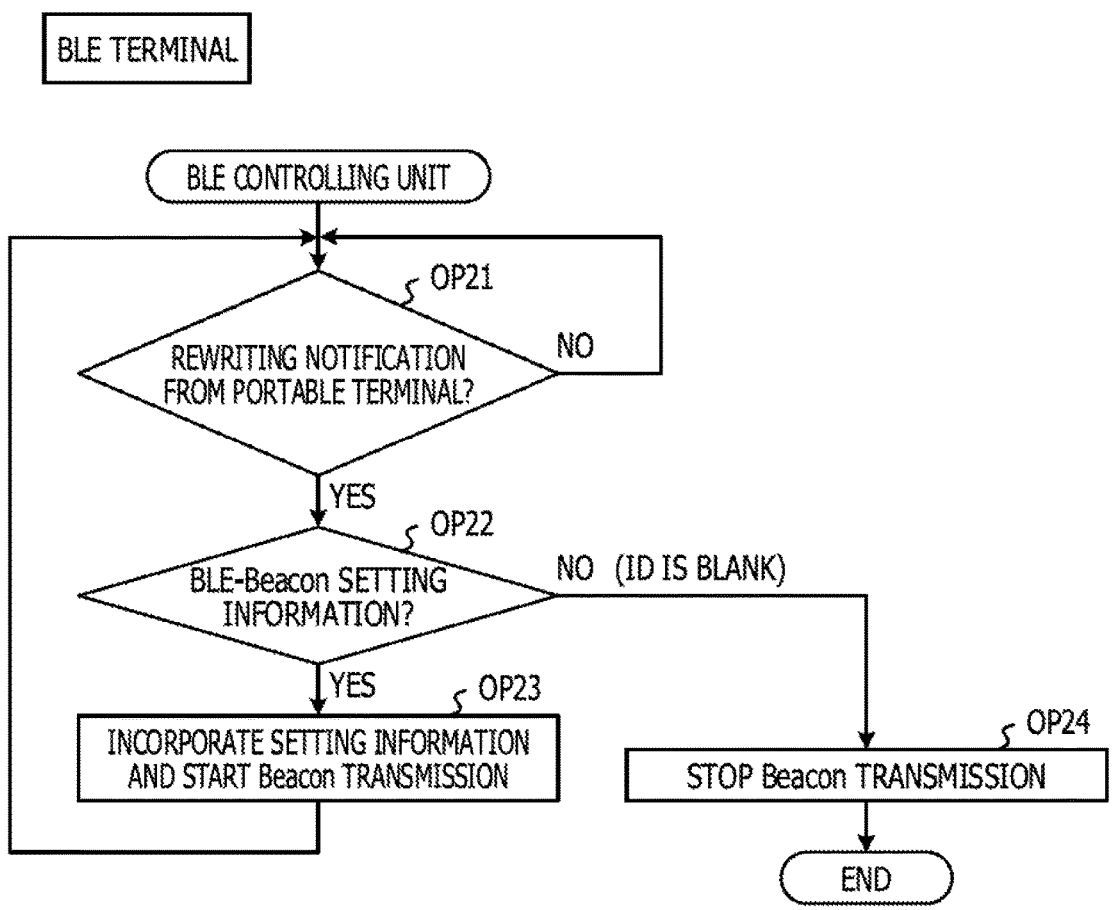
FIG. 11 depicts an example of a flow chart of processing of a BLE controlling unit of a BLE terminal.

FIG. 11 depicts an example of a flow chart of processing of the BLE controlling unit 21 of the BLE terminal 2. The processing illustrated in FIG. 11 is started when coupling between the BLE terminal 2 and the portable terminal 1A is established. It is to be noted that, although the subject of the processing illustrated in FIG. 11 is the CPU of the BLE terminal 2, for the convenience of description, the description is given supposing that the subject is the BLE controlling unit 21 that is a functional component of the BLE terminal 2.

At OP21, the BLE controlling unit 21 waits for reception of a BLE beacon setting information rewriting notification from the portable terminal 1A. When the BLE controlling unit 21 receives a BLE beacon setting information rewriting notification from the portable terminal 1A through the BLE transmission and reception unit 22 (OP21: YES), then the processing advances to OP22.

At OP22, the BLE controlling unit 21 confirms BLE beacon setting information included in the received BLE beacon setting information rewriting notification. If the BLE beacon setting information included in the received BLE beacon setting information rewriting notification is blank (OP22: NO), then the processing advances to OP24. If the BLE beacon setting information included in the BLE beacon setting information rewriting notification is not blank (OP22: YES), then the processing advances to OP23.

At OP23, since the BLE beacon setting information rewriting notification whose BLE beacon setting information is not blank is a BLE beacon transmission starting instruction, the BLE controlling unit 21 instructs the BLE transmission and reception unit 22 to start transmission of a BLE beacon including the BLE beacon setting information. Further, the BLE controlling unit 21 places the BLE beacon setting information into the nonvolatile memory. Thereafter, the processing advances to OP21.

At OP24, since the BLE beacon setting information rewriting notification whose BLE beacon setting information is blank is a BLE beacon transmission stopping instruction, the BLE controlling unit 21 instructs the BLE transmission and reception unit 22 to stop transmission of a BLE beacon. Further, the BLE controlling unit 21 deletes the BLE beacon setting information 23 in the nonvolatile memory. Thereafter, the processing illustrated in FIG. 11 is ended.

Figure 12:
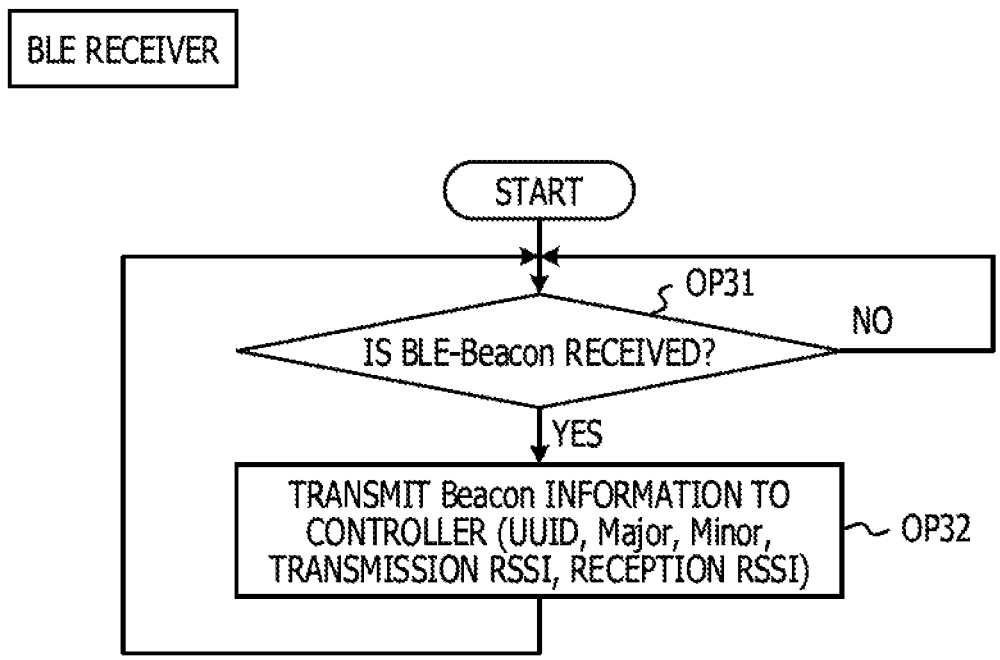
FIG. 12 depicts an example of a flow chart of processing of a BLE receiver.

FIG. 12 depicts an example of a flow chart of processing of the BLE receiver 4. The processing illustrated in FIG. 12 is started in response to activation of the BLE receiver 4 and is repetitively executed while the BLE receiver 4 operates. It is to be noted that, although the subject of the processing illustrated in FIG. 12 is the CPU 401 of the BLE receiver 4, for the convenience of description, the description is given supposing that the subject is the BLE reception controlling unit 41 that is a functional component of the BLE receiver 4.

At OP31, the BLE reception controlling unit 41 waits for reception of a BLE beacon. If the BLE reception controlling unit 41 receives a BLE beacon (OP31: YES), then the processing advances to OP32.

At OP32, the BLE reception controlling unit 41 extracts BLE beacon information from the received BLE beacon and transmits the BLE beacon information to the controller 6 through the network controlling unit 42. The BLE beacon information includes, for example, UUID, Major, Minor, transmission RSSI, and reception RSSI. Thereafter, the processing advances to OP31.

Figure 13:
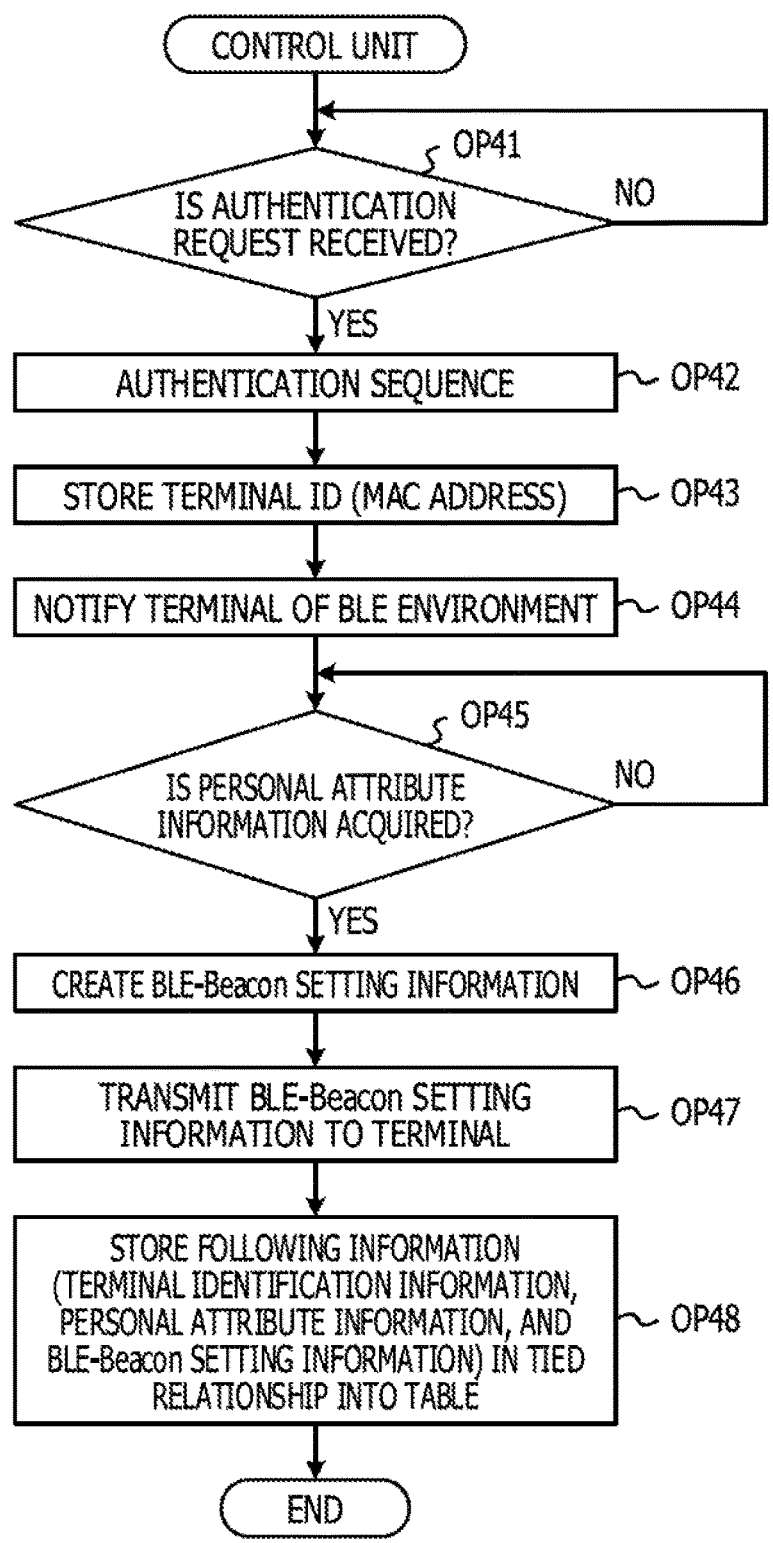
FIG. 13 depicts an example of a flow chart of processing of a control unit of a controller when a portable terminal is coupled with a Wi-Fi access point (AP)

FIG. 13 depicts an example of a flow chart of processing of the control unit 61 of the controller 6 when the portable terminal 1A is coupled with the Wi-Fi AP 3. The processing illustrated in FIG. 13 is started in response to activation of the controller 6 and is repetitively executed while the controller 6 operates. Although the subject of the process of FIG. 13 is the CPU of the controller 6, for the convenience of description, the description is given supposing that the subject is the control unit 61 that is a functional component of the controller 6.

At OP41, the control unit 61, which includes a function as an authentication server of Wi-Fi, waits for reception of an authentication request of the portable terminal 1A. If the control unit 61 receives an authentication request of the portable terminal 1A via the Wi-Fi AP 3 through the network controlling unit 62 (OP41: YES), then the processing advances to OP42.

At OP42, the control unit 61 performs an authentication sequence of the portable terminal 1A. At OP43, the control unit 61 stores terminal identification information of the portable terminal 1A into the user information DB 64 through the information management unit 63. More particularly, the terminal identification information of the portable terminal 1A is registered into the personal attribute information table and the BLE beacon setting information table. The terminal identification information of the portable terminal 1A is, for example, a MAC address of the portable terminal 1A and can be acquired through the authentication sequence.

At OP44, the control unit 61 transmits a BLE environment notification to the portable terminal 1A. The BLE environment notification includes information about whether a BLE service is in execution and, where a BLE service is in execution, which one of a BLE transmission service, a BLE reception service, and both of the services the service is. The BLE environment notification is outputted from the control unit 61 to the network controlling unit 62 and is delivered to the portable terminal 1A through the Wi-Fi AP 3 via Wi-Fi.

At OP45, the control unit 61 waits for reception of personal attribute information from the portable terminal 1A. If the control unit 61 receives personal attribute information from the portable terminal 1A through the network controlling unit 62 (OP45: YES), then the processing advances to OP46.

At OP46, the control unit 61 creates BLE beacon setting information. The BLE beacon setting information includes, for example, UUID, Major, Minor, RSSI, and transmission period. For example, as UUID, a unique to the service system 100 is used. Major and Minor are determined such that they exhibit no overlapping with the other portable terminal 1A in the service system 100. As RSSI and transmission period, for example, values determined in advance in response to a BLE service in the Wi-Fi AP 3 are set.

At OP47, the control unit 61 transmits the BLE beacon setting information to the portable terminal 1A. The BLE beacon setting information is outputted from the control unit 61 to the network controlling unit 62 and is delivered to the portable terminal 1A through the Wi-Fi AP 3 via Wi-Fi.

At OP48, the control unit 61 stores the terminal identification information, BLE beacon setting information, and personal attribute information in a tied relationship with each other into the user information DB 64 through the information management unit 63. More particularly, the control unit 61 places the terminal identification information and the BLE beacon setting information in an associated relationship into the BLE beacon setting information. The control unit 61 places the terminal identification information and the personal attribute information in an associated relationship with each other into the personal attribute information table. Thereafter, the processing illustrated in FIG. 13 is ended.

In FIG. 13, a case is supposed in which the controller 6 serves also as an authentication server. However, the controller 6 is not limited to this, and even where the controller 6 does not serve also as an authentication server, the controller 6 may transmit BLE beacon setting information when it receives a notification of coupling with the portable terminal 1A from an authentication server.

Figure 14:
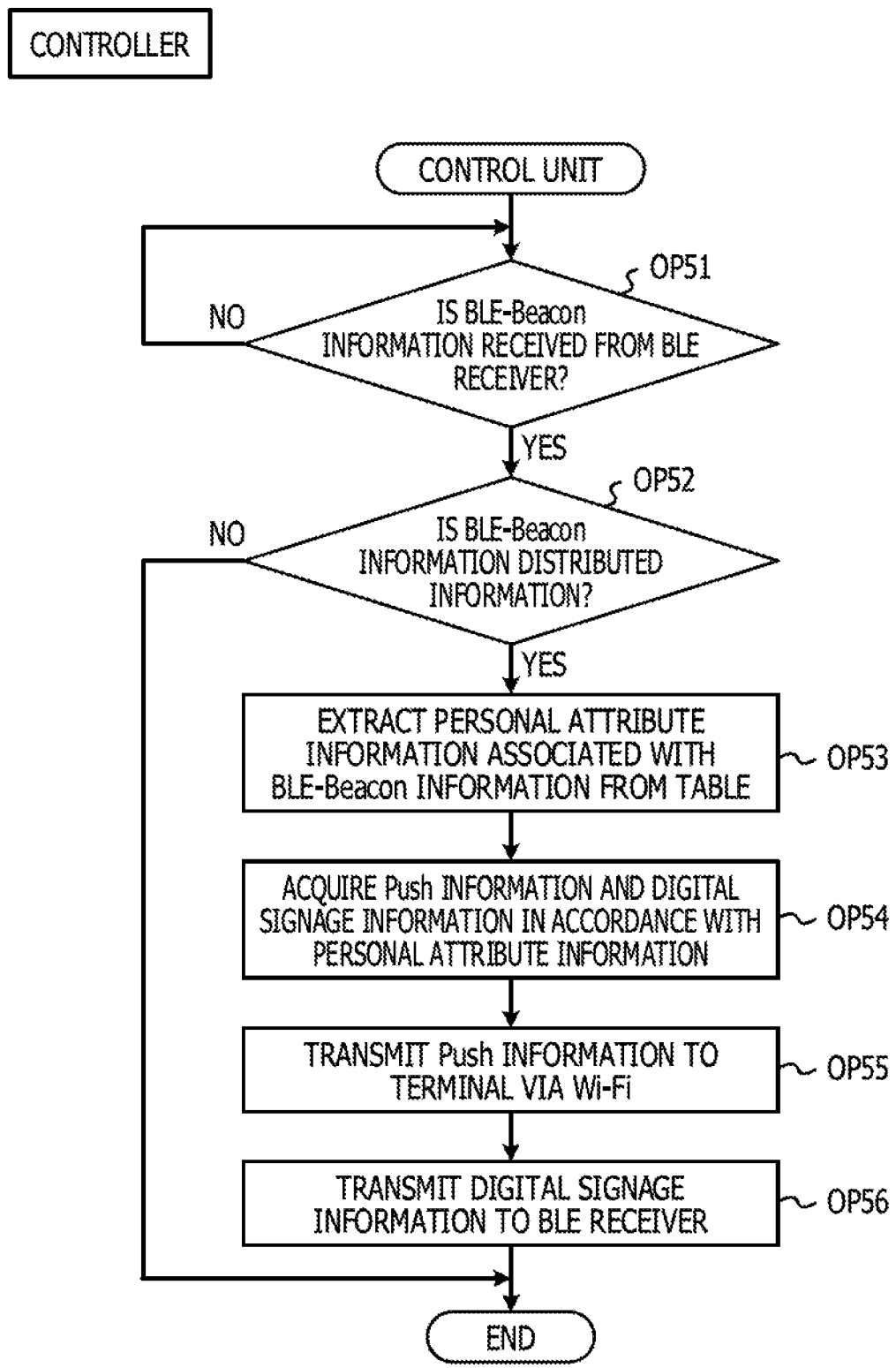
FIG. 14 depicts an example of a flow chart of processing of a control unit of a controller when BLE information of a portable terminal is received from a BLE receiver.

FIG. 14 depicts an example of a flow chart of processing of the control unit 61 of the controller 6 when BLE information of the portable terminal 1A is received from the BLE receiver 4. The processing illustrated in FIG. 14 is started in response to activation of the controller 6 and is repetitively executed while the controller 6 operates. Although the subject of the processing of FIG. 14 is the CPU of the controller 6, for the convenience of description, the description is given supposing that the subject is the control unit 61 that is a functional component of the controller 6.

At OP51, the control unit 61 waits for reception of BLE beacon information. If the control unit 61 receives BLE beacon information from the BLE receiver 4 through the network controlling unit 62 (OP51: YES), then the processing advances to OP52.

At OP52, the control unit 61 decides on the basis of the BLE beacon setting information table whether or not identification information such as a UUID included in the received BLE beacon information is same as the distributed BLE beacon setting information. If the identification information such as a UUID included in the received BLE beacon information is same as the distributed BLE beacon setting information (OP52: YES), then the processing advances to OP53. If the identification information such as a UUID included in the received BLE beacon information is not same as the distributed BLE beacon setting information (OP52: NO), then the processing illustrated in FIG. 14 is ended.

At OP53, the control unit 61 acquires personal attribute information associated with the BLE beacon setting information whose identification information such as a UUID coincides with the received BLE beacon information from the user information database 64. More particularly, the control unit 61 acquires terminal identification information corresponding to the BLE beacon setting information, which coincides with the identification information such as a UUID included in the received BLE beacon information, from the BLE beacon setting information table, and acquires personal attribute information associated with the terminal identification information in the personal attribute information table.

At OP54, the control unit 61 acquires push information and digital signage information in accordance with the acquired personal attribute information from the databases (not depicted). The push information is information of which the portable terminal 1A is notified by push notification. The digital signage information is information outputted from the digital signage 5.

At OP55, the control unit 61 outputs the acquired push information through the network controlling unit 62. The push information is transmitted from the Wi-Fi AP 3 to the portable terminal 1A via Wi-Fi.

At OP56, the control unit 61 outputs the acquired digital signage information through the network controlling unit 62. The digital signage information is transmitted to the BLE receiver 4 through the LAN 50 and is outputted as an image or sound by the digital signage 5 with which the BLE receiver 4 is coupled. Thereafter, the processing illustrated in FIG. 14 is ended.

It is to be noted that the processing illustrated in FIG. 14 is an example, and the processing of the controller 6 is not limited to this. Although, in FIG. 14, it is supposed that push notification of the portable terminal 1A and display of information on the digital signage 5 are performed, the processes at OP55 and OP56 are not limited to them and can be changed suitably in accordance with the contents of a service to be carried out.

FIGS. 15A and 15B are views illustrating an example of a sequence of a service providing process of the service system 100 according to the first embodiment. Although, in FIGS. 15A and 15B, the service system 100 depicted in FIG. 2 is depicted, for the convenience of illustration, the digital signage 5 is not depicted.

In FIG. 15A, a user who has the portable terminal 1A and the BLE terminal 2 is positioned outside the range of the Wi-Fi AP 3 and is moving toward the communication range of the Wi-Fi AP 3. The Wi-Fi AP 3 outputs a Wi-Fi beacon in a given period. The transmission period of the Wi-Fi beacon is, for example, 100 ms. Further, it is supposed that the portable terminal 1A does not have achievements of coupling with the Wi-Fi AP 3.

At S1, in order to search for a Wi-Fi AP 3, the portable terminal 1A performs scanning in a given period. The scanning period is, for example, 180 seconds. At S2, the portable terminal 1A moves and enters the communication range of the Wi-Fi AP 3, and the portable terminal 1A detects the Wi-Fi AP 3 through scanning. At S3, a coupling sequence is performed between the portable terminal 1A and the Wi-Fi AP 3. In the coupling sequence, authentication of the portable terminal 1A is performed by the controller 6.

At S4, the controller 6 performs an authentication process on the basis of an authentication request of the portable terminal 1A (FIG. 13, OP42) and stores terminal identification information of the portable terminal 1A into the user information DB 64 (FIG. 13, OP43). Thereafter, coupling between the portable terminal 1A and the Wi-Fi AP 3 is established.

At S5, the controller 6 transmits a BLE environment notification to the portable terminal 1A (FIG. 13, OP44). The BLE environment notification includes information representing that the BLE service performed by the service system 100 is a BLE reception service, for example, the BLE service "2." The BLE environment notification is received by the portable terminal 1A via Wi-Fi, namely, via the Wi-Fi AP 3 (FIG. 10A, OP2: YES).

At S6, since the portable terminal 1A does not have achievements of coupling with the Wi-Fi AP 3 (FIG. 10A, OP5: NO), the portable terminal 1A receives an input of personal attribute information from the user (FIG. 10A, OP7) and transmits the personal attribute information to the controller 6 via Wi-Fi (FIG. 10A, OP8).

At S7, the controller 6 receives the personal attribute information from the portable terminal 1A (FIG. 13, OP45: YES) and creates BLE beacon setting information (FIG. 13, OP46). At S8, the controller 6 transmits the created BLE beacon setting information to the portable terminal 1A via Wi-Fi (FIG. 13, OP47). At S9, the controller 6 stores the terminal identification information of the portable terminal 1A, personal attribute information, and BLE beacon setting information in an associated relationship with each other (FIG. 13, OP48).

At S10, the portable terminal 1A receives the BLE beacon setting information (FIG. 10B, OP9: YES) and transmits a BLE beacon setting information rewriting notification to the BLE terminal 2 via Bluetooth (FIG. 10B, OP12). The BLE beacon setting information rewriting notification includes the BLE beacon setting information received by the portable terminal 1A.

At S11, the BLE terminal 2 receives the BLE beacon setting information rewriting notification from the portable terminal 1A (FIG. 11, OP21: YES and OP22: YES) and starts transmission of a BLE beacon (FIG. 11, OP23). Thereafter, the BLE beacon is transmitted in a given period. The transmission period of the BLE beacon is, for example, 100 ms. The BLE beacon includes, for example, information such as the UUID, Major, Minor, and RSSI of the BLE beacon setting information received from the controller 6.

At S12, the user of the portable terminal 1A moves in a direction in which it approaches the BLE receiver 4, and the BLE receiver 4 receives the BLE beacon from the BLE terminal 2 (FIG. 12, OP31: YES) and extracts the BLE beacon information included in the BLE beacon and then notifies the controller 6 of the BLE beacon information (FIG. 12, OP32). The BLE beacon information includes, for example, UUID, Major, Minor, transmission RSSI, and reception RSSI. The BLE receiver 4 notifies the controller 6 of BLE beacon information every time it receives a BLE beacon from the BLE terminal 2.

However, the BLE receiver 4 is not limited to this, and for example, after the BLE receiver 4 notifies the controller 6 of BLE beacon information when a BLE beacon from the BLE terminal 2 is received for the first time, when a BLE beacon including the same BLE beacon information is received later, the BLE receiver 4 may not notify the controller 6 of BLE beacon information. In this case, when the BLE receiver 4 fails to receive a BLE beacon from the BLE terminal 2, it notifies the controller 6 of this. When the controller 6 receives the notification from the BLE receiver 4 that the BLE receiver 4 fails to receive a BLE beacon, the controller 6 may change the display of the digital signage 5 to an initial screen image or may transmit such a message as "Please come again" to the portable terminal 1A by a Push service. It is to be noted that, if the UUID included in the BLE beacon changes, then even if the BLE beacon is originated from the same BLE terminal 2, the BLE receiver 4 recognizes the BLE beacon as a different BLE beacon and issues BLE beacon information to the controller 6.

At S13, the controller 6 receives the BLE beacon information from the BLE receiver 4 (FIG. 14, OP51: YES) and decides whether information corresponding to the BLE beacon information exists in the user information DB 64 (FIG. 14, OP52). In the example illustrated in FIG. 15A, the BLE beacon information received from the BLE receiver 4 exists in the user information DB 64 (FIG. 14, OP52: YES).

At S14, the controller 6 acquires personal attribute information corresponding to the BLE beacon information (FIG. 14, OP53), acquires push information corresponding to the personal attribute information (FIG. 14, OP54) and push-notifies the portable terminal 1A of the acquired push information via Wi-Fi (FIG. 14, OP55). The push information represents information transmitted by a push notification. At S15, the portable terminal 1A receives the push information and displays the push information on the display unit.

At S16, since the portable terminal 1A further comes near to the BLE receiver 4, the controller 6 acquires digital signage information corresponding to the personal attribute information and notifies the BLE receiver 4 of the acquired digital signage information (FIG. 14, OP56). The digital signage information is information outputted from the digital signage 5 and is image data, moving picture data, audio data and so forth. At S17, the digital signage information is outputted on the display unit of the digital signage 5 through the BLE receiver 4.

That the portable terminal 1A further comes near to the BLE receiver 4 can be decided from the fact that the reception signal strength (reception RSSI) of the BLE beacon measured by the BLE receiver 4 increases. The BLE receiver 4 notifies the controller 6 of the reception RSSI as a kind of BLE beacon information.

FIG. 15B illustrates continuing part of the processing of FIG. 15A and illustrates an example of a sequence of processing when the user of the portable terminal 1A moves until the portable terminal 1A goes out of the communication range of the Wi-Fi AP 3.

At S18, the user of the portable terminal 1A would move in a direction in which it is spaced from the BLE receiver 4. At S19, the user of the portable terminal 1A would move to the outside of the communication range of the Wi-Fi AP 3.

It is to be noted that the BLE terminal 2 continues to transmit a BLE beacon in the given period, and the portable terminal 1A performs scanning of the Wi-Fi AP in the given period.

At S20, since the portable terminal 1A has moved to the outside of the communication range of the Wi-Fi AP 3, the portable terminal 1A detects that the coupling with the Wi-Fi AP 3 is cut (FIG. 10B, OP13: YES).

At S21, the portable terminal 1A transmits a BLE beacon setting information rewriting notification to the BLE terminal 2 (FIG. 10B, OP14). Since the BLE beacon setting information rewriting notification includes blank BLE beacon setting information. After the BLE beacon setting information rewriting notification is transmitted, the portable terminal 1A deletes the BLE beacon setting information 171 in the database 17.

At S22, the BLE terminal 2 receives the BLE beacon setting information rewriting notification (FIG. 11, OP21: YES), and stops the transmission of a BLE beacon (FIG. 11, OP24) because the BLE beacon setting information rewriting notification includes the blank BLE beacon setting information (FIG. 11, OP22: NO). Since the BLE terminal 2 overwrites the BLE beacon setting information 23 with the blank BLE beacon setting information, the BLE beacon setting information is substantially deleted from the BLE terminal 2.

It is to be noted that the Wi-Fi AP 3 with which the portable terminal 1A is coupled first and the Wi-Fi AP 3 that is in a coupled state when the coupling is cut may not be a same apparatus. The Wi-Fi AP 3 to which the portable terminal 1A is coupled before the coupling is cut after the portable terminal 1A establishes coupling of Wi-Fi may be, for example, a Wi-Fi AP 3 having the same ESSID. For example, if the portable terminal 1A first establishes coupling with the Wi-Fi AP #1 and then it hands over to the Wi-Fi AP #2 by its movement, then if the Wi-Fi AP #1 and the Wi-Fi AP #2 have the same ESSID, then the portable terminal 1A does not regard cutting of coupling from the Wi-Fi AP #1 as cutting from Wi-Fi.

Working-Effect of First Embodiment

In the first embodiment, the portable terminal 1A is coupled with the BLE terminal 2, and when the portable terminal 1A is coupled with the Wi-Fi AP 3, it acquires BLE beacon setting information via Wi-Fi. Consequently, the portable terminal 1A operates as a transmitter of a BLE beacon and can receive information provided from the service system 100.

Since reception and waiting for reception of a BLE beacon by the BLE terminal 2 are performed by the reception function of Bluetooth, power consumption for reception and waiting for reception of a BLE beacon is, for example, approximately 20 mA to 30 mA. Meanwhile, since the BLE beacon is transmitted using an advertise channel, the transmission function for the advertise channel may be turned on while the transmission function for a data channel is kept off. Therefore, the power consumption by transmission of a BLE beacon by the BLE terminal 2 is, for example, approximately 4 mA to 8 mA and is low in comparison with the reception function of Bluetooth. Further, the reception function of Bluetooth is, when it is used, intermittently turned on taking the power consumption into consideration. Where the reception function of Bluetooth is intermittently turned on, for example, the reception function of Bluetooth is turned on at intervals of 300 ms for 30 ms per one period in accordance with the transmission period of 100 ms to 200 ms of the BLE beacon. Meanwhile, the transmission period of a BLE beacon is 100 ms to 200 ms, and the time period for transmission of a BLE beacon for one time is several ms.

In other words, even in comparison with an alternative case in which the reception function of Bluetooth is intermittently turned on, the power consumption for transmission of a BLE beacon is low. Accordingly, the power consumption for enjoyment of a BLE service by the portable terminal 1A can be reduced by causing the portable terminal 1A to operate as a transmission side apparatus of a BLE beacon.

Further, in the first embodiment, transmission of a BLE beacon is performed restrictively within a period after the portable terminal 1A is coupled with the Wi-Fi AP 3 and acquires BLE beacon setting information until the coupling with the Wi-Fi AP 3 is cut. Since the period within which transmission of a BLE beacon is performed is restricted, the power consumption for enjoyment of the BLE service by the portable terminal 1A can be reduced further.

Further, in the first embodiment, after the portable terminal 1A is coupled with the Wi-Fi AP 3 and acquires BLE beacon setting information, it instructs the BLE terminal 2 to start transmission of a BLE beacon. Further, the communication range of the Wi-Fi AP 3 is longer than the reaching range of the BLE beacon. It is supposed that the BLE receiver 4 normally keeps the reception function of Bluetooth in an on state. In other words, in the first embodiment, when the user of the portable terminal 1A comes near to the BLE receiver 4, transmission of a BLE beacon from the portable terminal 1A (BLE terminal 2) has been started. Therefore, when the portable terminal 1A comes near to the BLE receiver 4, push notification, information displaying on the digital signage 5 and so forth are performed at a timing at which the user does not feel them unnatural. Therefore, the response is improved.

Since the BLE beacon is transmitted in a period of 100 ms to 200 ms, a behavior analysis of the user of the portable terminal 1A can be performed by using identification information such as a UUID included in the BLE beacon. Meanwhile, that a behavior analysis of the user of the portable terminal 1A can be performed sometimes makes a problem of privacy. In the first embodiment, if the portable terminal 1A goes out from the communication range of the Wi-Fi AP 3, then transmission of the BLE beacon is stopped. Therefore, the behavior analysis of the user of the portable terminal 1A is performed only when the portable terminal 1A is outside the range of the Wi-Fi AP 3. Therefore, such a problem of privacy that the behavior history of the user of the portable terminal 1A is recorded immoderately is reduced.

Further, in the first embodiment, since a different UUID is used in a different service system 100, every time the portable terminal 1A is coupled with a Wi-Fi AP 3 in a different service system 100, it uses new BLE beacon setting information. In other words, in the first embodiment, the BLE beacon setting information of the portable terminal 1A is not fixed. Therefore, abuse of a BLE beacon setting information, such as spoofing of the user of the portable terminal 1A, can be suppressed. Further, in the first embodiment, since the portable terminal 1A deletes the BLE beacon setting information in response to cutting of coupling of the Wi-Fi AP 3, the security is higher.

If it is supposed that the BLE terminal 2 is unique to the user of the portable terminal 1A, then the user of the portable terminal 1A can enjoy a service smoothly by installing the service enjoyment program into the portable terminal 1A without the labor of lending of the BLE terminal 2. Further, by utilizing a portable terminal unique to a user, the number of people which enjoy the service is not restricted, and the service can be provided to a greater number of people. Also the labor involved in recovery of the BLE terminal 2 can be omitted.

Further, in the first embodiment, personal attribute information is transmitted from the portable terminal 1A to the controller 6, and the controller 6 retains BLE beacon setting information and the personal attribute information in an associated relationship with each other. Therefore, the user of the portable terminal 1A can acquire information in accordance with an attribute of the user itself at any place in the service system 100 by inputting the personal attribute information first. Even to a manager of the service system 100, the labor for setting can be reduced because personal attribute information of each user may not be set.

It is to be noted that, while, in the first embodiment, the portable terminal 1A deletes the BLE beacon setting information 171 from the database 17 in response to cutting of coupling between the portable terminal 1A and the Wi-Fi AP 3, deletion of the BLE beacon setting information 171 may not be performed. Further, a notification or a push notification of BLE beacon setting information from the controller 6 to the portable terminal 1A may be transmitted through a cellular network such as LTE.

Second Embodiment

In a second embodiment, a transmission function of a BLE beacon is incorporated in a portable terminal. In the description of the second embodiment, description of common components to those of the first embodiment is omitted.

The system configuration of a service system according to the second embodiment is common to that of the first embodiment depicted in FIG. 2 except that it does not include the BLE terminal 2. In particular, the service system according to the second embodiment includes a portable terminal, a Wi-Fi AP 3, a BLE receiver 4, a digital signage 5, and a controller 6.

In the second embodiment, the hardware configuration of the portable terminal is similar to that depicted in FIG. 3, and the Bluetooth communication unit 113 and the Bluetooth antenna 114 are compatible with BLE. Except this, the hardware configuration of the portable terminal is similar to that in the first embodiment.

Figure 16:
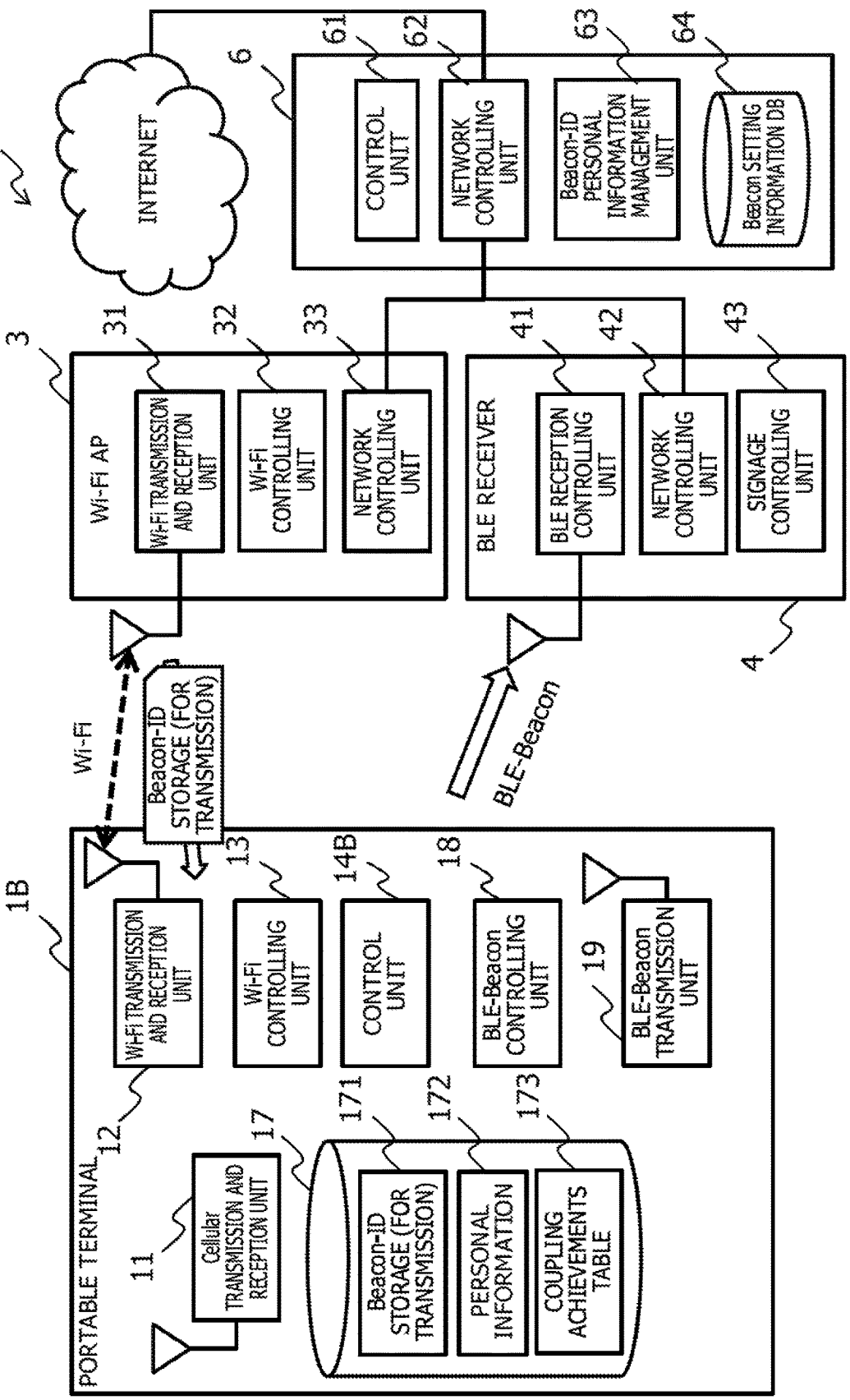
FIG. 16 is a view depicting an example of a functional configuration of a service system according to a second embodiment.

FIG. 16 is a block diagram depicting an example of a functional configuration of a service system 100B according to the second embodiment. Each of the Wi-Fi AP 3, the BLE receiver 4, and the controller 6 has a functional configuration similar to that in the first embodiment.

A portable terminal 1B includes, as functional components thereof, a cellular transmission and reception unit 11, a Wi-Fi transmission and reception unit 12, a Wi-Fi controlling unit 13, a control unit 14B, a database 17, a BLE beacon controlling unit 18, and a BLE beacon transmission unit 19. The cellular transmission and reception unit 11, the Wi-Fi transmission and reception unit 12, the Wi-Fi controlling unit 13, and the database 17 are such as described hereinabove in connection with the first embodiment.

The BLE beacon transmission unit 19 corresponds to the Bluetooth communication unit 113 and the Bluetooth antenna 114. The BLE beacon controlling unit 18 is a functional component achieved by the CPU 101 executing a module relating to BLE included in an OS. The BLE beacon controlling unit 18 controls the BLE beacon transmission unit 19. More particularly, the BLE beacon controlling unit 18 controls starting and stopping of transmission of a BLE beacon from the BLE beacon transmission unit 19.

In the second embodiment, the control unit 14B outputs a BLE beacon setting information rewriting notification to the BLE beacon controlling unit 18 in a similar manner as in the first embodiment. If the BLE beacon setting information rewriting notification is inputted, then the BLE beacon controlling unit 18 instructs the BLE beacon transmission unit 19 to transmit or stop a BLE beacon.

In particular, in the second embodiment, the control unit 14B performs the processing illustrated in FIGS. 10A and 10B. However, the BLE beacon setting information rewriting notification, which is issued to the BLE terminal 2 in the first embodiment, is, in the second embodiment, issued to the BLE beacon controlling unit 18 in place of the BLE terminal 2. Further, the BLE beacon controlling unit 18 performs processing similar to that of the BLE terminal 2 illustrated in FIG. 11. However, the BLE beacon setting information rewriting notification, which is inputted from the portable terminal 1A to the BLE terminal 2 in the first embodiment, is, in the second embodiment, issued from the control unit 14B to the BLE beacon controlling unit 18. Further, in the second embodiment, the BLE beacon controlling unit 18 does not perform the rewriting process of the BLE beacon setting information 171 and so forth.

It is to be noted that, in the second embodiment, the control unit 14 issues, to the BLE beacon controlling unit 18, a message for BLE beacon transmission starting instruction or stopping instruction in place of a BLE beacon setting information rewriting notification.

FIGS. 17A and 17B are views illustrating an example of a sequence of processing for providing a service in the service system 100B according to the second embodiment. In FIG. 17A, it is assumed that a user having the portable terminal 1B is positioned outside the range of the Wi-Fi AP 3 and is moving toward the communication range of the Wi-Fi AP 3. The Wi-Fi AP 3 outputs a Wi-Fi beacon in a given period. Further, it is supposed that the portable terminal 1B has no achievements of coupling with the Wi-Fi AP 3. Processes from S31 to S39 are similar to those from S1 to S9 in FIG. 15A in the first embodiment, and therefore, overlapping description of the processes is omitted herein.

At S40, the portable terminal 1B receives BLE beacon setting information (FIG. 10B, OP9: YES), and rewrites the BLE beacon setting information 171 in the database 17 (FIG. 10B, OP10). At S41, the portable terminal 1B starts transmission of a BLE beacon (FIG. 11, OP23). Thereafter, the BLE beacon is transmitted in a given period from the portable terminal 1B.

Processes at S42 to S50 are similar to those at S12 in FIG. 10A to S30 in FIG. 10B in the first embodiment. When the user of the portable terminal 1B comes near to the BLE receiver 4 and the BLE receiver 4 receives a BLE beacon originated from the portable terminal 1B, then BLE beacon information is issued from the BLE receiver 4 to the controller 6 (S42). From the controller 6, push information in accordance with personal attribute information is issued to the portable terminal 1B (S45) or digital signage information is displayed on the digital signage 5 (S47). Thereafter, the user of the portable terminal 1B would move in a direction in which it is spaced away from the communication range of the Wi-Fi AP 3 (S48) and go out from the communication range of the Wi-Fi AP 3 (S49). Then, it is detected that the coupling with Wi-Fi is cut (S50).

At S51, the portable terminal 1B stops the beacon transmission because the coupling with the Wi-Fi AP 3 has been cut (FIG. 11, OP24). Further, the portable terminal 1B deletes the BLE beacon setting information 171 in the database 17 (FIG. 10B, OP14).

Working-Effect of Second Embodiment

In the second embodiment, also where the BLE transmission function is incorporated in the portable terminal 1B, it is indicated that the BLE service of the service system 100B is enjoyable. Where the BLE transmission function is incorporated in the portable terminal 1B, the BLE service can be enjoyed even if an operation for coupling between the BLE terminal 2 and the portable terminal 1A by Bluetooth or a like operation is not performed. Therefore, setting is facilitated further to the user.

Third Embodiment

Where transmission of a BLE beacon is started after coupling with the Wi-Fi AP 3 is established as in the first embodiment and the second embodiment, it is difficult for the user of the portable terminal 1B to enjoy a BLE service when the portable terminal 1B advances into the communication range of the Wi-Fi AP 3. This is because there is a time lag between the advancement into the communication range of the Wi-Fi AP 3 and the establishment of coupling with the Wi-Fi AP 3.

A BLE service that is performed upon advancement into the communication range of the Wi-Fi AP 3 is a service that, for example, when the user enters a shopping mole, sound of "welcome" is issued from a portable terminal or a digital signage set in the proximity of an entrance. For example, where an entrance of a shopping mole is positioned in the proximity of a boundary of the communication range of the Wi-Fi AP 3, during a sequence for coupling establishment between the portable terminal and the Wi-Fi AP 3, the user may pass the entrance, and the sound of "welcome" may not be outputted in time with a high degree of possibility.

In a third embodiment, in order to implement a BLE service upon advancement of a portable terminal into the communication range of a Wi-Fi AP, the portable terminal turns on the reception function of Bluetooth at a point of time at which it detects a Wi-Fi beacon from the Wi-Fi AP before it advances into the communication range of the Wi-Fi AP.

FIG. 18 is a view illustrating an example of a flow of processing in a service system according to the third embodiment. A Wi-Fi coupleable area AR1 is an area within which a signal from the Wi-Fi AP 3 reaches with a reception signal strength equal to or higher than a threshold value with which it is determined that coupling with the Wi-Fi AP 3 is possible, and it is also referred to as communication range. A Wi-Fi detectable area AR2 is an area within which a signal from the Wi-Fi AP 3 reaches with a detectable reception signal strength although it is lower than the reception signal strength with which coupling with the Wi-Fi AP 3 is possible. In other words, the radius of the Wi-Fi detectable area AR2 is greater than the radius of the Wi-Fi coupleable area AR1. Further, the threshold value for the reception signal strength for deciding advancement into the Wi-Fi coupleable area AR1 is higher than the threshold value for the reception signal strength for deciding advancement into the Wi-Fi detectable area AR2.

At S100, a portable terminal 1C exists outside the Wi-Fi detectable area AR2. At this time, it is assumed that both of the reception function of Bluetooth and the BLE transmission function of the portable terminal 1C are off.

At S200, the portable terminal 1C advances into the Wi-Fi detectable area AR2. Where the portable terminal 1C has achievements of coupling with an ESSID obtained from a received Wi-Fi beacon and besides has achievements of a BLE service with the BSSID, the portable terminal 1C makes the scanning period of Wi-Fi shorter and starts an intermittent action of the reception function of Bluetooth.

At S300, the portable terminal 1C advances into the Wi-Fi coupleable area AR1. At S400, since the reception function of Bluetooth has turned on already, the portable terminal 1C receives a BLE beacon originated from the BLE transmitter 7. From the portable terminal 1C, for example, the UUID and so forth included in the BLE beacon are transmitted to the controller 6 via LTE, and the information is transmitted from the controller 6 to the digital signage or the portable terminal 1C and the sound of "welcome" is emitted. Whichever one of the processes at S300 and S400 may be performed ahead.

At S500, since the coupling between the portable terminal 1C and the Wi-Fi AP 3 is established, the portable terminal 1C turns on the BLE transmission function thereof to originate a BLE beacon in a similar manner as in the first and second embodiments. At this time, the portable terminal 1C returns the scanning period of Wi-Fi to its original value. Further, if a different BLE transmitter 7 does not exist in the Wi-Fi coupleable area AR1 of the Wi-Fi AP 3, then the portable terminal 1C turns off the reception function of Bluetooth. A notification of whether or not a different BLE transmitter 7 exists is issued to the portable terminal 1C, for example, by a BLE environment notification from the controller 6.

By turning on the BLE reception function in response to the advancement of the portable terminal 1C into the Wi-Fi detectable area AR2, the portable terminal 1C can enjoy the BLE transmission service from the service system. Consequently, the user of the portable terminal 1C can enjoy the BLE service also during a time period after the portable terminal 1C advances into the Wi-Fi detectable area AR2 until the portable terminal 1C advances into the Wi-Fi coupleable area AR1 and establishes coupling with the Wi-Fi AP 3 to start transmission of a BLE beacon. It is to be noted that, where the response is emphasized, the reception function of Bluetooth of the portable terminal 1C when the portable terminal 1C advances into the Wi-Fi detectable area AR2 may not perform an intermittent action but may normally be in an on state.

Figure 19:
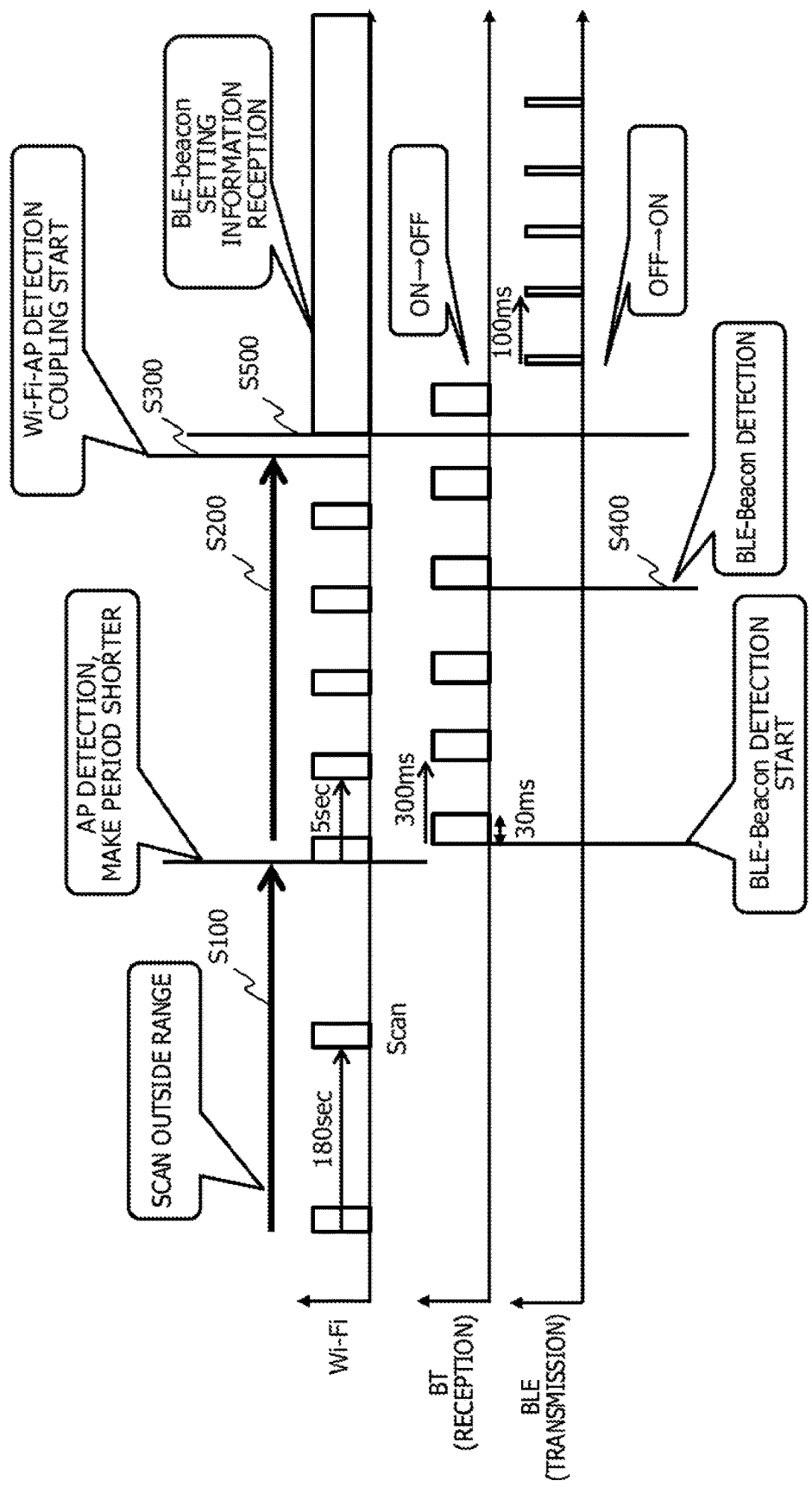
FIG. 19 illustrates an example of a timing chart in a state in which a transmission and reception function of Wi-Fi, a reception function of Bluetooth, and a BLE transmission function of a portable terminal are in an on state.

FIG. 19 depicts an example of a timing chart indicating on states of a Wi-Fi transmission and reception function, a Bluetooth reception function, and a BLE transmission function of the portable terminal 1C. Reference symbols in FIG. 19 individually correspond to reference symbols in FIG. 18.

When the portable terminal 1C exists outside the range of the Wi-Fi detectable area AR2 as at S100, Wi-Fi scanning is executed, for example, in a period of 180 seconds. At this time, the reception function of Bluetooth and the transmission function of BLE of the portable terminal 1C are in an off state.

When the portable terminal 1C advances into the Wi-Fi detectable area AR2 as at S200, the execution period of Wi-Fi scanning is changed, for example, to five seconds. This is because it is intended to stop overlooking of advancement of the portable terminal 1C into the Wi-Fi coupleable area AR1. Further, in response to detection of advancement of the portable terminal 1C into the Wi-Fi detectable area AR2, an intermittent action of the reception function of Bluetooth is turned on, and the portable terminal 1C starts detection of a BLE beacon. In the intermittent action of the reception function of Bluetooth, the reception function of Bluetooth is turned on, for example, in a period of 300 ms, and the on state per one cycle continues for 30 ms.

When the portable terminal 1C advances into the Wi-Fi coupleable area AR1 as at S300, coupling of the portable terminal 1C with the Wi-Fi AP 3 is started.

At S400, the portable terminal 1C receives a BLE beacon originated from the BLE transmitter 7 ahead of the advancement of the portable terminal 1C into the Wi-Fi coupleable area AR1 at S300. In response to the reception of a BLE beacon, the portable terminal 1C transmits BLE beacon information to the controller 6, and the portable terminal 1C is push-notified of given information from the controller 6 or given information is transmitted from the controller 6 to the digital signage.

At S500, the portable terminal 1C establishes coupling with the Wi-Fi AP 3 and receives BLE beacon setting information from the controller 6 via Wi-Fi. In response to the reception of the BLE beacon setting information, the intermittent action of the reception function of Bluetooth of the portable terminal 1C is stopped. Further, the BLE transmission function of the portable terminal 1C is changed over from off to on, and origination of a BLE beacon is started in a given period. The origination period of the BLE beacon is, for example, 100 ms. It is to be noted that, where a different BLE terminal 7 exists in the Wi-Fi coupleable area AR1 of the Wi-Fi AP 3, the reception function of Bluetooth may otherwise remain in an on state.

It is to be noted that the operation periods of the Wi-Fi function, the reception function of Bluetooth, and the BLE beacon transmission function of the portable terminal 1C illustrated in FIG. 19 are an example for imaging and are not limited to the values indicated in FIG. 19. Further, that the reception function of Bluetooth is on signifies that the Bluetooth communication unit is in a waiting state for signal reception or in a reception state. That the reception function of Bluetooth is off signifies that the reception function of the Bluetooth communication unit is not operative and signifies, for example, a state in which, even if a signal of Bluetooth arrives at the portable terminal 1C, processing relating to the reception signal is not executed.

Further, that the BLE transmission function is on signifies a state in which a BLE beacon is originated in a given period. That the BLE transmission function is off signifies a state in which the transmission function of a BLE beacon of the Bluetooth communication unit is not operative and in which no BLE beacon is originated irrespective of a period.

Figure 20:
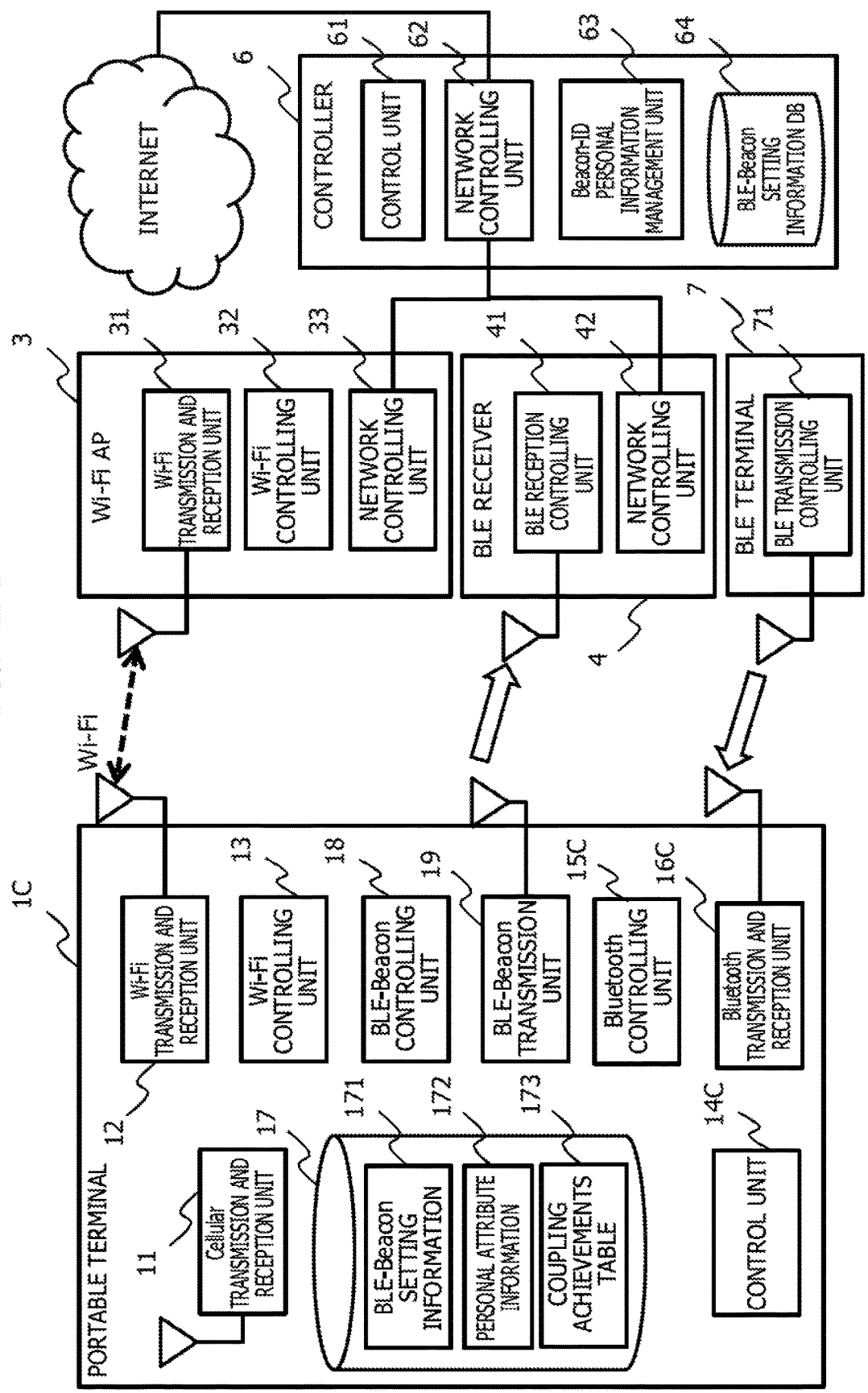
FIG. 20 depicts an example of a functional configuration of a service system according to the third embodiment.

FIG. 20 depicts an example of a functional configuration of a service system 100C according to the third embodiment. The service system 100C according to the third embodiment includes a portable terminal 1C, a Wi-Fi AP 3, a BLE receiver 4, a digital signage (not depicted), a controller 6, and a BLE terminal 7. The service system 100C may include a plurality of portable terminals 1C, Wi-Fi APs 3, BLE receivers 4, digital signages, and BLE terminals 7.

Each of the Wi-Fi AP 3, the BLE receiver 4, and the controller 6 has a hardware configuration similar to that in the first embodiment. The BLE terminal 7 is, for example, a transmitter of the stationary type and includes a CPU, a ROM, a RAM, a nonvolatile memory, a Bluetooth communication unit, a Bluetooth antenna, a network interface and so forth.

Each of the Wi-Fi AP 3, the BLE receiver 4, and the controller 6 has a functional configuration similar to that in the first embodiment. However, in FIG. 20, for the convenience of illustration, part of functional components of the BLE receiver 4 are omitted.

In the third embodiment, the portable terminal 1C includes, as functional components thereof, a cellular transmission and reception unit 11, a Wi-Fi transmission and reception unit 12, a Wi-Fi controlling unit 13, a control unit 14C, a Bluetooth controlling unit 15C, a Bluetooth transmission and reception unit 16C, a database 17, a BLE beacon controlling unit 18, and a BLE beacon transmission unit 19. The cellular transmission and reception unit 11, the Wi-Fi transmission and reception unit 12, the Wi-Fi controlling unit 13, the database 17, the BLE beacon controlling unit 18, and the BLE beacon transmission unit 19 are similar to those in the first embodiment and the second embodiment.

The Bluetooth transmission and reception unit 16C corresponds to the Bluetooth communication unit 113 and the Bluetooth antenna 114. The Bluetooth controlling unit 15C is a functional component achieved by the CPU 101 executing the OS. The Bluetooth controlling unit 15C controls the reception function of the Bluetooth transmission and reception unit 16C between on and off. For example, the Bluetooth controlling unit 15C turns on the reception function of the Bluetooth transmission and reception unit 16C in accordance with an instruction from the control unit 14C to start an intermittent action of the reception function in a given period for a given duration.

In the third embodiment, the control unit 14C acquires a result of Wi-Fi scanning from the Wi-Fi controlling unit 13 to detect advancement of the portable terminal 1C into the Wi-Fi detectable area AR2 and the Wi-Fi coupleable area AR1. Detection of the advancement into the areas AR1 and AR2 is performed, for example, by comparison between a reception signal strength of a Wi-Fi beacon obtained as a result of Wi-Fi scanning and a threshold value therefor. The detection threshold value for advancement into the Wi-Fi detectable area AR2 is lower than the detection threshold value for advancement into the Wi-Fi coupleable area AR1.

If the control unit 14 detects advancement of the portable terminal 1C into the Wi-Fi detectable area AR2, then the control unit 14 instructs the Bluetooth controlling unit 15C to turn on the reception function of Bluetooth. Further, the control unit 14 instructs the Wi-Fi controlling unit 13 to change the scanning period to a shorter period.

If the control unit 14C detects advancement of the portable terminal 1C into the Wi-Fi coupleable area AR1, then the control unit 14 instructs the BLE beacon controlling unit 18 to start origination of a BLE beacon. Further, the control unit 14C instructs the Wi-Fi controlling unit 13 to change the scanning period back to an original value. Further, the control unit 14C instructs the Bluetooth controlling unit 15C to turn off the reception function of Bluetooth. However, if performance of a plurality of BLE transmission services of the Wi-Fi AP 3 is recorded in the coupling achievements table 173, then the control unit 14C may not perform the instruction to turn off the reception function of Bluetooth.

If the Bluetooth controlling unit 15C detects reception of a BLE beacon, then the Bluetooth controlling unit 15C notifies the control unit 14C of this. The control unit 14C extracts BLE beacon information from the received BLE beacon and outputs, when coupling with the Wi-Fi AP 3 is not established, the BLE beacon information to the cellular transmission and reception unit 11 so as to be transmitted to the controller 6 via LTE. If coupling with the Wi-Fi AP 3 is established, then the control unit 14C may output the BLE beacon information to the Wi-Fi controlling unit 13 so as to be transmitted to the controller 6 via Wi-Fi. If given information is received from the controller 6 by push notification, then the control unit 14C controls the display unit to display the received information. It is to be noted that, if a server ready for a BLE transmission service exists in addition to the controller 6, then the control unit 14C transmits the BLE beacon information to the server through the cellular transmission and reception unit 11 and acquires the information from the server.

The BLE terminal 7 includes, as a functional component thereof, a BLE transmission controlling unit 71. The BLE transmission controlling unit 71 is a function achieved by the CPU of the BLE terminal 7 executing the OS. The BLE transmission controlling unit 71 controls starting and stopping of transmission of a BLE beacon in a given period from the Bluetooth communication unit. In the third embodiment, it is assumed that the BLE terminal 7 transmits a BLE beacon in a given period.

Figure 21A:
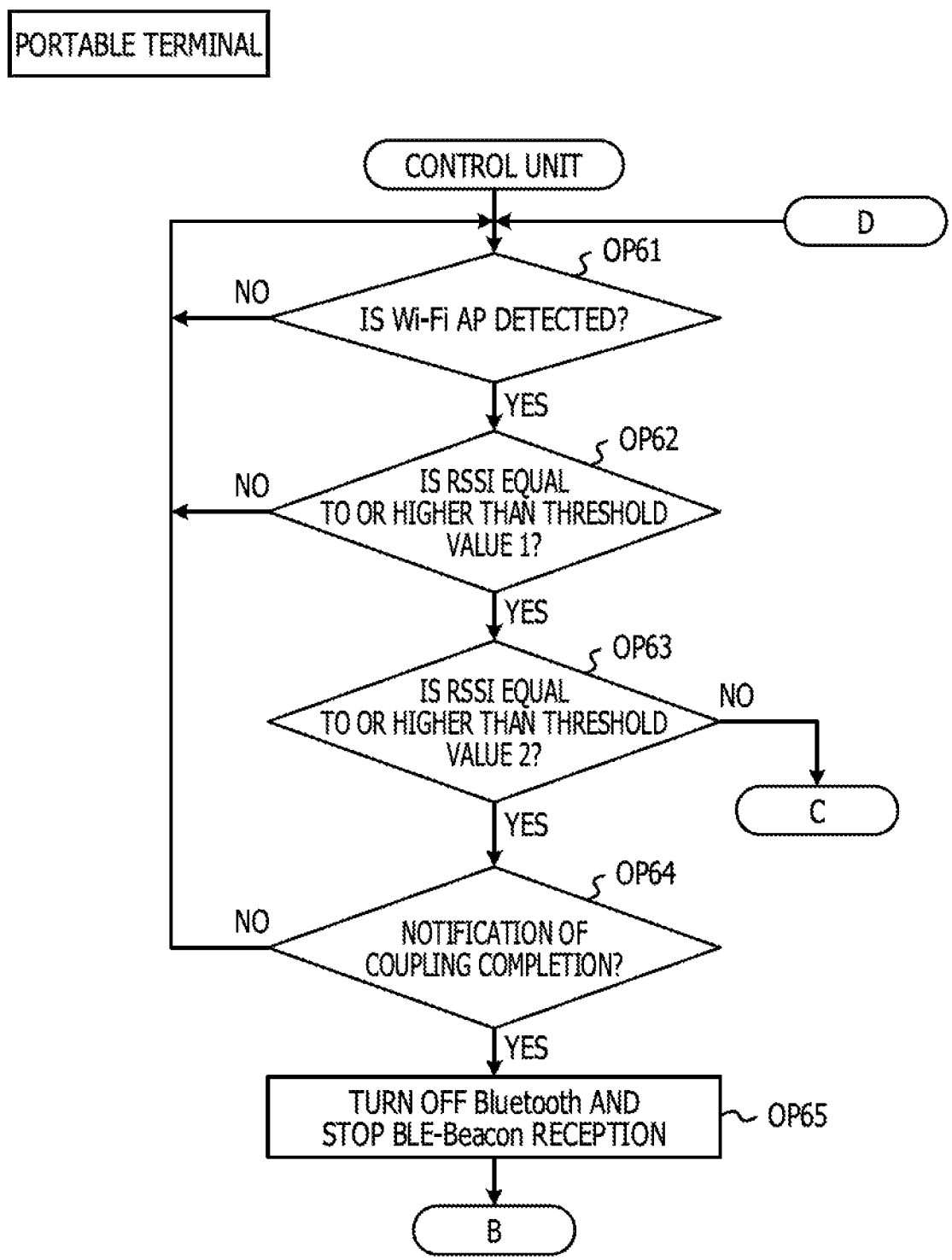
FIG. 21A depicts an example of a flow chart of processing of a control unit of a portable terminal according to the third embodiment.

FIGS. 21A and 21B depict an example of a flow chart of processing of the control unit 14C of the portable terminal 1C according to the third embodiment. The processing illustrated in FIG. 21A is started in response to activation of the portable terminal 1C.

At OP61, the control unit 14C waits for detection of a Wi-Fi AP 3 from a result of the scanning of the Wi-Fi AP 3 from the Wi-Fi controlling unit 13. A Wi-Fi AP 3 is detected from the fact that, for example, a result of measurement is obtained irrespective of the value of the reception signal strength of a signal from the Wi-Fi AP 3. If a Wi-Fi AP 3 is detected (OP61: YES), then the processing advances to OP62.

At OP62, the control unit 14C compares the RSSI of the detected Wi-Fi AP 3 and a threshold value 1. The threshold value 1 is a threshold value for detecting advancement into the Wi-Fi detectable area AR2. If the RSSI of the detected Wi-Fi AP 3 is equal to or greater than the threshold value 1 (OP62: YES), then the processing advances to OP63. If the RSSI of the detected Wi-Fi AP 3 is smaller than the threshold value 1 (OP62: NO), then this indicates that the portable terminal 1C exists outside the range of the Wi-Fi detectable area AR2, and the processing advances to OP61.

At OP63, the control unit 14C compares the RSSI of the detected Wi-Fi AP 3 and a threshold value 2 therefor with each other. The threshold value 2 is a threshold value for detecting advancement into the Wi-Fi coupleable area AR1. The threshold values 1 and 2 have such a relationship of the threshold value 2>threshold value 1. If the RSSI of the detected Wi-Fi AP 3 is equal to or greater than the threshold value 2 (OP63: YES), then advancement into the Wi-Fi coupleable area AR1 is detected, and the processing advances to OP64. If the RSSI of the detected Wi-Fi AP 3 is smaller than the threshold value 2 (OP63: NO), then advancement of the portable terminal 1C into the Wi-Fi detectable area AR2 is detected, and the processing advances to OP71 of FIG. 21B.

The processes at OP71 to OP76 of FIG. 21B are processes in a case in which the portable terminal 1C is positioned in the Wi-Fi detectable area AR2 but outside the Wi-Fi coupleable area AR1.

At OP71, the control unit 14C refers to the coupling achievements table 173 to decide whether or not the detected Wi-Fi AP 3 has coupling achievements and achievements of a BLE service. More particularly, the control unit 14C decides whether or not the detected Wi-Fi AP 3 has coupling achievements depending upon whether or not the coupling achievements table 173 has an entry relating to the ESSID of the detected Wi-Fi AP 3. Further, the control unit 14C decides whether or not the detected Wi-Fi AP 3 has achievements of a BLE service depending upon whether or not achievements of a BLE service are associated with the BSSID of the detected Wi-Fi AP 3 in the coupling achievements table 173.

If the detected Wi-Fi AP 3 has coupling achievements and achievements of a BLE service (OP71: YES), then the processing advances to OP72. If the detected Wi-Fi AP 3 does not have one or both of coupling achievements and achievements of a BLE service (OP71: NO), then the processing advances to OP61.

At OP72, the control unit 14C instructs the Wi-Fi controlling unit 13 to set the Wi-Fi scanning period to the short period.

At OP73, the control unit 14C instructs the Bluetooth controlling unit 15C to turn on the reception function of Bluetooth. Consequently, an intermittent action of the reception function of Bluetooth of the portable terminal 1C is started.

At OP74, the control unit 14 waits for reception of a BLE beacon. If a notification of reception of a BLE beacon is received from the Bluetooth controlling unit 15C (OP74: YES), then the processing advances to OP75. It is to be noted that, if a BLE beacon is not received even after lapse of a given period of time, then the processing advances to OP61. The waiting time for reception of a BLE beacon is set, for example, to a period shorter than the Wi-Fi scanning period.

At OP75, the control unit 14C transmits BLE beacon information of the received BLE beacon to an apparatus corresponding to the UUID through LTE and acquires display data from the apparatus. The apparatus corresponding to the UUID is, for example, a given server or the controller 6. Thereafter, the processing advances to OP61.

The processes at OP64 and OP65 of FIG. 21A are processes performed where advancement of the portable terminal 1C into the Wi-Fi coupleable area AR1 is detected. At OP64, the control unit 14C waits for an input of a coupling completion notification with the Wi-Fi AP 3 from the Wi-Fi controlling unit 13. If a coupling completion notification with the Wi-Fi AP 3 is inputted from the Wi-Fi controlling unit 13 (OP64: YES), then the processing advances to OP65. If a coupling completion notification with a Wi-Fi AP 3 is not inputted even after lapse of a given period of time, the processing advances to OP61. The waiting time for an input of a coupling completion notification with a Wi-Fi AP 3 is set, for example, to a period shorter than the Wi-Fi scanning period.

At OP65, the control unit 14C instructs the Bluetooth controlling unit 15C to turn off the reception function of Bluetooth. Consequently, the intermittent reception action of the Bluetooth transmission and reception unit 16C is stopped. Thereafter, the processing advances to OP2 of FIG. 10A. It is to be noted that, if it is found that a BLE transmission service is performed by a different BLE terminal 7 within the communication range of the Wi-Fi AP 3, then the process at OP65 may not be performed. Further, the reception of a BLE environment notification from the controller 6 and the processing for turning off the reception function of Bluetooth at OP65 may be performed in a reverse order depending upon the reception timing of the BLE environment notification.

Figure 22A:
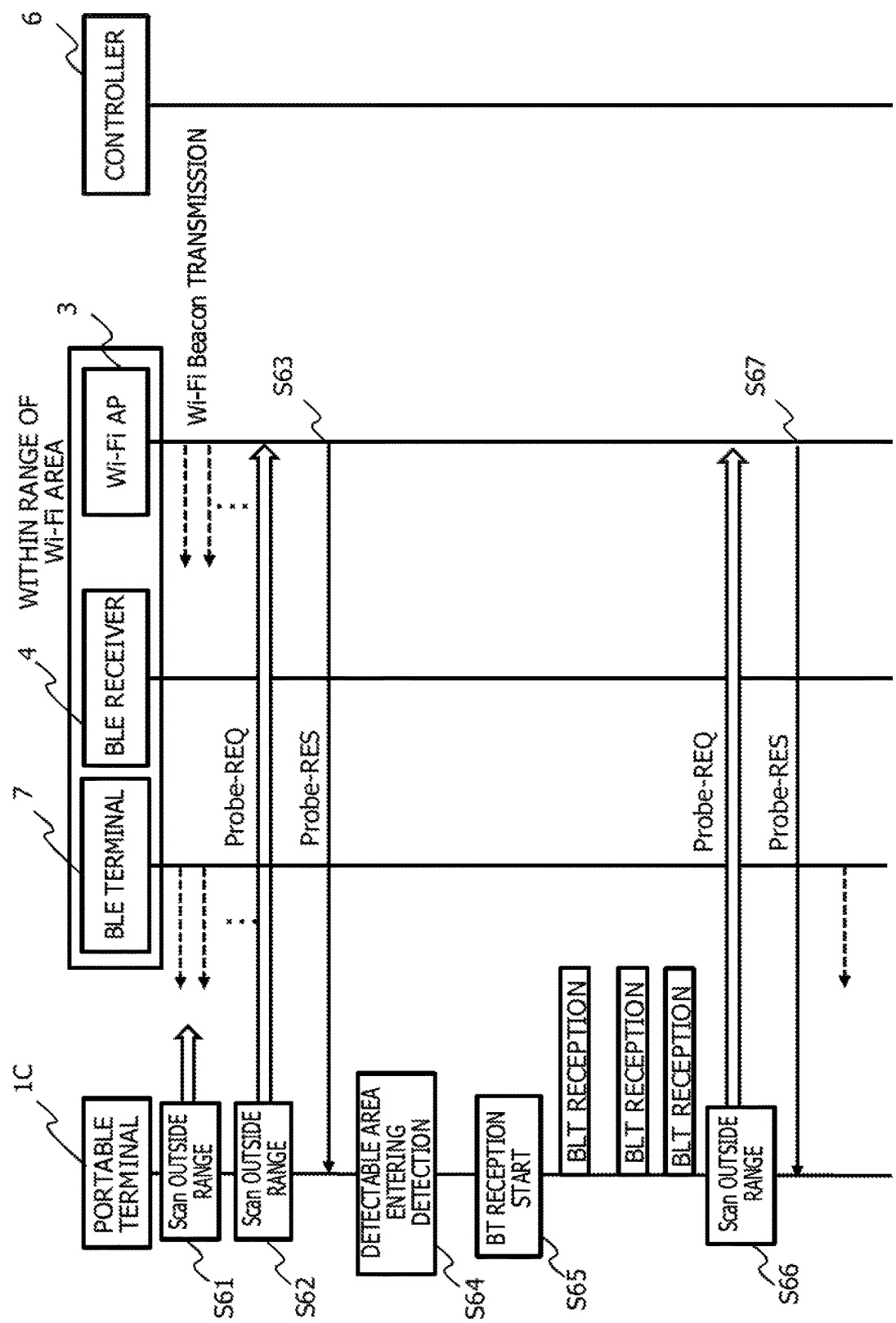
FIG. 22A is a view illustrating an example of a sequence of processing of a service system according to the third embodiment.
Figure 22B:
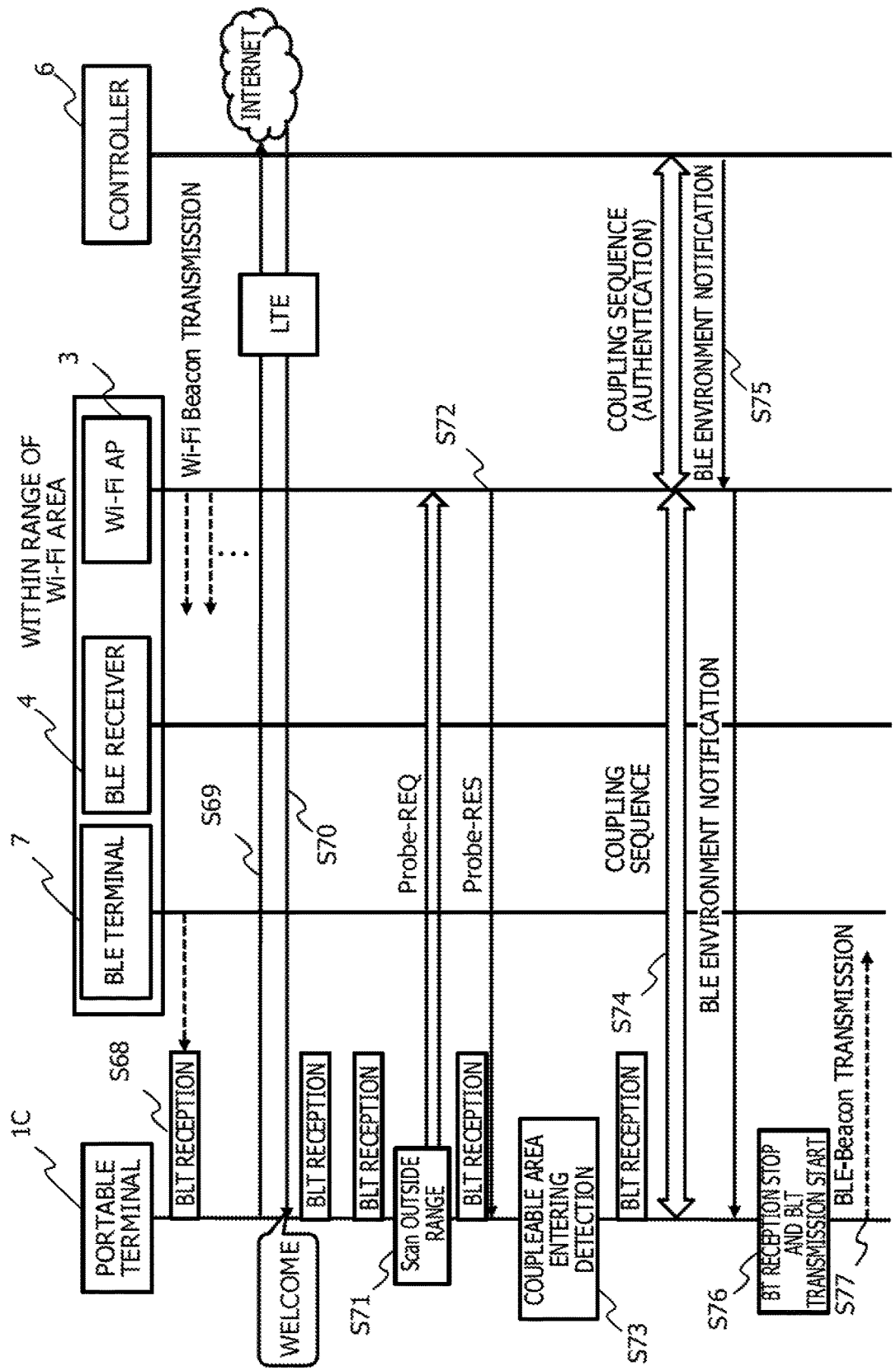
FIG. 22B is a view illustrating an example of a sequence of processing of the service system according to the third embodiment.

FIGS. 22A and 22B are views illustrating an example of a sequence of processes of the service system 100C according to the third embodiment. In FIG. 22A, it is assumed that a user having the portable terminal 1C is positioned outside the Wi-Fi detectable area AR2 of a Wi-Fi AP 3 and is moving toward the Wi-Fi detectable area AR2 of the Wi-Fi AP 3. Further, it is supposed that the portable terminal 1C has coupling achievements with the Wi-Fi AP 3 and achievements of a BLE service stored therein. Further, it is assumed that the BLE terminal 7 is installed in the proximity of a boundary of the Wi-Fi coupleable area AR1 of the Wi-Fi AP 3.

At S61, the portable terminal 1C performs Wi-Fi scanning in a given period. The scanning period of Wi-Fi is, for example, 180 seconds.

At S62, the portable terminal 1C performs Wi-Fi scanning at a timing of the scanning period. As one of processes of Wi-Fi scanning, a probe signal is originated from the portable terminal 1C. It is assumed that, as a result of the movement, the portable terminal 1C has advanced into the Wi-Fi detectable area AR2 of the Wi-Fi AP 3.

At S63, the probe signal originated from the portable terminal 1C by the Wi-Fi scanning reaches the Wi-Fi AP 3, and the Wi-Fi AP 3 originates a probe response signal.

At S64, the portable terminal 1C receives the probe response signal (FIG. 21A, OP61: YES) and detects advancement of the Wi-Fi AP 3 into the detection possible area from the RSSI of the probe response signal (FIG. 21A, OP62: YES and OP63: NO).

At S65, since it is supposed that coupling achievements with the Wi-Fi AP 3 and achievements of a BLE service are stored in the portable terminal 1C (FIG. 21B, OP71: YES), the portable terminal 1C turns on the reception function of Bluetooth to start a reception action (FIG. 21B, OP73). Thereafter, an intermittent reception action of Bluetooth for 30 ms per one cycle is performed in a period of 300 ms. Also the Wi-Fi scanning period of the portable terminal 1C is changed, for example, to five seconds that are a still shorter period (FIG. 21B, OP72).

Processes at S66 and S67 are processes of Wi-Fi scanning performed, for example, in a period of five seconds. It is assumed that, at the point of time of S66 and S67, the portable terminal 1C has not advanced into the Wi-Fi coupleable area AR1 of the Wi-Fi AP 3 as yet.

At S68, as the user of the portable terminal 1C comes near to the BLE terminal 7, the portable terminal 1C receives a BLE beacon originated from the BLE terminal 7 (FIG. 21B, OP74: YES). At S69, the portable terminal 1C extracts BLE beacon information from the BLE beacon and transmits the BLE beacon information to the controller 6 via LTE (FIG. 21B, OP75). At S70, a notification of push information is issued from the controller 6 via LTE, and a message such as "welcome" is displayed on the portable terminal 1C.

At S71, the portable terminal 1C performs Wi-Fi scanning at a timing of the Wi-Fi scanning period. At S72, the Wi-Fi AP 3 receives a probe signal originated from the portable terminal 1C and originates a probe response.

At S73, the portable terminal 1C has advanced into the Wi-Fi coupleable area AR1 of the Wi-Fi AP 3 as a result of the movement thereof, and the portable terminal 1C detects from the RSSI of the probe response that it has advanced into the Wi-Fi coupleable area AR1 of the Wi-Fi AP 3 (FIG. 21A, OP63: YES).

At A74, the portable terminal 1C performs a coupling sequence with the Wi-Fi AP 3. At S75, a BLE environment notification is transmitted from the controller 6.

At S76, since coupling between the portable terminal 1C and the Wi-Fi AP 3 is established (FIG. 21A, OP64: YES), the portable terminal 1C turns off the reception function of Bluetooth to stop the intermittent reception action (FIG. 21A, OP65). Thereafter, personal attribute information is transmitted from the portable terminal 1C to the controller 6, and BLE beacon setting information is transmitted from the controller 6 (omitted in FIG. 22B).

At S77, when the portable terminal 1C receives the BLE beacon setting information, it starts origination of a BLE beacon.

Working-Effect of Third Embodiment

In the third embodiment, when the portable terminal 1C enters the Wi-Fi detectable area AR2 of a Wi-Fi AP 3, the reception function of Bluetooth of the portable terminal 1C is turned on. Consequently, before the portable terminal 1C originates a BLE beacon after it establishes coupling with the Wi-Fi AP 3, the user of the portable terminal 1C can accept provision of information by a BLE reception service.

Further, in the third embodiment, the reception function of Bluetooth is turned on in response to advance into the Wi-Fi detectable area AR2 only when the portable terminal 1C has coupling achievements with the Wi-Fi AP 3 and achievements of a BLE service. Consequently, such useless power consumption as in a case in which, also when a BLE transmission service is not available, the reception function of Bluetooth is turned on can be suppressed.

Fourth Embodiment

A service system according to a fourth embodiment provides a service that uses a function capable of deciding a distance between an origination source apparatus of a BLE beacon and a BLE receiver from the difference between a transmission signal strength and a reception signal strength of the BLE beacon utilizing the fact that the transmission signal strength is available as a kind of information included in the BLE beacon.

Figure 23:
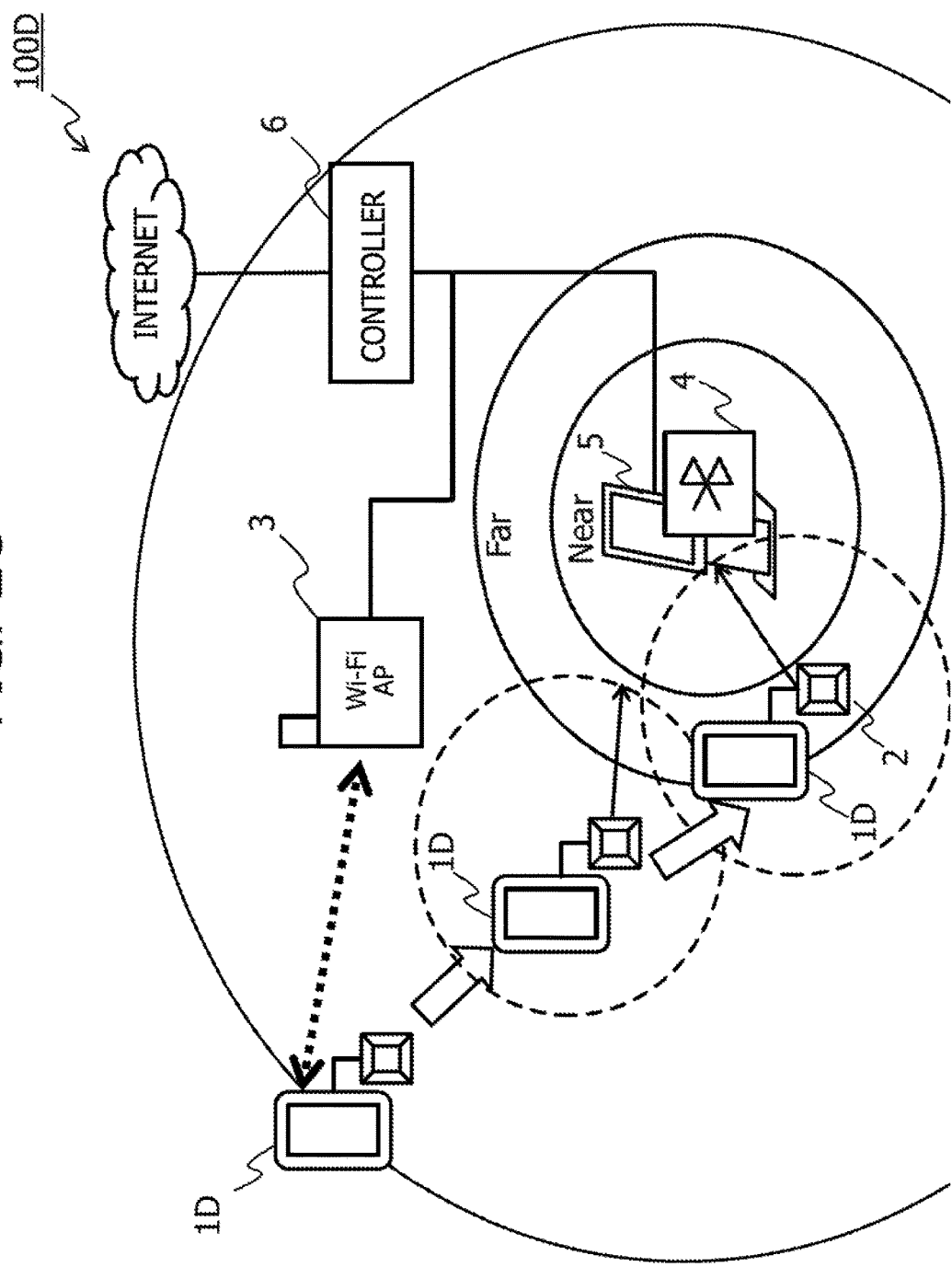
FIG. 23 is a view depicting an example of a system configuration of a service system according to a fourth embodiment.

FIG. 23 is a block diagram depicting an example of a system configuration of a service system 100D according to the fourth embodiment. The service system 100D according to the fourth embodiment has a system configuration similar to that of the service system 100 according to the first embodiment and includes a portable terminal 1D, a BLE terminal 2, a Wi-Fi AP 3, a BLE receiver 4, a digital signage 5, and a controller 6. It is to be noted that the service system 100D according to the fourth embodiment may have a system configuration similar to that of the service system 100B according to the second embodiment.

If the portable terminal 1D acquires BLE beacon setting information through the Wi-Fi AP 3 similarly as in the first embodiment, then it causes the BLE terminal 2 to start origination of a BLE beacon signal.

The BLE receiver 4 decides the distance to the portable terminal 1D between two stages of "Far" and "Near" from the difference between the reception signal strength of the BLE beacon originated from the portable terminal 1D and the origination signal strength of the BLE beacon included in the BLE beacon. In the following description, a region in which the distance to the origination apparatus of a BLE beacon is decided to be "Far" is referred to as Far region, and the region in which the distance is decided to be "Near" is hereinafter referred to as Near region. The Far region is greater than the Near region and includes the Near region. The Near region has a range of, for example, a distance of 1 meter to 3 meters from the BLE transmitter. The Far region has a range of a distance of such a degree that, for example, a BLE beacon can be detected from the BLE transmitter. It is to be noted that the reaching distance of the BLE beacon is, for example, 2.5 meters to 50 meters although this depends upon the origination power.

The BLE receiver 4 notifies the controller 6 of "Far" or "Near," which is the distance information to the portable terminal 1D, together with or in a state included in the BLE beacon information. The controller 6 determines push information or digital signage information on the basis of personal attribute information corresponding to the BLE beacon information and the distance information and transmits the determined information to the portable terminal 1D or the digital signage 5.

As an example of a service provided by the service system 100D, a service is available that, when the portable terminal 1D advances into the Far region, push notification to the portable terminal 1D is performed, and when the portable terminal 1D advances into the Near region, information in accordance with the personal attribute information of the user is displayed on the digital signage 5. Also a service is available that, in this instance, the information displayed on the digital signage 5 is information for providing downloading of a file and, where a wireless gigabit (WiGig) AP is installed in the proximity of the digital signage 5, a file can be downloaded from the WiGig AP.

In this service, if an instruction to download a file is inputted by a user operation through the digital signage 5, then the BLE receiver 4 or the digital signage 5 notifies the portable terminal 1D through the Wi-Fi AP 3 that the portable terminal 1D is within the communication range of the WiGig AP. When the portable terminal 1D receives the notification that it is within the communication range of the WiGig AP through the Wi-Fi AP 3, it starts a coupling sequence with the WiGig AP.

The components in the fourth embodiment have a hardware configuration and a functional configuration similar to those in the first embodiment. It is to be noted that, where the system configuration of the fourth embodiment is similar to that of the second embodiment, the hardware configuration and the functional configuration of the components in the fourth embodiment are similar to those in the second embodiment.

Figure 24:
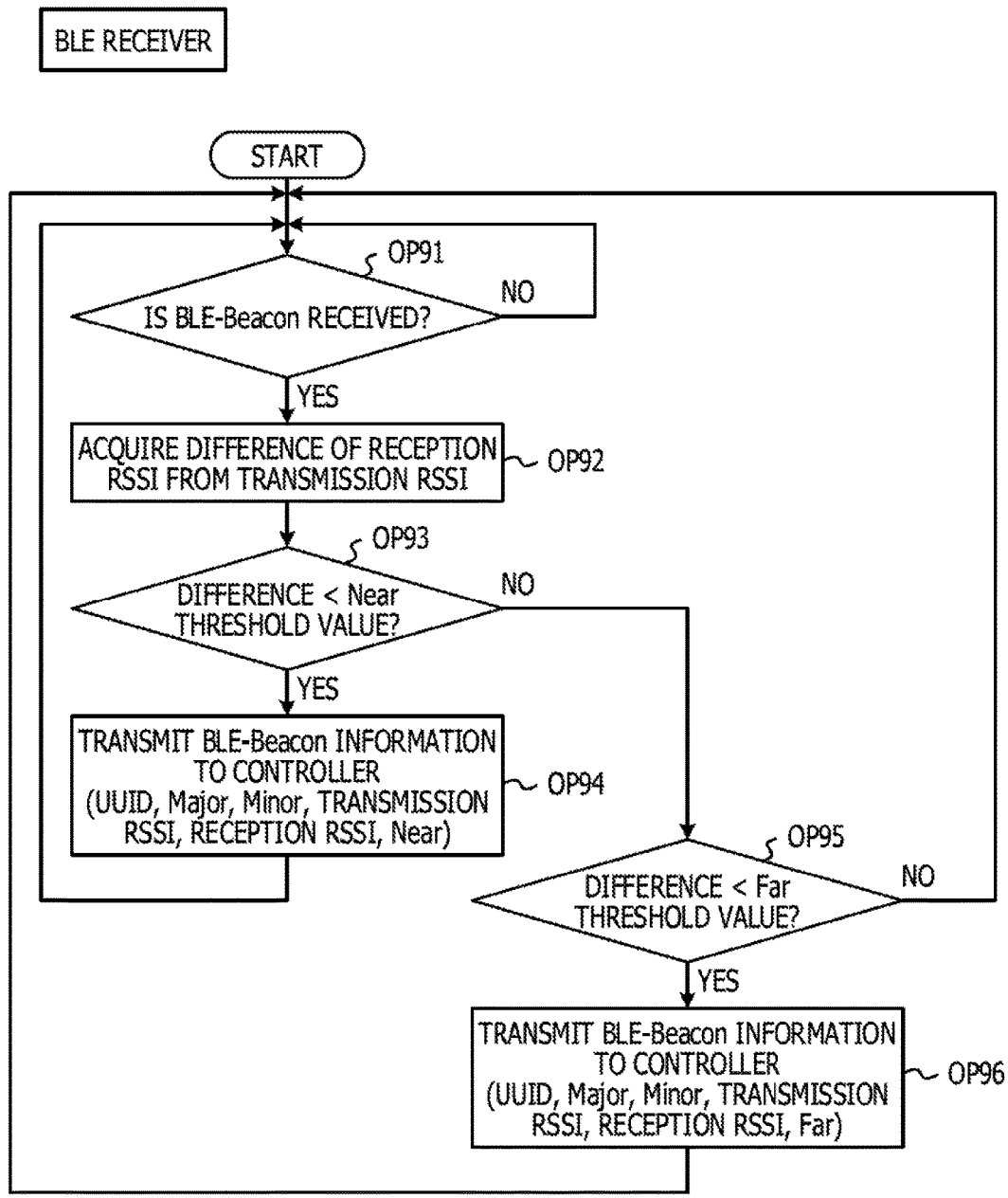
FIG. 24 depicts an example of a flow chart of processing of a BLE reception controlling unit of a BLE receiver according to the fourth embodiment.

FIG. 24 illustrates an example of processing of a BLE reception controlling unit 41 of the BLE receiver 4 according to the fourth embodiment. The processing illustrated in FIG. 24 is started in response to activation of the BLE receiver 4. Although the subject of the processing of FIG. 24 is the CPU of the BLE receiver 4, for the convenience of description, the description is given supposing that the subject is the BLE reception controlling unit 41 that is a functional component of the BLE receiver 4.

At OP91, the BLE reception controlling unit 41 waits for reception of a BLE beacon. If the BLE reception controlling unit 41 receives a BLE beacon (OP91: YES), then the processing advances to OP92.

At OP92, the BLE reception controlling unit 41 acquires the difference between a transmission signal strength and a reception signal strength of the BLE beacon. The transmission signal strength of the BLE beacon is included in the BLE beacon. The reception signal strength of the BLE beacon is acquired by measurement of the BLE receiver 4.

At OP93, the BLE reception controlling unit 41 compares the acquired difference with a Near threshold value. The Near threshold value is a threshold value for deciding that the origination source apparatus of the BLE beacon exists in the Near region. If the acquired difference is smaller than the Near threshold value (OP93: YES), then it is decided that the distance information to the origination source apparatus of the BLE beacon is "Near," and the processing advances to OP94. If the acquired difference is equal to or greater than the Near threshold value (OP93: NO), then the processing advances to OP95.

At OP94, the BLE reception controlling unit 41 transmits BLE beacon information to the controller 6. The BLE beacon information includes, for example, UUID, Major, Minor, transmission RSSI, reception RSSI, and distance information "Near." Thereafter, the processing advances to OP91.

At OP95, the BLE reception controlling unit 41 compares the acquired difference and a Far threshold value with each other. The Far threshold value is a threshold value for deciding that an origination source apparatus of a BLE beacon exists in the Far region. If the acquired difference is smaller than the Far threshold value (OP95: YES), then it is decided that the distance information to the origination source apparatus of the BLE beacon is "Far," and then the processing advances to OP96. If the acquired difference is equal to or greater than the Far threshold value (OP95: NO), then the processing advances to OP91.

At OP96, the BLE reception controlling unit 41 transmits BLE beacon information to the controller 6. The BLE beacon information includes, for example, UUID, Major, Minor, transmission RSSI, reception RSSI, and distance information "Far." Thereafter, the processing advances to OP91.

In the example illustrated in FIG. 24, at OP94 and OP96, the distance information is included in the BLE beacon information and is transmitted. However, the distance information may not be included in the BLE beacon information, but the BLE beacon information and the distance information may be transmitted separately from each other. Where the origination signal strength of the BLE beacon of the portable terminal 1D is uniform in the service system 100D, it may be decided on the basis of the reception signal strength of the BLE beacon that the distance information is "Near" or "Far."

Figure 25A:
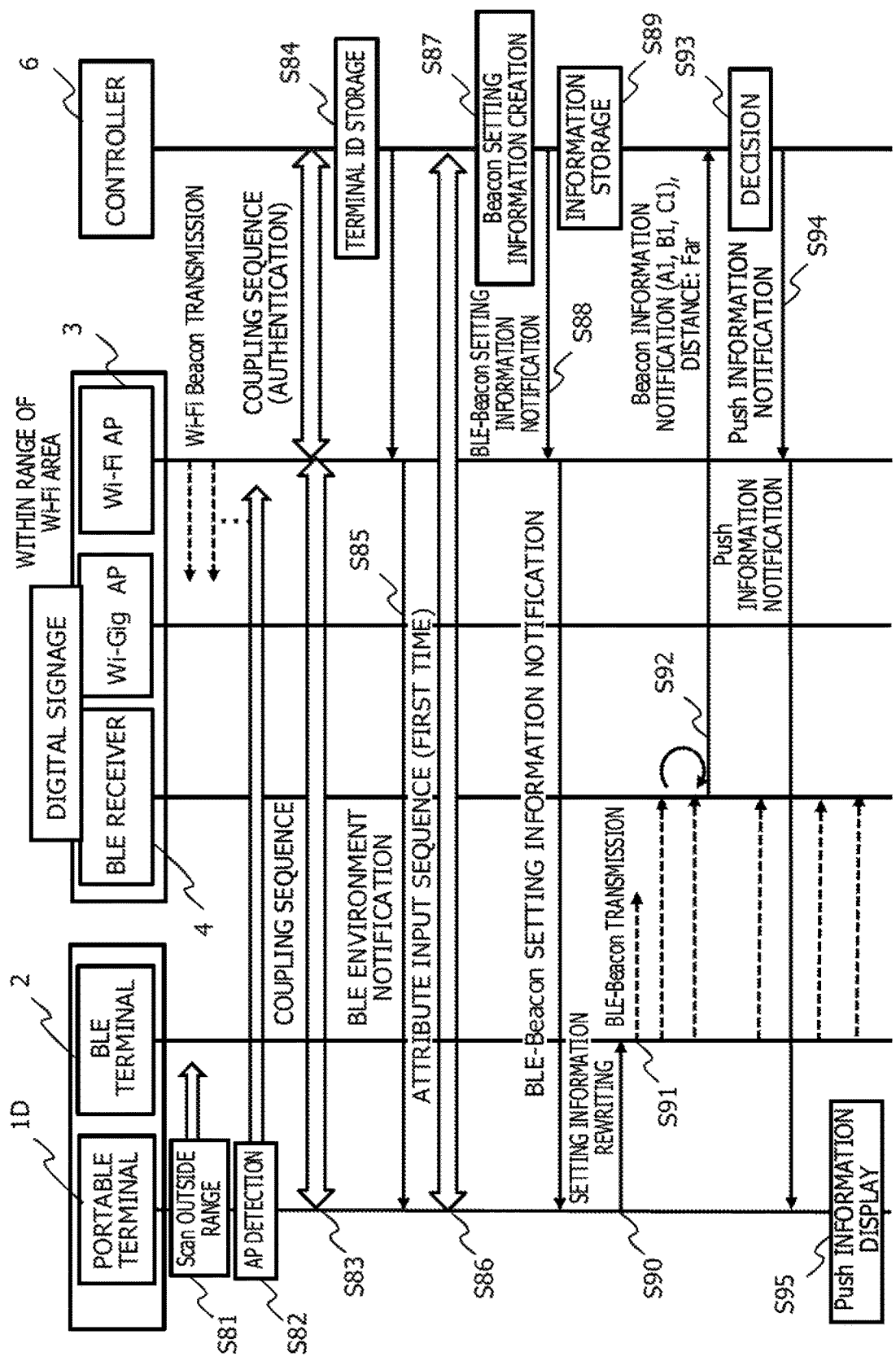
FIG. 25A illustrates an example of a sequence of processing of a service system according to the fourth embodiment.
Figure 25B:
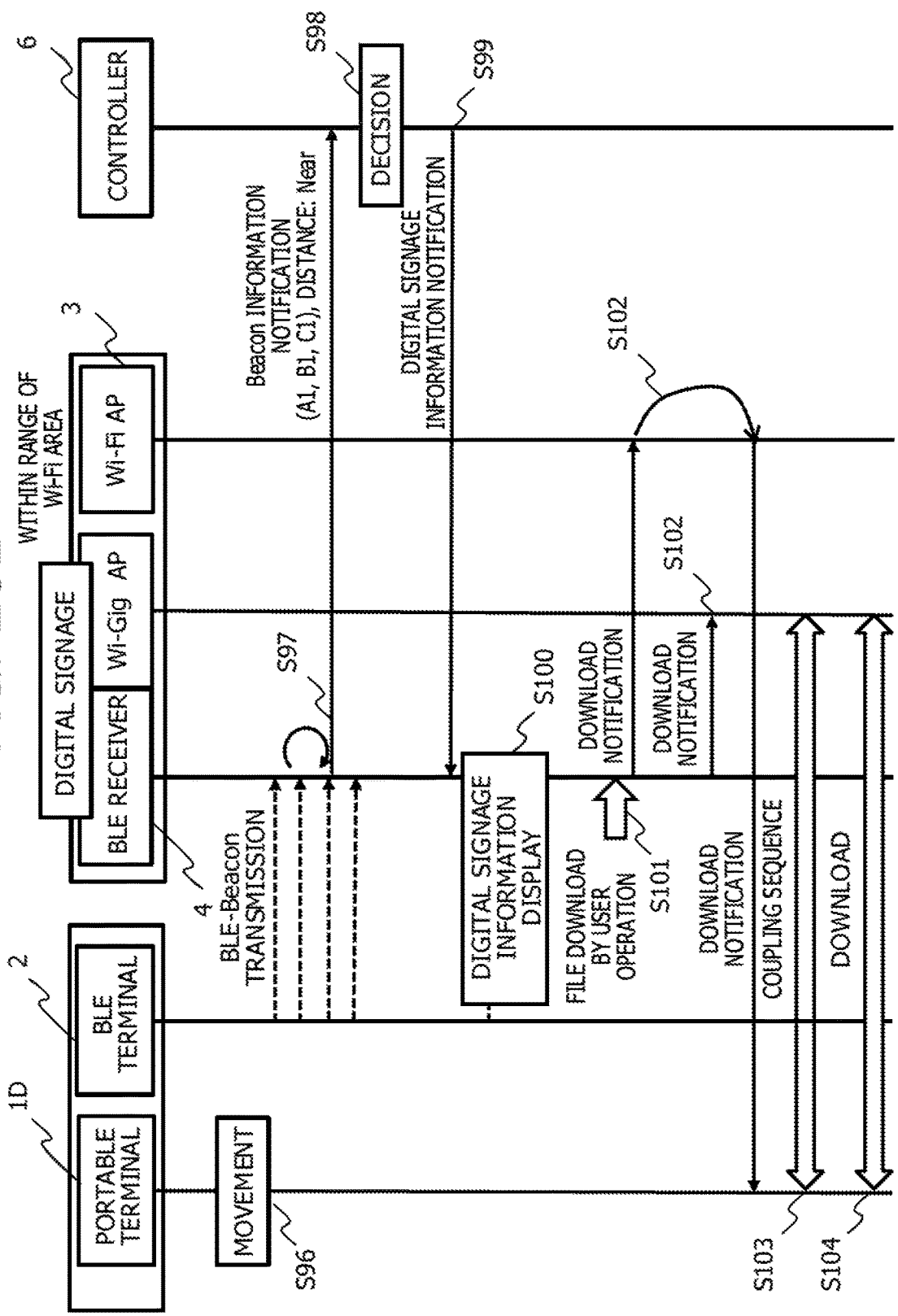
FIG. 25B is a view illustrating an example of a sequence of processing of the service system according to the fourth embodiment.

FIGS. 25A and 25B are views depicting an example of a sequence of processes for information provision by the service system 100D according to the fourth embodiment. It is assumed that the supposition of the example illustrated in FIG. 25A is same as that of the example illustrated in FIG. 15A of the first embodiment. It is assumed that the service system 100D provides a service that, when the portable terminal 1D advances into the Far region, push notification to the portable terminal 1D is performed, and when the portable terminal 1D advances into the Near region, given information is displayed on the digital signage 5. Further, it is assumed that a WiGig AP is installed in the proximity of the digital signage 5 and a file can be downloaded through the WiGig AP in response to an operation of the digital signage 5.

Processes at S81 to S91 until transmission of a BLE beacon from the BLE terminal 2 is started after the portable terminal 1D acquires BLE beacon setting information are similar to those at S1 to S11 of FIG. 15A, and therefore, overlapping description of them is omitted herein.

At S92, the BLE receiver 4 receives a BLE beacon from the BLE terminal 2 (FIG. 24, OP91: YES) and decides that the distance to the BLE terminal 2 is "Far" (FIG. 24, OP95: YES). The BLE receiver 4 transmits BLE beacon information including the distance information "Far" to the controller 6 (FIG. 24, OP96).

At S93, the controller 6 receives the BLE beacon information from the BLE receiver 4 (FIG. 14, OP51) and decides whether or not information corresponding to the BLE beacon information exists in the user information DB 64 (FIG. 14, OP52). In the example illustrated in FIG. 25A, the BLE beacon information received from the BLE receiver 4 exists in the user information DB 64 (FIG. 14, OP52: YES).

At S94, the controller 6 acquires personal attribute information corresponding to the BLE beacon information (FIG. 14, OP53) and acquires push information corresponding to the personal attribute information and the distance information "Far" (FIG. 14, OP54). Then, the controller 6 push-notifies the portable terminal 1D of the acquired push information via Wi-Fi (FIG. 14, OP55). At S95, the portable terminal 1D receives the push information and displays the push information on the display unit. For example, sale information held in the proximity of the digital signage 5 in a shop or the like is displayed on the portable terminal 1D.

At S96, it is assumed that the user of the portable terminal 1D moves so as to come still nearer to the digital signage 5, for example, in accordance with the information presented on the display unit of the portable terminal 1D based on the push information and advances into the Near region.

At S97, the BLE receiver 4 receives the BLE beacon from the BLE terminal 2 (FIG. 24, OP91: YES) and decides that the distance to the BLE terminal 2 is "Near" (FIG. 24, OP93: YES). The BLE receiver 4 transmits BLE beacon information including the distance information "Near" to the controller 6 (FIG. 24, OP94).

At S98, the controller 6 receives the BLE beacon information from the BLE receiver 4 (FIG. 14, OP51) and decides whether information corresponding to the BLE beacon information exists in the user information DB 64 (FIG. 14, OP52).

At S99, the controller 6 acquires personal attribute information corresponding to the BLE beacon information (FIG. 14, OP53) and acquires digital signage information corresponding to the personal attribute information and the distance information "Near" (FIG. 14, OP54). Then, the controller 6 transits the acquired digital signage information to the digital signage 5 (FIG. 14, OP56).

At S100, the digital signage 5 receives the digital signage information and displays the digital signage information on the display unit. For example, on the digital signage 5, details information of a commodity and a download button of a promotion moving picture file of the commodity are displayed.

At S101, the user of the portable terminal 1D would perform an operation for downloading a moving picture file to the digital signage 5. AT S102, the BLE receiver 4 receives an operation input for downloading from the digital signage 5 and issues a download notification to the WiGig AP and the portable terminal 1D. The download notification issued to the portable terminal 1D is relayed by the Wi-Fi AP 3 and transmitted via Wi-Fi. The download notification issued to the portable terminal 1D includes information such as, for example, identification information of a cell of WiGig or the like. When the WiGig AP receives the download notification, it starts downloading of the target file, for example, from a given server.

At S103, when the portable terminal 1D receives the download notification via Wi-Fi, it activates the WiGig, and a coupling sequence is performed between the portable terminal 1D and the WiGig AP. At S104, the coupling is established between the portable terminal 1D and the WiGig AP, and downloading of the target file is started through the WiGig.

Working-Effect of Fourth Embodiment

The service system 100D according to the fourth embodiment can provide stepwise services making use of the function of being capable of estimating a rough distance between a transmission source apparatus of a BLE beacon and the BLE receiver 4 from a transmission signal strength and a reception signal strength of the BLE beacon.

Fifth Embodiment

In a fifth embodiment, a portable terminal is coupled with a plurality of BLE terminals by Bluetooth and a service system provides information based on a relationship among users of the BLE terminals and so forth.

Figure 26:
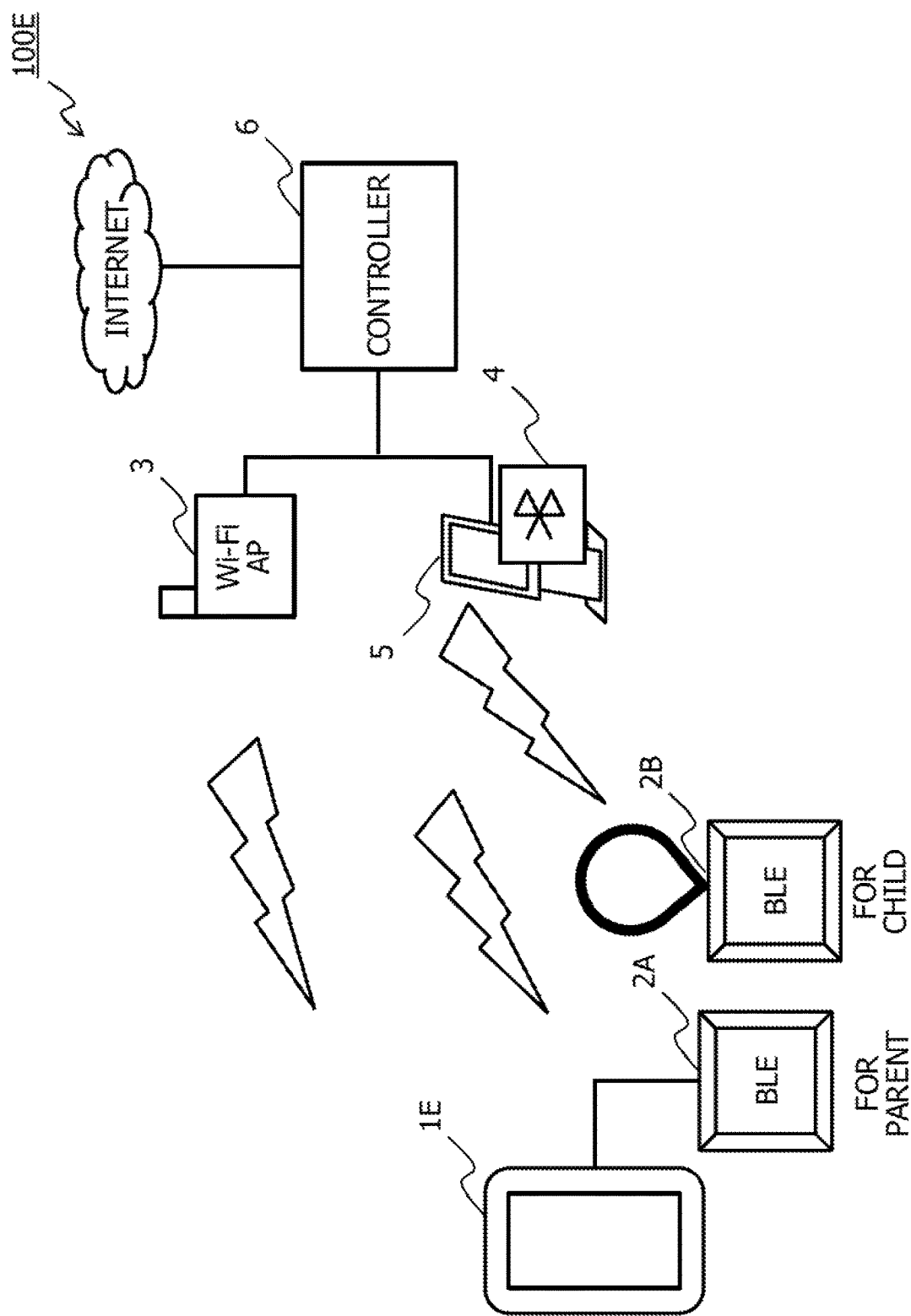
FIG. 26 is a view depicting an example of a system configuration of a service system according to a fifth embodiment.

FIG. 26 is a view depicting an example of a system configuration of a service system 100E according to the fifth embodiment. The service system 100E includes a portable terminal 1E, BLE terminals 2A and 2B, a Wi-Fi AP 3, a BLE receiver 4, a digital signage 5, and a controller 6.

The portable terminal 1E is coupled with the BLE terminals 2A and 2B by Bluetooth. For example, the BLE terminal 2A is owned by a user of the portable terminal 1E and the BLE terminal 2B is owned by a child of the user of the portable terminal 1E. In the fifth embodiment, if coupling with the Wi-Fi AP 3 is established, then the portable terminal 1E transmits personal attribute information of the users of the BLE terminals 2A and 2B to the controller 6. The controller 6 creates BLE beacon setting information for the BLE terminals 2A and 2B and issues a notification of the created information to the portable terminal 1E.

Each of the BLE terminals 2A and 2B transmits a BLE beacon using the BLE beacon setting information received as a notification. Consequently, the service system 100E can provide information corresponding to an attribute of each of the users of the BLE terminals 2A and 2B.

Figure 27:
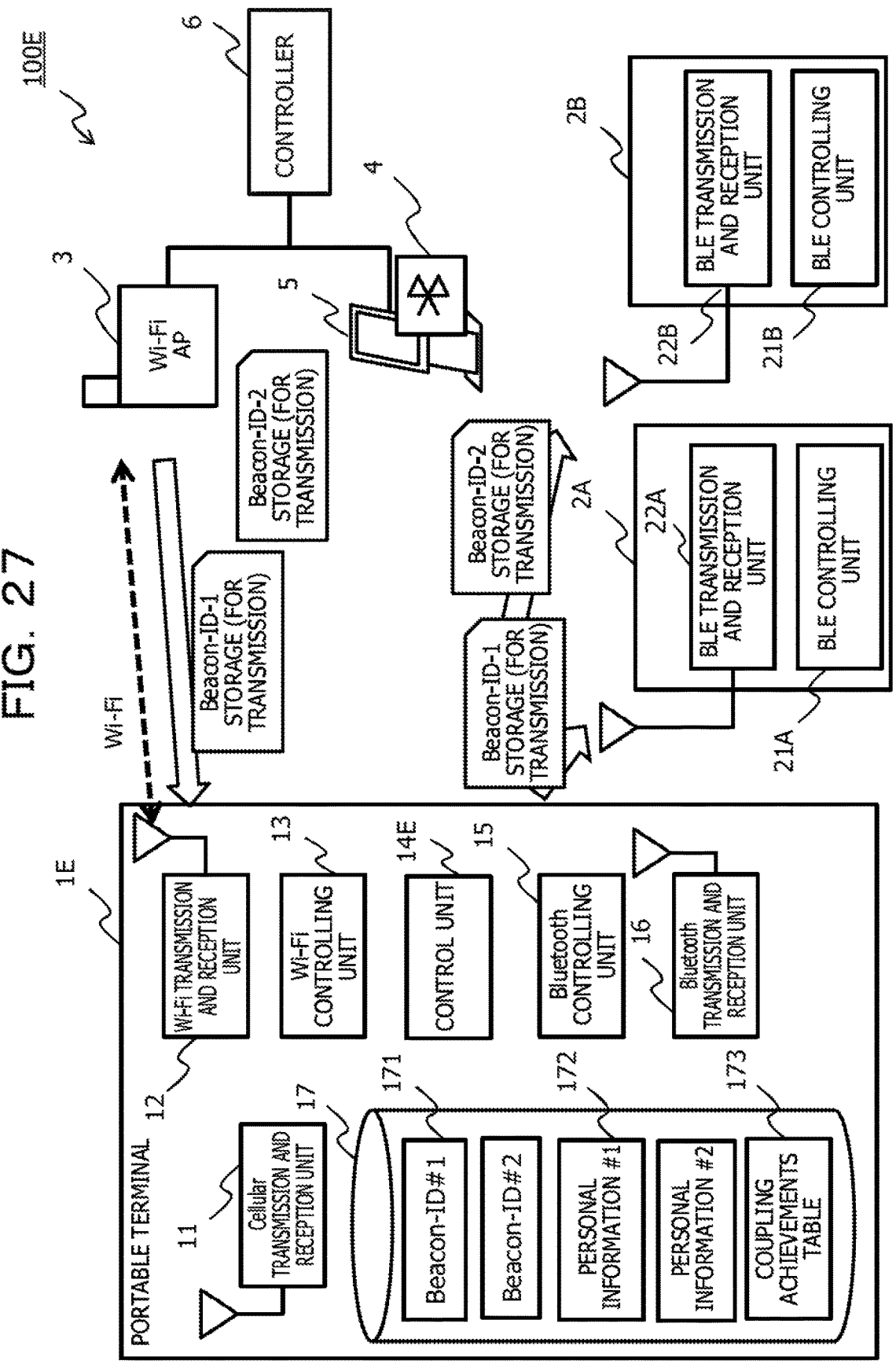
FIG. 27 is a block diagram depicting an example of a functional configuration of a service system according to the fifth embodiment.

FIG. 27 is a view depicting an example of a functional configuration of the service system 100E according to the fifth embodiment. The functional configuration of the service system 100E according to the fifth embodiment is similar to that of the service system 100 according to the first embodiment depicted in FIG. 5 except that a plurality of BLE terminals 2 are coupled with the single portable terminal 1E by Bluetooth. It is to be noted that, in FIG. 27, the functional configuration of the Wi-Fi AP 3, the BLE receiver 4, the digital signage 5, and the controller 6 is omitted for convenience of the illustration.

In a database 17 of the portable terminal 1E, the number of pieces of BLE beacon setting information 171 and personal attribute information 172 corresponding to the number of the BLE terminals 2 coupled by Bluetooth are stored. A control unit 14E is different from that in the first embodiment in that, if coupling thereof with the Wi-Fi AP 3 is established, then the control unit 14E transmits the number of pieces of personal attribute information corresponding to the number of the BLE terminals 2 coupled by Bluetooth to acquire the number of pieces of BLE beacon information corresponding to the number of the BLE terminals 2 coupled by Bluetooth.

FIG. 28 is a view illustrating an example of a personal attribute information table of the controller 6 according to the fifth embodiment. In the fifth embodiment, the personal attribute information table includes not only terminal identification information and personal attribute information but also a BLE terminal number in the items for entry. In the fifth embodiment, since the plurality of BLE terminals 2 are coupled with the single portable terminal 1E by Bluetooth, the BLE terminal number is information for identifying a BLE terminal coupled by Bluetooth.

In the example depicted in FIG. 28, two entries in which terminal identification information is "UE0001" are included in the personal attribute information table. The BLE terminal number of each of the two entries is "1" and "2." This signifies that the two BLE terminals 2 are coupled with the portable terminal 1E, whose terminal identification information is "UE0001," by Bluetooth. Further, in the fifth embodiment, the controller 6 identifies a BLE terminal 2 by a combination of the terminal identification information and the BLE terminal number.

Further, the BLE terminals 2 coupled with the one portable terminal 1E by Bluetooth have a relationship of a master and a slave therebetween, and the BLE terminal number of the personal attribute information corresponding to the BLE terminal 2 that serves as the master is "1." It is determined by the user of the portable terminal 1E which one of the BLE terminals 2 is to serve as the master, and the determined substance is included in the personal attribute information. For example, in FIG. 27, where the BLE terminal 2A is a BLE terminal owned by the user of the portable terminal 1E and the BLE terminal 2B is a BLE terminal owned by a child of the user of the portable terminal 1E, the BLE terminal number of the personal attribute information of the user of the portable terminal 1E is "1."

FIG. 29 is a view depicting an example of a BLE beacon setting information table of the controller 6 according to the fifth embodiment. In the fifth embodiment, the BLE beacon setting information table includes entry number, terminal identification information, BLE terminal number, BLE beacon setting information, and pairing number in the items for entry. Entry number is an identification number of an entry of BLE beacon setting information.

An entry number of the BLE terminal 2 that serves as a master of the BLE terminal 2 of the entry is placed in pairing number. For example, it is indicated in the example depicted in FIG. 29 that the pairing number of the entry of the entry number "10002" is "10001" and the BLE terminal 2 of the entry of the entry number of "10001" is determined as the master. Where the BLE terminal 2 is the master, its own entry number is placed into the pairing number. Further, where the BLE terminal 2 is paired one by one with the portable terminal 1E, "0" is placed into the pairing number.

If the controller 6 receives personal attribute information from the portable terminal 1E, then it creates an entry of the personal attribute information table. Then, an entry in which terminal identification information of the created personal attribute information table and a BLE terminal number are same as each other is created in the BLE beacon setting information table.

If BLE beacon information included in a BLE beacon arrives at the controller 6 from the BLE receiver 4, then contrary to entry registration, an entry that coincides with the received BLE beacon information is first searched for in the BLE beacon setting information table. Then, the personal attribute information table is searched using, as keys, the terminal identification information and the BLE terminal number of the detected entry of the BLE beacon setting information table to acquire the personal attribute information corresponding to the BLE beacon information.

FIGS. 30A and 30B are views illustrating an example of a sequence of a process in the service system 100E according to the fifth embodiment. While the service system 100E depicted in FIG. 27 is depicted in FIGS. 30A and 30B, the digital signage 5 is omitted for the convenience of illustration. It is assumed that the BLE terminal 2A serves as a master and the BLE terminal 2B serves as a slave.

It is assumed that, in FIG. 30A, a user having the portable terminal 1E and the BLE terminal 2A and another user having the BLE terminal 2B are positioned outside the range of the Wi-Fi AP 3 and are moving toward a communication range of the Wi-Fi AP 3. Further, it is supposed that the portable terminal 1E does not have achievements of coupling with the Wi-Fi AP 3.

Processes at S111 to S115 from detection of a Wi-Fi AP 3 to coupling establishment are similar to those at S1 to S5 of FIG. 15A in the first embodiment.

At S116, the portable terminal 1E transmits personal attribute information to the controller 6 via Wi-Fi (FIG. 10A, OP8). At this time, two pieces of personal attribute information of the user of the portable terminal 1E and the user of the BLE terminal 2B are transmitted from the portable terminal 1E. In particular, at S116, the portable terminal 1E requests two pieces of BLE beacon setting information.

At S117, the controller 6 receives the two pieces of personal attribute information (FIG. 13, OP45: YES), and creates BLE beacon setting information corresponding to each of the two pieces of personal attribute information (FIG. 13, OP46). At S118, the controller 6 transmits the two created pieces of BLE beacon setting information to the portable terminal 1E through Wi-Fi (FIG. 13, OP47). Further, the controller 6 stores the terminal identification information of the portable terminal 1E, the personal attribute information, and the BLE beacon setting information in an associated relationship with each other (FIG. 13, OP48).

At S119 and S121, the portable terminal 1E receives the two pieces of BLE beacon setting information (FIG. 10B, OP9: YES), and transmits a BLE beacon setting information rewriting notification to the BLE terminals 2A and 2B through Bluetooth (FIG. 10B, OP12).

At S120 and S122, the BLE terminals 2A and 2B receive the BLE beacon setting information rewriting notification from the portable terminal 1E (FIG. 11, OP21: YES and OP22: YES), respectively, and start transmission of a BLE beacon (FIG. 11, OP23). It is assumed that the user of the BLE terminal 2B moves away from the user of the portable terminal 1E and comes near to the BLE receiver 4.

At S123, the BLE receiver 4 receives the BLE beacon from the BLE terminal 2B (FIG. 12, OP31), and extracts BLE beacon information included in the BLE beacon and issues a notification of the extracted BLE beacon information to the controller 6 (FIG. 12, OP32).

At S124, the controller 6 receives the BLE beacon information from the BLE receiver 4 (FIG. 14, OP51), and acquires personal attribute information corresponding to the BLE beacon information (FIG. 14, OP53) and acquires digital signage information corresponding to the personal attribute information (FIG. 14, OP54). The acquired digital signage information is issued as a notification to the BLE receiver 4 (FIG. 14, OP56).

At S125, the digital signage information is displayed on the display unit of the digital signage 5 through the BLE receiver 4. For example, where the user of the BLE terminal 2B is a child, detailed information of a commodity for children is displayed on the digital signage 5.

At S126, the user of the portable terminal 1E and the user of the BLE terminal 2B would move in directions in which they are spaced away from the communication range of the Wi-Fi AP 3. At S127, the user of the portable terminal 1E would leave the communication range of the Wi-Fi AP 3. It is to be noted that a BLE beacon is transmitted from each of the BLE terminals 2A and 2B successively in the given period, and the portable terminal 1E performs scanning for a Wi-Fi AP in a given period.

At S128, since the portable terminal 1E has moved to the outside of the range of the Wi-Fi AP 3, it is detected that the coupling with the Wi-Fi AP 3 is cut (FIG. 10B, OP13: YES).

At S129 and S130, the portable terminal 1E transmits a BLE beacon setting information rewriting notification to each of the BLE terminals 2A and 2B, respectively, respectively (FIG. 10B, OP14). Blank BLE beacon setting information is included in the BLE beacon setting information rewriting notification. After the BLE beacon setting information rewriting notification is transmitted, the portable terminal 1E deletes the BLE beacon setting information 171 in the database 17.

At S131 and S132, the BLE terminals 2A and 2B receive the BLE beacon setting information rewriting notification, respectively (FIG. 11, OP21: YES). Then, since the blank BLE beacon setting information is included in the notification (FIG. 11, OP22: NO), the BLE terminals 2A and 2B stop transmission of the BLE beacon (FIG. 11, OP24).

It is to be noted that, when the user of the portable terminal 1E moves out of the communication range of the Wi-Fi AP 3, if the user of the BLE terminal 2B is in a remote location and the BLE beacon setting information rewriting notification does not arrive at the portable terminal 1E, then such a process as described below may be performed in order to stop origination of the BLE beacon. In particular, the portable terminal 1E turns on the reception function of Bluetooth and waits for reception of a BLE beacon originated from the BLE terminal 2B. If the user of the BLE terminal 2B returns to the location of the user of the portable terminal 1E and the portable terminal 1E receives the BLE beacon from the BLE terminal 2B, then the portable terminal 1E transmits a BLE beacon setting information rewriting notification including blank BLE beacon setting information to the BLE terminal 2. Thereafter, the portable terminal 1E turns off the reception function of Bluetooth.

Working Effect of Fifth Embodiment

In the fifth embodiment, where a plurality of BLE terminals 2 are coupled with a single portable terminal 1E through Bluetooth, the service system 100E can provide information to users of the BLE terminals 2 by creating BLE beacon setting information for the BLE terminals 2.

Example of Practical Use of Fifth Embodiment

In the description of the service system 100E of the fifth embodiment, a service for providing information in accordance with an attribute of a user of each of the BLE terminal 2A and the BLE terminal 2B is described. By practically using the service, for example, to include a relationship between the BLE terminal 2A and the BLE terminal 2B into the personal attribute information, the service system 100E can provide information in accordance with a relationship of the BLE terminal 2A and the BLE terminal 2B with the users.

For example, where the relationship between the users of the BLE terminal 2A and the BLE terminal 2B is a parent and a child, information indicating a relationship of "parent and child" is included into the personal attribute information of the BLE terminal 2A and the BLE terminal 2B. If BLE beacon information of the BLE terminal 2A and the BLE terminal 2B is received as a notification from the BLE receiver 4, then the controller 6 transmits information for parents and children to the digital signage 5 on the basis of the information indicating the relationship between the BLE terminal 2A and the BLE terminal 2B. As a service, for example, if the users of the BLE terminal 2A and the BLE terminal 2B who are a parent and a child come near to the digital signage 5, then detailed information of a commodity for parents and children is displayed on the digital signage 5.

Further, since a reception history of any BLE beacon is left in the BLE receiver 4, where BLE receivers 4 are disposed in a dispersed relationship, information of a movement history of each of the BLE terminal 2A and the BLE terminal 2B in the service system 100E can be provided. The reception history of the BLE beacons of the BLE receiver 4 may be retained in a nonvolatile memory of the BLE receiver 4 and may include, for example, an associated relationship of reception time of each BLE beacon and BLE beacon information.

For example, where the user of the BLE terminal 2A is a parent and the user of the BLE terminal 2B is a child, a service of a lost child search can be implemented in the following manner. First, the portable terminal 1E inquires the controller 6 about a movement history of the BLE terminal 2B. The controller 6 transmits BLE beacon setting information of the BLE terminal 2B to the BLE receivers 4 to collect BLE beacon reception histories of the BLE terminal 2B. Each BLE receiver 4 transmits a reception history of BLE beacon information which coincides with the BLE beacon setting information of the BLE terminal 2B received from the controller 6 to the controller 6. The controller 6 provides the identification information of the BLE receivers 4 and the BLE beacon reception histories of the BLE terminal 2B collected from the BLE receivers 4 as a movement history of the BLE terminal 2B to the portable terminal 1E. It is found out that the user (child) of the BLE terminal 2B exists in the proximity of the BLE receiver 4 that recorded the latest reception history of a BLE beacon from among the movement histories of the BLE terminal 2B.

In the fifth embodiment, a plurality of BLE terminals 2 are associated with each other by coupling a single portable terminal 1E and the plurality of BLE terminals 2 with each other by Bluetooth. Instead, a plurality of portable terminals 1E each having a reception function of a BLE beacon may be associated with each other. In this case, by including a mail address and a relationship of the portable terminal 1E that serves as a master into personal attribute information, the service system 100E can provide information in accordance with a relationship of the associated portable terminals 1E.

<Others>

One or both of the first and second embodiments and one or plural ones of the third to fifth embodiments may be combined with each other.

<Recording Medium>

A program for causing a computer or some other machine or apparatus (hereinafter referred to as computer or the like) to implement one of the functions described above can be recorded on a recording medium readable by a computer or the like. The recorded function can be provided by causing a computer or the like to read in and execute the program recorded on the recording medium.

Here, the recording medium readable by a computer or the like signifies a non-temporary recording medium that can accumulate information such as data or a program electrically, optically, mechanically, or by a chemical action thereon such that the information can be read out using a computer or the like. As a medium capable of being removed from a computer or the like from among such recording media as just described, for example, a flexible disk, a magneto-optical disk, a compact disc (CD)-ROM, a CD-R/

W, a digital versatile disc (DVD), a Blu-ray disk, a DAT, an 8 mm tape, a memory card such as a flash memory or the like is available. Further, as a recording medium fixed to a computer or the like, a hard disk, a ROM (read only memory) and so forth are available. Further, a solid state drive (SSD) can be utilized not only as a recording medium capable of being removed from a computer or the like but also as a recording medium fixed to a computer or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
a terminal apparatus;
an information providing apparatus;
a first wireless apparatus configured to relay first communication between the terminal apparatus and the information providing apparatus, and configured to communicate with the terminal apparatus by using a first wireless communication protocol; and
a second wireless apparatus configured to relay second communication between the terminal apparatus and the information providing apparatus, and configured to communicate with the terminal apparatus by using a second wireless communication protocol different from the first wireless communication protocol, wherein
the terminal apparatus is configured to transmit attribute information to the information providing apparatus through the first wireless apparatus,
the information providing apparatus is configured to transmit identification information to the terminal apparatus through the first wireless apparatus based on reception of the attribute information,
the terminal apparatus is configured to transmit the identification information transmitted from the information providing apparatus to
the information providing apparatus through the second wireless apparatus, and
the information providing apparatus is configured to output content data based on the identification information transmitted from the terminal apparatus through the second wireless apparatus.

2. The communication system according to claim 1, wherein the information providing apparatus is configured to output the content data based on confirmation that the identification information transmitted from the terminal apparatus through the second wireless apparatus is identical to the identification information transmitted to the terminal apparatus.

3. The communication system according to claim 1, wherein the terminal apparatus is configured to communicate with the first wireless apparatus using the second wireless communication protocol.

4. The communication system according to claim 1, further comprising:
a third wireless apparatus coupled to the terminal apparatus and configured to communicate with the second wireless apparatus using the second wireless communication protocol, wherein
the terminal apparatus is configured to transmit an instruction to start transmission of a beacon to the third wireless apparatus, and
the third wireless apparatus is configured to start transmission of the beacon including the identification information to the second wireless apparatus based on the instruction to start transmission of the beacon.

5. The communication system according to claim 1, wherein the second wireless apparatus is configured to be coupled to the first wireless apparatus using the second wireless communication protocol.

6. The communication system according to claim 1, wherein the attribute information is information indicative of an attribute of a user of the terminal apparatus.

7. The communication system according to claim 6, wherein the information providing apparatus is configured to output the content data in response to the attribute of the user specified by the attribute information.

8. The communication system according to claim 1, wherein the identification information is information that specifies a transmission source apparatus from which the identification information has been transmitted to the second wireless apparatus.

9. The communication system according to claim 4, wherein, when coupling between the terminal apparatus and the first wireless apparatus is established, the terminal apparatus is configured to transmit the attribute information to the information providing apparatus.

10. The communication system according to claim 4, wherein, when coupling between the terminal apparatus and the first wireless apparatus is cut off, the terminal apparatus is configured to instruct the third wireless apparatus to stop transmission of the beacon.

11. The communication system according to claim 1, wherein the first wireless communication protocol is wireless fidelity and the second wireless communication protocol is Bluetooth.

12. The communication system according to claim 9, wherein,
when the terminal apparatus receives the identification information, the terminal apparatus is configured to transmit an instruction to cause a storage unit of the third wireless apparatus to store the identification information to the third wireless apparatus, and
when coupling between the terminal apparatus and the first wireless apparatus is cut off, the terminal apparatus is configured to transmit an instruction to delete the identification information from the storage unit to the third wireless apparatus.

13. The communication system according to claim 6, wherein,
when coupling between the terminal apparatus and the first wireless apparatus is established, the terminal apparatus transmits the attribute information of the user to the information providing apparatus, and
when the information providing apparatus receives the attribute information, the information providing apparatus is configured to transmit the identification information corresponding to the attribute information to the terminal apparatus.

14. The communication system according to claim 4, further comprising:

a transmission apparatus configured to transmit a signal based on the second wireless communication protocol, wherein the terminal apparatus is configured to receive the signal and transmit the identification information included in the signal to the information providing apparatus through the third wireless apparatus and the second wireless apparatus, and the terminal apparatus is configured to start reception of the signal when the terminal apparatus moves into a region in which communication with the first wireless apparatus is possible, and is configured to stop reception of the signal when the terminal apparatus moves to the outside of the region in which communication with the first wireless apparatus is possible.

15. The communication system according to claim 1, wherein the terminal apparatus is configured to:

execute a search for the first wireless apparatus in a first period, set, when a reception signal strength from the first wireless apparatus is equal to or higher than a first threshold value, the period of the search to a second period shorter than the first period, and set, when the reception signal strength from the first wireless apparatus is lower than the first threshold value, the search period to the first period.

16. The communication system according to claim 15, wherein the second wireless apparatus is configured to estimate a distance to the terminal apparatus, and the information providing apparatus is configured to output the content data in response to the distance between the terminal apparatus and the second wireless apparatus.

17. A terminal apparatus comprising:

a memory, and a processor coupled to the memory and configured to:

transmit attribute information to an information providing apparatus through a first wireless apparatus using a first wireless communication protocol, receive identification information associated with the attribute information from the information providing apparatus through the first wireless apparatus, and transmit the identification information to the information providing apparatus through a second wireless apparatus using a second wireless communication protocol different from the first wireless communication protocol, wherein the information providing apparatus is configured to output content data based on the identification information transmitted from the terminal device through the second wireless apparatus.

18. The terminal apparatus according to claim 17, wherein the information providing apparatus is configured to output the content data based on confirmation that the identification information transmitted from the second wireless apparatus is identical to the identification information transmitted to the terminal apparatus.

19. A method using a system including a terminal apparatus, an information providing apparatus configured to output content data, a first wireless apparatus configured to relay first communication between the terminal apparatus and the information providing apparatus and configured to communicate with the terminal apparatus using a first wireless communication protocol, and a second wireless apparatus configured to relay a second communication between the terminal apparatus and the information providing apparatus using a second wireless communication protocol different from the first wireless communication protocol, the method comprising:

transmitting, by the terminal apparatus, attribute information to the information providing apparatus through the first wireless apparatus;

transmitting, by the information providing apparatus, identification information to the terminal apparatus through the first wireless apparatus based on reception of the attribute information;

transmitting, by the terminal apparatus, the identification information to the information providing apparatus through the second wireless apparatus; and outputting, by the information providing apparatus, the content data based on the identification information transmitted from the terminal device through the second wireless apparatus.

20. The method according to claim 19, further comprising confirming, by the information providing apparatus, that the identification information transmitted from the terminal device through the second wireless apparatus is identical to the identification information transmitted to the terminal apparatus.

* * * * *